US011282010B2

(12) United States Patent
Avery, Jr. et al.

(10) Patent No.: US 11,282,010 B2
(45) Date of Patent: Mar. 22, 2022

(54) SYSTEMS, METHODS, AND MEDIA FOR HARMONIZING PROCUREMENT ACROSS DISTRIBUTION NETWORKS WITH HETEROGENEOUS PRODUCT AVAILABILITY

(71) Applicant: Direct Supply, Inc., Milwaukee, WI (US)

(72) Inventors: William L. Avery, Jr., West Chicago, IL (US); James R. Grant, Menomonee Falls, WI (US); Andrew J. Novotny, Whitefish Bay, WI (US); Natasha D. Tomasik, Milwaukee, WI (US)

(73) Assignee: Direct Supply, Inc., Milwaukee, WI (US)

( * ) Notice: Subject to any disclaimer, the term of this patent is extended or adjusted under 35 U.S.C. 154(b) by 0 days.

(21) Appl. No.: 15/931,814

(22) Filed: May 14, 2020

(65) Prior Publication Data
US 2020/0272968 A1 Aug. 27, 2020

Related U.S. Application Data

(63) Continuation of application No. 16/279,690, filed on Feb. 19, 2019, now Pat. No. 10,685,308.

(51) Int. Cl.
*G06Q 10/00* (2012.01)
*G06Q 10/06* (2012.01)
(Continued)

(52) U.S. Cl.
CPC ....... *G06Q 10/06315* (2013.01); *G06N 20/00* (2019.01); *H04L 67/10* (2013.01)

(58) Field of Classification Search
CPC ........ G06Q 10/00–50/00; G06N 20/00; H04L 67/10
(Continued)

(56) References Cited

U.S. PATENT DOCUMENTS 7,233,914 B1 * 6/2007 Wijaya ................. G06Q 10/087
705/26.1
9,978,026 B1 * 5/2018 Konanur ............ G06Q 10/0631
(Continued)

OTHER PUBLICATIONS

Ganesh, Muthusamy, Srinivasan Raghunathan, and Chandrasekharan Rajendran. "The value of information sharing in a multi-product supply chain with product substitution." 1124-1140 (Year: 2008).*

*Primary Examiner* — Alan S Miller
*Assistant Examiner* — Mustafa Iqbal
(74) *Attorney, Agent, or Firm* — Quarles & Brady LLP

(57) ABSTRACT

In accordance with some embodiments of the disclosed subject matter, mechanisms (which can, for example, include systems, methods, and media) for harmonizing procurement across distribution networks with heterogeneous product availability are provided. In some embodiments, a method for automatically generating an order guide for a facility associated with an organization is provided, the method comprising: presenting items available in first, second portions of a distribution network; presenting items available via the network; creating a general order guide, and adding a first item thereto; determining that the first item is unavailable and a second item is available in the first portion; identifying substitutes, including the second item, for the first item; generate a facility order guide with items in the first portion based on the general order guide; automatically selecting the second item for the facility order guide; and associating the facility order guide and facility.

25 Claims, 26 Drawing Sheets

(51) Int. Cl.
*G06N 20/00* (2019.01)
*H04L 67/10* (2022.01)

(58) Field of Classification Search
USPC .................................................. 705/7.11–7.42
See application file for complete search history.

(56) References Cited

U.S. PATENT DOCUMENTS

| 2004/0044557 | A1* | 3/2004 | Frech | G09B 19/18 |
| | | | | 434/219 |
| 2016/0267430 | A1* | 9/2016 | Smith | G06Q 10/087 |
| 2018/0315018 | A1* | 11/2018 | Nazarian | G06Q 10/08355 |

* cited by examiner

FIG. 10A

DSSI
Master Order Guides | Order Guide Download | Restrictions | Alerts | Reports | Meagan's Healthcare ∨

Download Facility Order Guide(s)

Master Order Guides — Search Field
Distributor Selection
Account Name (e.g., Organization)
Import → Mass Upload → +NEW Q Search Master Order Guides
All Distributors ∨

Name of General Order Guide

Casual Cafe Menu
Distributor — Distributor A
Facilities Assoc. w/ order guide — Created 2/13/2018
5 Items ⚑ 4 Locations ✎ Rename ⊞ Delete
↑ Items in order guide Fall/Winter 2017-2018 Menu
Distributor A
Created 2/13/2018
5 Items ⚑ 4 Locations ✎ Rename ⊞ Delete Janitorial Supplies
Distributor B
Created 2/15/2017
49 Items ⚑ 39 Locations ✎ Rename ⊞ Delete Frozen (Menu Integration)
Distributor A
Created 2/15/2017
19 Items ⚑ 39 Locations ✎ Rename ⊞ Delete Office Supplies
Distributor C
Created 1/8/2019
3 Items ⚑ 40 Locations ✎ Rename ⊞ Delete Kosher
Distributor A
Created 1/21/2019
2 Items ⚑ 4 Locations ✎ Rename ⊞ Delete Laundry Supplies
Distributor B
Created 2/15/2017
52 Items ⚑ 5 Locations ✎ Rename ⊞ Delete Refrigerated (Menu Integration)
Distributor A
Created 2/15/2017
5 Items ⚑ 39 Locations ✎ Rename ⊞ Delete Single Facility Needs
Distributor D
Created 12/1/2017
3 Items ⚑ 1 Location ✎ Rename ⊞ Delete

| DSSI | Master Order Guides | Order Guide Download | Restrictions | Alerts | Reports | | | | | ♣ YourNet ⌄ |
|---|---|---|---|---|---|---|---|---|---|---|

Janitorial Supplies ⟶ Name of General Order Guide ⟶ Save Selections ⟵ Save Enabled Locations

| | Facility Name | | | | | | | |
|---|---|---|---|---|---|---|---|---|
| | Name | ID | Address Line 1 | Address Line 2 | City | State | Zip | DC Name | DC # |
| ○ | Facility 1 | 12101 | 123 Maple St | | Mapleton | IL | 61547 | Illinois | 011 |
| ● | Facility | Element to Select/ | novation Dr | | P Distribution Center | | 53223 | Wisconsin | 024 |
| ● | Facility | Deselect Facility | 0 South Fourth Avenue | | Assoc. w/ Facility | | 40202 | Tennessee | 011 |
| ○ | Facility 4 | 0000 | 6767 N Industrial Dr | #7 | Milwaukee | WI | 53223 | Wisconsin | 024 |
| ○ | | 7000 | 680 South Fourth Avenue | | Louisville | KY | 40202 | Tennessee | 022 |

Master Order Guides > Casual Cafe Menu

Master Items

Search Field →

🔍 Search Table

Items per page: 20 ⌄

| | Master Item Name | Products | Location Coverage | Distribution Center Coverage | | Actions |
|---|---|---|---|---|---|---|
| ○ ⌄ | Broccoli Cheese Frozen ⊘ Unassigned | 3 | 4/4 | 2/2 | | ✏️ 🗑️ |
| | Priority  Product #   Description | | | | | |
| | 1   🔒 6076030   Soup Broccoli Cheese | | | | | |
| | 2   🔒 2582039   Soup Broccoli Cheese Gold Concentrate | | | | | |
| | 3   2582229   Soup Broccoli Cheese Concentrate | | | | | |
| ○ ⌄ | Dough Cookie Chocolate Chip ⊘ Unassigned | 1 | 4/4 | 2/2 | | ✏️ 🗑️ |
| ○ ⌄ | Soup Broccoli Cheese ⊘ Unassigned | 1 | 4/4 | 2/2 | | ✏️ 🗑️ |
| ○ ⌄ | Turkey Breasy Sliced Smoked 2/3oz ⊘ Unassigned | 2 | 4/4 | 2/2 | | ✏️ 🗑️ |
| ○ ⌄ | Wrap Spinach ⊘ Unassigned | 2 | 4/4 | 2/2 | | ✏️ 🗑️ |

Items per page: 20 ⌄

DSSI OGM3 | Master Order Guides | Order Guide Download | Restrictions | Alerts | Reports | 👤 OGM3 Demo Site ▾

Master Order Guides > Catering > Fuel, Canned Stem Wick ← Product Group

Prioritize Products

✏️ Fuel, Canned Stem Wick | 💾 Save Master Item ← Edit Product Group Name

Name of General Order Guide

3/4 Total Coverage

3 Products Selected

ADD PRODUCTS BY:
- 🔍 Search
- 📋 Product Number

DISPLAY OPTIONS
- Categories
- ☑ Expanded Descriptions

SELECTION RULE
Stocked, Demand, then Central ▾ ← Selection Rule

Selected Products

| Priority | Product # | Description | Brand | Pack/Size | UM | Price | Price Per Unit | Prop | Stocking | Coverage | Actions |
|---|---|---|---|---|---|---|---|---|---|---|---|
| › 1 | 6076030 | Fuel Canned Chafing Stem Wick | ACME | 24/6 HR | - | - | - | - | | 3/4 | 🗑 |
| › 2 | 2171926 | Fuel Canned Heat Stem Wick Leaving Soon | BLAMCO | 24/6 HR | - | - | - | ALL | | 2/4 | 🗑 |
| › 3 | 2351684 | Fuel Canned Chafing Wick Green | BLAMCO | 24/6 HR | - | - | - | - | Central | 3/4 | 🗑 |

🔖 Sage Suggests:

| Priority | Product # | Description | Brand | Pack/Size | UM | Price | Price Per Unit | Prop | Stocking | Coverage | Actions |
|---|---|---|---|---|---|---|---|---|---|---|---|
| › 1 | 4783678 | Fuel Canned Chafing Wick 4hr | ACME | 24/4 HR | - | - | - | - | Central | 4/4 (+1) | ➕ |
| › 2 | 2171944 | Fuel Canned Heat Handy Wick | BLAMCO | 24/2 HR | - | - | - | - | Central | 0/4 (+0) | ➕ |
| › 3 | 2212300 | Fuel Canned Heat Handy Wick Leaving Soon | BLAMCO | 24/6 HR | - | - | - | - | Central | 0/4 (+0) | ➕ ← Add to Product Group |

Suggested Alternatives

Facilities Covered / Increase in Coverage

FIG. 10F

DSSI OGM3 | Master Order Guides | Order Guide Download | Restrictions | Alerts | Reports     🙎 OGM3 Demo Site ▾

Master Order Guides > Catering > Fuel, Canned Stem Wick     — Product Group

🔍 Product Search     Product Group Search Field: [ FUEL, CANNED STEM W| 🔍 Search ]

Name of General Order Guide

3/4 Total Coverage

3 Products Selected

[ Save Selections ]     Prioritize

ADD PRODUCTS BY:
- ☑ Product #

REFINE BY:
- ○ Only Show Options with more (+) Coverage
- [ Refresh Results ]

DISPLAY OPTIONS:
- ☐ Categories
- ☑ Expanded Descriptions

SELECTION RULE: [ Stocked, Demand, then Central ▾ ] ← Selection Rule

Spec Item

| Product # | Description | Brand | Pack/Size | UM | Price | Price Per Unit | Prop | Stocking | Coverage |
|---|---|---|---|---|---|---|---|---|---|
| 4783496 | Fuel Canned Chafing Stem Wick | ACME | 24/6 HR | - | - | - | | | 3/4 (+1) |

Search Results

| | Product # | Description | Brand | Pack/Size | UM | Price | Price Per Unit | Prop | Stocking | Coverage |
|---|---|---|---|---|---|---|---|---|---|---|
| ☑ | 2351684 | Fuel Canned Stem Wick Green | BLAMCO | 24/6 HR | - | - | - | | | 1/4 (+1) |
| ☑ | 4783496 | Fuel Canned Chafing Stem Wick | ACME | 24/6 HR | - | - | - | | | 4/4 (+0) |
| ☑ | 2171926 | Fuel Canned Heat Stem Wick Leaving Soon | BLAMCO | 24/6 HR | - | - | - | All | | 0/4 (+0) |

Items per page: 20 ▾     1 of 1 ‹ 1 › ›

Facilities Covered     Increase in Coverage

FIG. 10F

DSSI MasterOrderGuides  OrderGuideDownload  Restrictions  Alerts  Reports  ● YourNet ˅

Alerts

VIEW ALERTS BY TYPE
○ Inactivated Products
◉ Coverage

| Master Item | Master Order Guide | Location Coverage | Distribution Center Coverage | Severity | Actions |
|---|---|---|---|---|---|
| Cereal | Breakfast Foods | 2/3 | 2/3 | High | Resolve |
| Juice Orange Cup | Breakfast Foods | 1/3 | 1/3 | High | Resolve |
| Divider Bars For Food Pans, 12¾" | Food Service | 0/1 | 0/1 | High | Resolve |
| Divider Bars For Food Pans, 20-7/8" | Food Service | 0/1 | 0/1 | High | Resolve |
| Divider Bar, Stainless Steel, 12½" | Medical Supplies | 0/1 | 0/1 | High | Resolve |
| Divider Bar, Stainless Steel, 20½" | Medical Supplies | 0/1 | 0/1 | High | Resolve |

FIG. 10I

Availability Summary

Blank - Product # is not available || D - Product # is a demand status item || R - Product # is a remotely stocked item
S - Product # is stocked || * - Product # selected by Order Management System
p - Product # is marked as proprietary

| Master Order Guide Name | Covered DC Count | Product Group Name | Selection Rule | Priority | Product # | DSSI Description (expanded) | First Level | First Level Category Name | Brand | Pack/Size |
|---|---|---|---|---|---|---|---|---|---|---|
| Catering | 4 | Serving Spoon Black | Stocked, demand, then central | 3 | 7404748 | SPOON SERVING SOLID 13 | 10 | SUPP & EQUIP | WINCO | 1/13" |
| Catering | 4 | Serving Spoon Black | Stocked, demand, then central | 2 | 8064271 | SPOON PERF SERVING HI-HEAT BLK | 10 | 10043085084 | CARLISL | 1/13" |
| Catering | 4 | Serving Spoon Black | Stocked, demand, then central | 1 | 8064263 | SPOON PERF SERVING HI-HEAT BLK | 10 | SUPP & EQUIP | CARLISL | 1/13" |

| | ALBANY 025 | ALBANY 049 | ARIZONA 029 | ARKANSAS 002 | ATLANTA 018 | BARABOO 049 | CENT. ALABAMA 004 | CENT. CALIF. 022 | CENT. FLORIDA 194 | CENT. ILLINOIS 051 | CENT. PENN. 013 | CENT. TEXAS 048 | CHARLOTTE 024 | CHICAGO 019 | CINCINNATI 015 | CLEVELAND 137 | COLU... 050 |
|---|---|---|---|---|---|---|---|---|---|---|---|---|---|---|---|---|---|
| | * | R | R | R | R* | R | R | R | R | R | | R | R | R | R | R | |
| | | | R* | S | | | | | | | S | | | | | | |
| | | R* | | S | | | | | Sp | | | | | | | | |

FIG. 10J

| | Original | Alternative 1 | Alternative 2 | Alternative 3 |
|---|---|---|---|---|
| | Ready-To-Use Restroom Disinfectant Cleaner By Manufacturer A | Ultra-P Instrument Cleaner By Manufacturer B | Cleaner Degreaser Disinfectant By Manufacturer C | Phenomenal Citrus Disinfectant Deodorant By Manufacturer D |
| MRSA Disinfectant | Yes | Yes | No | Yes |
| VRE Disinfectant | Yes | No | Yes | Yes |
| Unit of Measure | Case of 12 | Case of 4 | Each | Case of 10 |
| Pack Size | 33.8oz Bottle | Gallon | 12oz Bottle | 33.8oz Bottle |
| Rating | ★★★☆ | ★★☆☆ | ★★★☆ | ★★★★☆ |
| Price | $328.68 (0.81/oz) | $409.60 (0.80/oz) | $15.84 (1.32/oz) | $275.83 (0.80/oz) |
| Delivery | Spray | Pour | Spray | Spray |

FIG. 10K

SYSTEMS, METHODS, AND MEDIA FOR HARMONIZING PROCUREMENT ACROSS DISTRIBUTION NETWORKS WITH HETEROGENEOUS PRODUCT AVAILABILITY

CROSS-REFERENCE TO RELATED APPLICATIONS

This application is a continuation of U.S. patent application Ser. No. 16/279,690, filed Feb. 19, 2019, which is hereby incorporated by reference herein in its entirety for all purposes.

BACKGROUND

Many organizations frequently purchase or repurchase the same products, such as food, linens, janitorial supplies, medical supplies, maintenance, repair, and operating items (MRO), and the like. In an effort to manage brand requirements (e.g., a breakfast menu for a hotel associated with a particular brand), regulatory requirements (e.g., specific medical supplies required to perform a treatment, dietary requirements for school meal programs), control costs, manage the delivery process, and assure the consistency of supply and quality of such products, an organization may establish a relationship with one or more distributors for such products. For example, a distributor can purchase products from one or more suppliers (e.g., manufacturers, wholesalers, other distributors, farms, and the like) on favorable terms due to the large number of products that the distributor has contracted to purchase on a regular basis. In turn, the distributor may offer relatively favorable terms to institutional customers that contract to repeatedly purchase the same or similar products. As such a customer can be a source of stable revenue. An alternative to such an arrangement is for the organization to attempt to purchase products directly from suppliers, but this can raise the organization's transaction costs, and the organization would be unlikely to have the leverage to negotiate the same terms as the distributor due to the much smaller volumes the organization purchases. Another alternative is for the organization to purchase products from other intermediaries, such as wholesalers, or retailers. However, such intermediaries often offer too limited of a range of products (e.g., in the case of wholesalers) and/or charge relatively higher prices than a distributor (e.g., in the case of retailers). While such alternative arrangements may be workable for some organizations, such as organizations with a small number of ordering locations or a limited geographic scope, such alternative arrangements may not be workable for more complex organizations with large numbers of ordering locations and/or a large geographic scope. For example, such a complex organization may find the transaction costs associated with achieving the consistency in purchasing products to meet the brand requirements, operating requirements, supply requirements, regulatory requirements, and/or quality requirements under which the organization operates to be prohibitively high.

While a distributor can act as a single point of sale for a broad range of products and potentially distribute products from multiple locations, the products offered by the distributor can vary widely from place to place, or time to time. This can be especially true for perishable goods such as produce, dairy, baked goods, and the like, where suppliers often have a logistics-limited ability to provide a product while also meeting quality, cost, and/or temporal objectives simultaneously. This can make it more difficult for an organization with multiple facilities spread over a relatively wide area to order from the distributor, or even a single facility can struggle when product offering fluctuate or become unpredictably unavailable. For example, while the organization may require the same items in each order, the distributor may not have the same item available in each region servicing those facilities. Accordingly, the organization cannot simply place a single order and always know that it will receive the exact product or request that an order covering multiple facilities be fulfilled for each facility due to such regional and/or temporal variations. Additionally, an organization would often need to identify valid substitutes that meet the item requirements and specifications for every item that cannot be purchased and delivered consistently across their entire organization. This can increase the administrative burden of an organization interacting with the distributor. For example, rather than a single part of the organization being responsible for interacting with the distributor, organizations may let each facility take on responsibility for ordering supplies for itself subject to standards set by the parent organization. Aside from the inefficiency of having multiple parts of the organization performing the same task, this can also have other undesirable consequences. In the case of a single facility, employees may be required to monitor and reconcile orders or anticipated orders based on product availability, which can require, in some cases, hours of analysis and reconciliation daily. For example, the organization's ability to enforce purchase contracts and rebates may be significantly impaired by a lack of systems and procedures to enforce purchase commitments and collect data to submit for contract purchase rebates.

As one example, the organization may be a member of a group purchasing organization (GPO), which can represent a group of similar organizations (e.g., hospitals, hotels, schools, and the like) to provide increased negotiating leverage. Such a GPO can negotiate with distributors and/or suppliers for lower prices, discounts, rebates, and the like, for its members. While the organization itself is likely aware of this relationship with the GPO, each facility may not be, and therefore may not take advantage of the prices, discounts, and/or rebates negotiated by the GPO. This can result in some facilities having unnecessarily high costs. Similarly, the organization can directly negotiate with a distributor and/or supplier for a price reduction or discount on a particular product, but individual facilities may not be aware of such negotiations. For example, the organization can establish an order guide with a distributor that includes a number of preferred items, which can in some cases be ordered at reduced prices. However, individuals placing the orders for items may not be aware of the order guide. As another example, the organization can interact with a supplier (e.g., a producer of condiments) to negotiate a rebate when a sufficient quantity of that supplier's product is purchased. In such an example, the organization may intend to exclusively order products produced by that supplier, but individuals actually responsible for ordering items for each facility may not be aware of the organization's intentions. Even if the individual is aware of the intent, the individual may not recognize why the organization is requesting that they order that supplier's products, especially if the individual ordinarily orders the same type of item that is produced by a different supplier. The sorts of difficulties described above can make it difficult or impossible for an organization to enforce its business model objectives on purchase contract compliance, which can lead to the organization failing to achieve the cost and operating efficiencies it desires.

These situations represent only a handful of the challenges that purchasers, facilities management, and other individuals involved in procurement confront regularly. Across a broad spectrum of industry segments, from food service, to healthcare, to hospitality, to education, to entertainment, the challenges within each industry share many of the above-described general complexities and challenges, and then layer on additional complexities that are specific to the industry. For example, in healthcare food service, it may be necessary to manage nutritional requirements in addition to general product type, availability, and cost. Thus, when layering all of these requirements, from the financial, to the geographical, to the nutritional, to patient care, the process of purchasing, reconciling, and substituting purchases can become extremely cumbersome, if not impossible when time and cost constraints are considered.

Accordingly, new systems, methods, and media for harmonizing procurement across distribution networks with heterogeneous product availability are desirable.

SUMMARY

In accordance with some embodiments of the disclosed subject matter, systems, methods, and media for harmonizing procurement across distribution networks with heterogeneous product availability are provided.

In accordance with some embodiments of the disclosed subject matter, a method for automatically generating an order guide for a facility associated with an organization is provided, the method comprising: receiving a request to present items available in at least a first portion and a second portion of a distribution network that includes one or more distributors, wherein the organization is associated with at least the first portion of the distribution network and the second portion of the distribution network; causing a user interface to be presented that includes a plurality of items available from at least one of the one or more distributors included in the distribution network; receiving a request to create a general order guide; receiving, via the user interface, a request to add a first item that is available from at least one of the one or more distributors to the general order guide; determining that the first item is not available in the first portion of the distribution network; identifying at least one potential substitute for the first item, wherein the at least one potential substitute includes a second item; determining that the second item is available in the first portion of the distribution network; receiving a request to generate a facility order guide based on the general order guide, wherein the facility order guide is to include items available in the first portion of the distribution network; based on the determination that the first item is not available in the first portion of the distribution network and based on a priority associated with the second item, automatically selecting the second item for inclusion in the facility order guide in lieu of the first item; and causing the facility order guide to be associated with the facility for use when creating an order for one or more items to be delivered to the facility by the distributor.

In some embodiments, the method further comprises: receiving identifying information of the organization and organization metadata; and associating the organization with at least one portion of the distribution network based on at least one of the identifying information and the organization metadata.

In some embodiments, the first portion of the distribution network corresponds to a first geographic area, and the second portion of the distribution network corresponds to a second geographic area that is different than the first geographic area.

In some embodiments, the distribution network comprises a plurality of distribution centers, each of the plurality of distribution centers is associated with a distributor included in the one or more distributors, and the first geographic area is associated with no more than a single distribution center associated with any one distributor of the one or more distributors.

In some embodiments, the distribution network comprises a plurality of distribution centers that is each associated with a distributor of the one or more distributors, and the first geographic area is associated with a subset of distribution centers of the plurality of distribution centers.

In some embodiments, the distribution network comprises a plurality of distribution centers that is each associated with a distributor of the one or more distributors, and at least one of the plurality of distribution centers is associated with both the first geographic area and the second geographic area.

In some embodiments, the facility is located within the first geographic area, and wherein the organization is associated with a second facility that is located within the second geographic area, and wherein determining that the first item is not available from the distributor in the first portion of the distribution network comprises determining that the first item is not available via a distribution center corresponding to the first geographic area.

In some embodiments, the method further comprises receiving a request to associate the general order guide with a group of facilities including the facility and the second facility.

In some embodiments, the method further comprises: in response to receiving the request to generate the facility order guide, determine that the first facility is associated with the group of facilities; in response to determining that the first facility is associated with the group of facilities, determining that the general order guide is associated with the group of facilities; and in response to determining that the general order guide is associated with the group of facilities, generating the facility order guide based on the general order guide.

In some embodiments, the method further comprises: determining that the general order guide is associated with a plurality of facilities including the facility, wherein at least one facility of the plurality of facilities is associated with the second portion of the distribution network; determining which of the plurality of facilities are covered for the first item, wherein a facility is covered for the first item when the first item is available in a portion of the distribution network associated with that facility; and causing a user interface element to be presented via the user interface, wherein the user interface element conveys information that is indicative of a proportion of the plurality of facilities covered for the first item.

In some embodiments, further comprises: causing identifying information of the second item to be presented via the user interface; determining which of the plurality of facilities are covered for the second item; and causing a second user interface element to be presented, via the user interface, that conveys information that is indicative of how many additional facilities of the plurality of facilities would be covered for at least one of the first item and the second item if the second item were designated as a substitute for the first item.

In some embodiments, the method further comprises: receiving a request to create a product group associated with the general order guide; receiving a request to add the first item to the product group; receiving a request to add the second item to the product group; and in response to the request to generate the facility order guide, causing at least one item from the product group to be selected for inclusion in the facility order guide.

In some embodiments, the method further comprises: receiving a request to create a second general order guide; receiving, via the user interface, a request to add a third item that is available in the distribution network to the second general order guide; receiving a request to associate the second general order guide with the facility; and automatically selecting the third item for inclusion in the facility order guide based on the association of the second general order guide with the facility.

In some embodiments, the method further comprises: receiving price information associated with the organization, wherein the price information includes prices for a multiplicity of items available in the distribution network including a price for the third item and a price for a fourth item; identifying at least one potential substitute for the third item; determining that the third item is available in the first portion of the distribution network; receiving order history information indicative of an amount of the third item ordered by a plurality of facilities associated with the organization over a particular period of time; determining potential savings based on a cost of purchasing an equivalent amount of the fourth item; causing the user interface to present the potential savings and a user interface element that is selectable to add the fourth item to the second general order guide; and receiving, via the user interface, a request to add the fourth item to the second general order guide in response to selection of the user interface element.

In some embodiments, identifying at least one potential substitute for the first item that is available in the first portion of the distribution network includes utilizing a trained model to identify the second item as being a potential substitute based on metadata associated with the first item and metadata associated with the second item.

In some embodiments, the method further comprises: causing the user interface to present the second item as a potential substitute for the first item; receiving feedback indicating that a request was received to add the second item to the general order guide subsequent to the second item being presented as a potential substitute for the first item; and updating the trained model based on the feedback such that the trained model is more likely to suggest the second item as a potential substitute for the first item.

In accordance with some embodiments of the disclosed subject matter, a system for automatically generating an order guide for a facility associated with an organization is provided, the system comprising: at least one hardware processor that is programmed to: receive a request to present items available in at least a first portion and a second portion of a distribution network that includes one or more distributors, wherein the organization is associated with at least the first portion of the distribution network and the second portion of the distribution network; cause a user interface to be presented that includes a plurality of items available from at least one of the one or more distributors included in the distribution network; receive a request to create a general order guide; receive, via the user interface, a request to add a first item that is available from at least one of the one or more distributors to the general order guide; determine that the first item is not available in the first portion of the distribution network; identify at least one potential substitute for the first item, wherein the at least one potential substitute includes a second item; determine that the second item is available in the first portion of the distribution network; receive a request to generate a facility order guide based on the general order guide, wherein the facility order guide is to include items available in the first portion of the distribution network; based on the determination that the first item is not available in the first portion of the distribution network and based on a priority associated with the second item, automatically select the second item for inclusion in the facility order guide in lieu of the first item; and cause the facility order guide to be associated with the facility for use when creating an order for one or more items to be delivered to the facility by the distributor.

In some embodiments, the system further comprises: a database comprising information about items available in the distribution network from the one or more distributors; wherein the at least one hardware processor that is further programmed to: submit a query to the database for information about the first item; and determine that the first item is not available in the first portion of the distribution network based on a response to the query.

In some embodiments, the distribution network comprises a plurality of distribution centers, each of the plurality of distribution centers is associated with a distributor of the one or more distributors, and the database comprises information indicative of which of the items available in the distribution network from the one or more distributors is covered by each distribution center of the plurality of distribution centers.

In some embodiments, the further comprises: a database comprising price information associated with the organization related to items available in the distribution network from the one or more distributors; wherein the at least one hardware processor that is further programmed to: receive updated price information associated with the organization, wherein the updated price information includes prices for a multiplicity of items available in the distribution network including a price for a third item and a price for a fourth item; update the database based on the updated price information; identify at least one potential substitute for the third item; determine that the third item is available in the first portion of the distribution network; receive order history information indicative of an amount of the third item ordered by a plurality of facilities associated with the organization over a particular period of time; determine potential savings based on a cost of purchasing an equivalent amount of the fourth item; cause the user interface to present the potential savings and a user interface element that is selectable to add the fourth item to a second general order guide; and receive, via the user interface, a request to add the fourth item to the second general order guide in response to selection of the user interface element.

In accordance with some embodiments of the disclosed subject matter, a non-transitory computer-readable medium is non-transitory computer readable medium containing computer executable instructions that, when executed by a processor, cause the processor to perform a method for automatically generating an order guide for a facility associated with an organization is provided, the method comprising: receiving a request to present items available in at least a first portion and a second portion of a distribution network that includes one or more distributors, wherein the organization is associated with at least the first portion of the distribution network and the second portion of the distribution network; causing a user interface to be presented that includes a plurality of items available from at least one of the one or more distributors included in the distribution network; receiving a request to create a general order guide; receiving, via the user interface, a request to add a first item that is available from at least one of the one or more distributors to the general order guide; determining that the first item is not available in the first portion of the distribution network; identifying at least one potential substitute for the first item, wherein the at least one potential substitute includes a second item; determining that the second item is available in the first portion of the distribution network; receiving a request to generate a facility order guide based on the general order guide, wherein the facility order guide is to include items available in the first portion of the distribution network; based on the determination that the first item is not available in the first portion of the distribution network and based on a priority associated with the second item, automatically selecting the second item for inclusion in the facility order guide in lieu of the first item; and causing the facility order guide to be associated with the facility for use when creating an order for one or more items to be delivered to the facility by the distributor.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 10A shows an example of a user interface presenting multiple general order guides associated with a user (e.g., a user associated with an organization) in accordance with some embodiments of the disclosed subject matter.

FIG. 10B shows an example of a user interface presenting multiple facilities that can be associated with a particular general order guide in accordance with some embodiments of the disclosed subject matter.

FIG. 10C shows an example of a user interface presenting coverage across facilities associated with a particular general order guide in accordance with some embodiments of the disclosed subject matter.

FIG. 10D shows an example of a user interface presenting an expanded view of a particular product group associated with a particular general order guide in accordance with some embodiments of the disclosed subject matter.

FIG. 10E shows an example of a user interface presenting details related to a particular product group and suggested alternatives to items included in the product group in accordance with some embodiments of the disclosed subject matter.

FIG. 10F shows an example of a user interface presenting details related to a particular product group and results of a user directed search in accordance with some embodiments of the disclosed subject matter.

FIG. 10I shows an example of a user interface presenting alerts related to incomplete coverage for particular product groups across several general order guides in accordance with some embodiments of the disclosed subject matter.

FIG. 10J shows an example of a report that can be generated to show details of several general order guides and coverage for product groups within those general order guides across various distribution centers in accordance with some embodiments of the disclosed subject matter.

FIG. 10K shows an example of a user interface presenting alternatives to a particular product in accordance with some embodiments of the disclosed subject matter.

DETAILED DESCRIPTION

Figure 1:
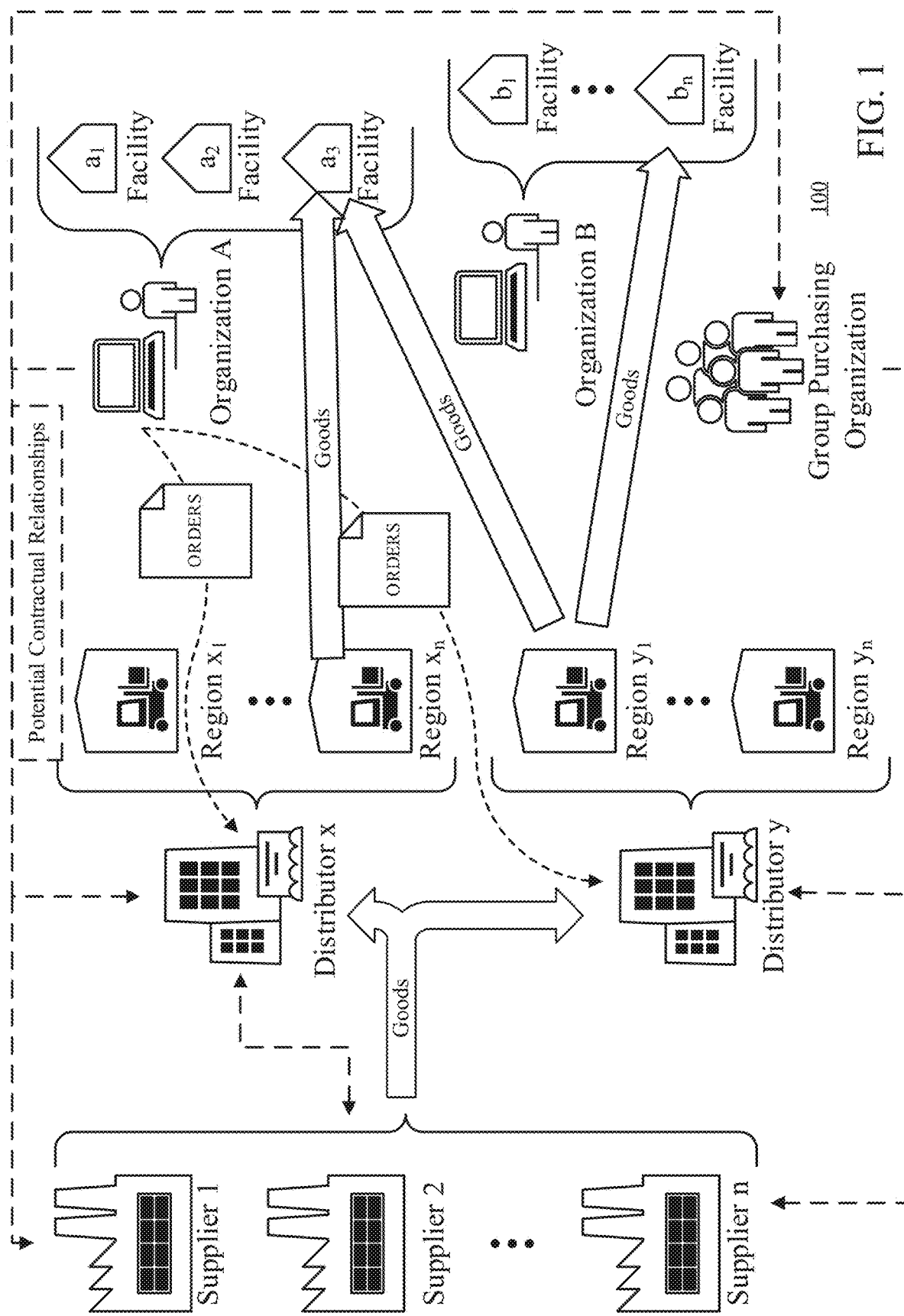
FIG. 1 shows an example of distribution networks connecting various suppliers and end users in which costs and product choice can be negotiated between any pair or more of parties associated with the distribution networks.

In accordance with various embodiments, mechanisms (which can, for example, include systems, methods, and media) for harmonizing procurement across distribution networks with heterogeneous product availability are provided.

In accordance with some embodiments, the mechanisms described herein can collect information about which products are available from a distributor across a distribution network, which may include geographical regions. For example, each distributor may utilize different data applications and/or data structures (e.g., database) to track information (e.g., products currently stocked) for different portions of the supplier and/or distributor's business. For example, different corporations, divisions, subsidiaries, and the like, associated with a particular supplier and/or distributor can be associated with different data applications and/or data structures. As another example, different distribution centers associated with a particular supplier and/or distributor can be associated with different data applications and/or data structures. As yet another example, different regions in which a supplier and/or distributor operates can be associated with different data applications and/or data structures. Each of the different data applications and/or data structures in the preceding examples may be represented in different ways and may include multiple databases configured by corporation, region, distribution center or some other database structure. In some embodiments, the mechanisms described herein can collect information associated with products stocked or otherwise available via different portions (e.g., nodes, distribution centers, warehouses) of a distribution network. The mechanisms described herein can accept a wide range of information from the organization and manage orders across different portions of a distribution network, availability, geography, time constraints, cost preferences, contractual relationships, and the like to automatically manage orders, even without or with minimized manual interaction.

In some embodiments, the mechanisms described herein can interact with an organization (e.g., via a user) to gather information about the organization's facilities and/or contractual relationships with group purchasing organizations, suppliers, and/or one or more distributors. For example, the user can provide the mechanisms described herein with information about each facility that is to be supplied via a particular distributor, such as the facilities location. Note that the term facility as used herein is intended to be non-limiting. For example, while a facility can refer to a structure or a place, such as a single building, it can also refer to a portion of a building, a group of multiple buildings that may or may not be located near each other, a campus, a vehicle (e.g., a "food truck," a mobile home, or the like). Additionally, facility as used herein can refer to non-places, such as a juristic entity (e.g., a corporation, a foundation, a government agency, or the like), or a natural person. Specific examples of a facility can include a healthcare facility (e.g., a hospital, an outpatient clinic, a standalone emergency facility, a standalone hospice facility, a hospital campus, a specific building on a hospital campus, a hospital cafeteria, or the like), an elder care facility (e.g., an assisted living facility, an independent living facility, a nursing home, or the like), an educational facility (e.g., a school, a university campus, a building on a university campus, a cafeteria on a university campus which may be located within a different facility such as a dorm, or the like), a corporation, a corporate campus, a government agency, a government building, a group of government buildings, a restaurant, a chain of restaurants, a particular vehicle (e.g., cart, truck) used to delivery and/or vend a product (e.g., prepared food), a home, a portion of a home (e.g., a home office). Another example of a facility can be anything that has an address or that is located at a particular place or places. Yet another example of a facility can be anything that is affiliated with an organization, and that independently orders products via the affiliation with the organization.

In some embodiments, the mechanisms described herein can provide a user interface that a user can access to view a full list of products available from a distributor across the distribution network (e.g., such as the regions in which the organization has a facility). For example, the organization may be a provider of elder care services with elder care facilities in various locations. If the organization is a customer of a particular food distributor with distribution nodes in various regions, the organization may have facilities in more than one of these regions. In such an example, the mechanisms described herein can collect information about food items available from the food distributor across the various super-regional, regional, and/or local distribution subnetworks, and provide a user interface that allows a user associated with the organization to view the products available across at least all of the regions in which a facility associated with the organization is located.

In some embodiments, the mechanisms described herein can receive one or more selections of items to include in an order guide associated with the organization (sometimes referred to herein as a general order guide), and an indication of one or more facilities to associate with the order guide. In some embodiments, a user can cause the mechanisms described herein to automatically create one or more order guides that can be used to place one or more orders based on the general order guide(s) associated with each facility. For example, if a first facility and a second facility are associated with a first general order guide that includes a list of items, the mechanisms described herein can generate a facility-specific order guide for the first facility based on the first general order guide, and a facility-specific order guide for the second facility that is also based on the first general order guide. Note that order guide as used herein is intended to be non-limiting. For example, an order guide can refer to a collection of products, product groups, master items, items, services, deliverables, and/or any other thing(s) that may be the subject of procurement activities. In such an example, the order guide can be used (e.g., by an organization, facility, distributor, supplier, individual, and/or a user associated therewith) to facilitate procurement activities. As another example, a catalog that includes various products and/or services that can be ordered can be considered an order guide.

In some embodiments, the mechanisms described herein can receive one or more selections of items to include in a list of acceptable alternatives. For example, a user can select an equivalent item from multiple different brands as being acceptable alternatives. In some embodiments, such a list can be associated with one or more order guides such that, when the mechanisms described herein create a facility-specific order guide for a particular facility, the mechanisms can automatically select an alternative for an item that is not available in a particular region (e.g., because the item is discontinued, because the item is out of stock, because the item is superseded, because the item is not available in that region, and the like).

In some embodiments, the mechanisms described herein can automatically suggest acceptable alternatives when an item selected by a user is not available across all nodes of the distribution network(s) utilized by the user. For example, if a user selects a first item for inclusion in an order guide, the mechanisms described herein can determine that the first item is not available in at least one portion of the distribution network that is preferable for one or more facilities in the organization. In such an example, the mechanisms described herein can present one or more similar items that are available via a node through which the first item is not available as a potential alternative. In some embodiments, the mechanisms described herein can periodically identify similar items, such that the items can be presented as potential alternatives.

In some embodiments, the mechanisms described herein can automatically suggest opportunities for significant savings based on information about an organization and information about the items selected and/or ordered by the organization. For example, in some embodiments, the mechanisms described herein can identify a less-costly potential alternative to an item that an organization is planning on ordering, and can calculate an estimated annual savings by switching the order to the alternative.

In some embodiments, the mechanisms described herein can provide a system and/or service that can be used by an organization to track inventory associated with various facilities and/or provide a user interface for ordering items that are needed at a particular facility. For example, mechanisms described herein can provide a system and/or service that can be used by an organization to track where items are stored in a particular facility. As another example, mechanisms described herein can provide a system and/or service that can be used by an organization to track when various items (especially perishable items) were received. As yet another example, mechanisms described herein can provide a system and/or service that can be used by an organization to suggest which items to use next (e.g., based on when the item was received, a sell-by date associated with the item, a shelf life associated with the item, or the like). In some embodiments, the mechanisms described herein can provide a system and/or service that can be used by an organization to designate an item that is running low as an item that needs to be ordered. In some embodiments, the mechanisms described herein can provide a system and/or service that can be used by an organization to identify items under voluntary recall and/or under recall by a regulatory body, such as the Federal Food and Drug Administration (FDA), and identify items that should not or cannot be used. For example, the mechanisms described herein can identify when a regulator body (e.g., the FDA) and/or one or more organizations regulated by such a body (e.g., food producers) recalls products from the marketplace, such as in response to the product under recall being mislabeled, when a food product may present a health hazard to consumers because the food is contaminated or has caused a foodborne illness outbreak.

FIG. 1 shows an example 100 of distribution networks connecting various suppliers and end users in which costs and product choice can be negotiated between any pair or more of parties associated with the distribution networks. As shown in FIG. 1, many parties can be involved in distributing goods (e.g., food, medical supplies, janitorial supplies, household goods, and the like) from suppliers to organizations that use the goods. For example, one or more distributors can purchase goods from various suppliers with the intent of distributing the goods through regional distribution centers (e.g., warehouses or networks of warehouses in various geographical locations). In such an example, a distributor can negotiate with each supplier regarding the price that the distributor will pay to the supplier, how much of a particular item the distributor will order, how the goods will be transported from the supplier to the distributor, and/or any other terms related to the procurement by the distributor of products from the supplier. Due to the relatively large volumes that distributors are often willing to order from a supplier, the distributor may be able to secure a discounted price compared to what an end user would pay to a retailer offering the same product(s).

In many cases, some goods may be available from a particular supplier in one sales channel or region, but not in another. For example, suppliers of perishable food may only offer certain foods in a geographically limited territory due to the relatively short shelf life of the product. In such an example, a distributor may have to establish relationships with different suppliers for the same items in different places, which may overlap (e.g., item one may be offered by supplier one in a first region, and an equivalent of item one may be offered by supplier two in a second region that overlaps the first region in certain areas). These regions may also overlap with the regions in which the distributor has established distribution centers. Accordingly, to insure that customers of the distributor can order at least one item or its equivalent from another supplier, the distributor may purchase the items from both suppliers, and stock them where they are available. In such an example, some distribution centers may stock the first item, other distribution centers may stock the second item, and yet other distribution centers may stock the first item and the second item. As another example, a distributor that operates in multiple countries may be unable to stock a particular item from a first supplier in each country in which it operates (e.g., due to transportation costs, regulations, and the like), and accordingly may purchase equivalent items from multiple suppliers in various countries or regions.

A distributor establishes networks of distribution centers in order to provide products purchased from suppliers to the distributor's customers. In many cases, the customer may be an organization that operates across more than one of the regions served by the distributor. For example, a health care provider may operate a network of facilities in many different geographic regions. In a more particular example, the health care provider may establish elder care facilities in various metropolitan areas across several states.

Such organizations can establish relationships with a distributor to, among other things, reduce costs. For example, an organization can establish a relationship with a food distributor to supply ingredients and/or ready to eat food to all of the organization's facilities. By ordering relatively large quantities, the organization can receive a relatively low price. Additionally, the distributor can provide logistical support in coordinating delivery of food to the various different facilities. However, the organization still needs to interface with the distributor to order the food that is needed by each facility, which can be a significant administrative task that can be complicated due to different facilities having different needs, or being located in different regions such that the same items cannot be supplied by the distributor to all of the facilities.

As shown in FIG. 1, an organization can have a relationship with a group purchasing organization (GPO) that can negotiate with multiple other parties, such as distributors and/or suppliers on behalf of the member organizations of the GPO. For example, a GPO can negotiate with a supplier for a coupon or rebate that member organizations can use to lower the cost of purchasing that supplier's products. As another example, a GPO can negotiate with a distributor for a discount that that member organizations can use to lower the cost of purchasing items through that distributor.

In some cases, a GPO can be responsible for tracking volumes ordered by members (e.g., organizations) of the GPO, and distribute rebates, earnings, and/or dividends based on the ordering volumes. For example, a GPO can receive funds from distributors and/or suppliers (e.g., in the form of fees, or rebates) on behalf of members, and can distribute the funds based on orders placed by the member organizations. Additionally, in some cases, GPOs that are classified as purchasing cooperatives can distribute funds as dividends to member organizations. For example, to accurately calculate rebates and funds distributions the GPO often must use reporting and discovery mechanisms (e.g., processes and/or systems) to determine items and quantities ordered by each organization, and when the items were ordered. Additionally, a GPO can use multiple mechanisms to obtain information about the purchasing behaviors of its member organizations to identify contracting and cost reduction opportunities. Should the GPO have visibility to items for which the GPO has not negotiated a contract with a distributor, but has sufficient qualities to be included in a contract negotiation, the GPO can negotiate a contract for that product to the potential advantage of the GPO's members that already purchase or wish to purchase that product.

Many distributors provide a platform that allows customers to track and submit orders electronically. One or more users (in some cases with the assistance of one or more automated services) associated with an organization can submit orders to a distributor for various facilities associated with the facility.

Figure 2:
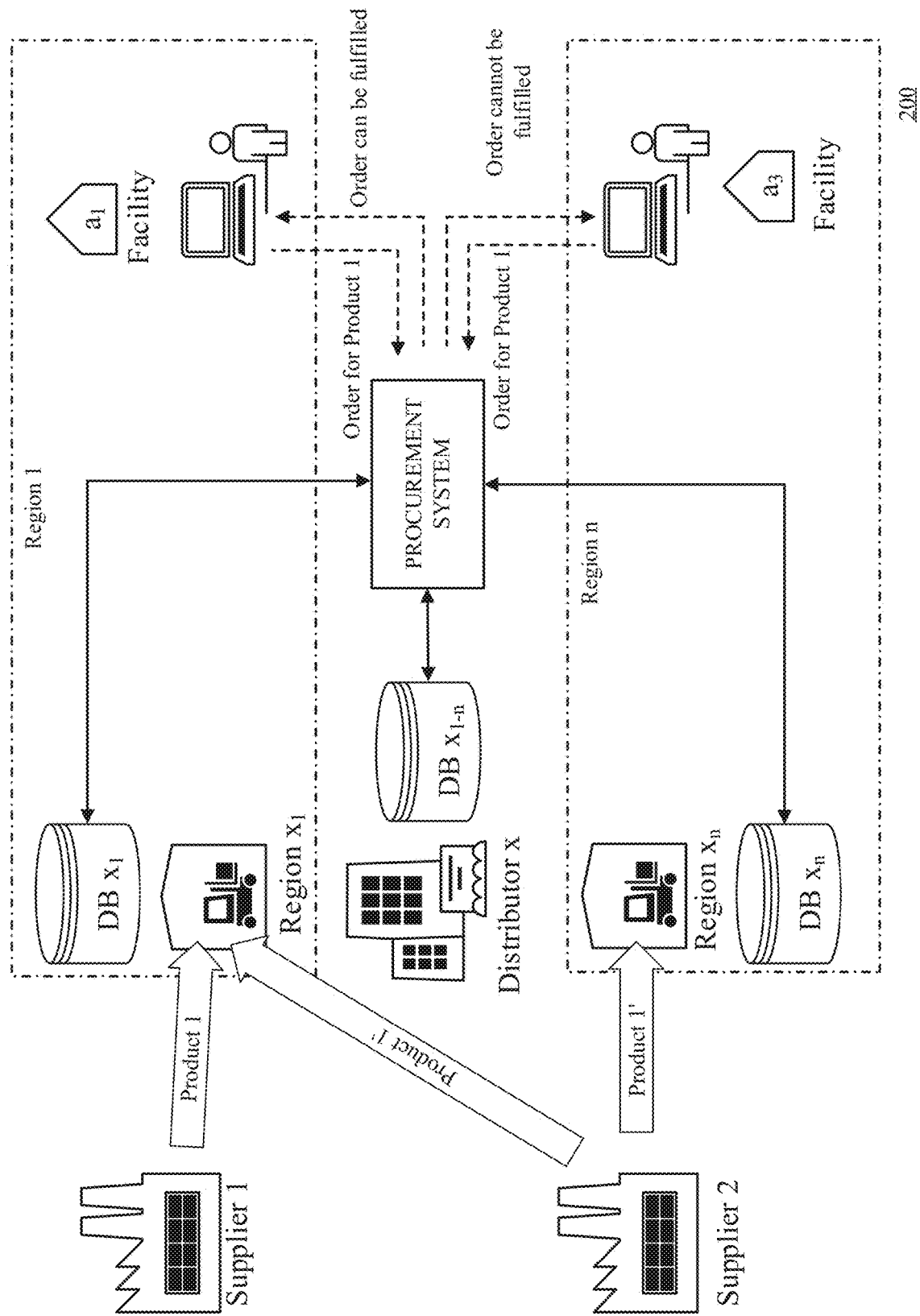
FIG. 2 shows an example of paths along a distribution network from two suppliers to a single end user associated with multiple facilities in different geographic regions and the potential for a lack of availability across regions that can cause inconsistency in products that are delivered to the various facilities.

FIG. 2 shows an example 200 of paths along a distribution network from two suppliers to a single end user associated with multiple facilities in different geographic regions and the potential for a lack of availability across regions that can cause inconsistency in products that are delivered to the various facilities. As shown in FIG. 2, an organization (e.g., "Organization A" in FIG. 2) can order the same item (e.g., "Product 1") from the same distributor for different facilities, but if those facilities are aligned with different portions of the distributors network (e.g., "Region 1" and "Region n," respectively) the product may be available in one portion of the network, but not the other. In such an example, an alternative to the item may be available (e.g., "Product 1'") that originated from a different supplier. However, this may not be clear to the user(s) placing orders for the organization. For example, the user may be restricted to viewing items available in only one region at a time, or the region(s) in which the item(s) are available may not be clear from the user interface. In such an example, a user may create an order for one facility and attempt to use that order as a template for creating orders for other similar facilities, only to find out that one or more items ordered for the first facility are not available for delivery to the other facilities. Consequently, if the organization attempts to order the item for both facilities (e.g., because the item fits a need, because the item is discounted, or the like), the distributor may not be able to fulfill the order in the second region, or fulfillment may be delayed by routing the ordered item from the first region to the second region. In some cases, the distributor may inform the user that the ordered item is not available for delivery or delivery may be delayed to the facility in the second region, and the user may initiate ordering a different item. However, it may be difficult for the user to identify an acceptable alternative to the originally ordered item, for example if the item was selected to fulfill nutritional requirements it may not be apparent which other items similarly fulfill those nutritional requirements. In some cases, a user associated with each facility (e.g., a facility manager, a kitchen manager, a supply manager, or the like) may use a procurement system to place an order with a distributor, and the procurement system can interface with a system (e.g., a database) or systems maintained by the distributor. When a user places an order for a particular item for a particular facility, the procurement system can interact with the distributers system(s) to determine whether the item is available in the distribution center serving the facility. For example, the procurement system can query a database that the distributor maintains that has information on currently available products in each region. As another example, the procurement system can query a database that the distributor maintains that has information on currently available products in a particular region (e.g., DB $x_1$). As yet another example, the procurement system can use information most recently received from the distributor (e.g., in a nightly data dump) to generate an order, and upon receiving the order the distributor can determine whether each item in the order is currently available in the region that serves the facility associated with the order. In such an example, after an order is submitted it may be rejected, and the user may be required to modify the order to add a different item (e.g., by conducting a user-directed search for an alternative).

In some cases, some organizations may not encounter such a situation. For example, an organization may designate an employee at each facility (e.g., a kitchen manager at an elder care facility) to determine what is required and place orders with the distributor. In such an example, because a user at each facility is independently determining what to order and placing orders with the distributor, it is unlikely that the user will order something that is not available in that region. However, while distributing the responsibility of ordering can help avoid ordering unavailable items, it can also increase costs and produce inefficiencies.

Note that although not shown, a supplier can also be associated with its own distribution network that facilitates delivery more directly between the supplier and end users in addition to, or in lieu of, being part of a distribution network associated with a distributor. For example, a supplier can act as both a supplier and a distributor. As another example, a distributor can act as a supplier, by manufacturing (e.g., either directly or by contracting with a manufacturer) items for distribution via its own and/or other distributor's distribution networks. In some embodiments, the mechanisms described herein can be used to generate order guides that include items available from one or more distributors, and/or directly from a supplier via a distribution network associated with the supplier.

Figure 3A:
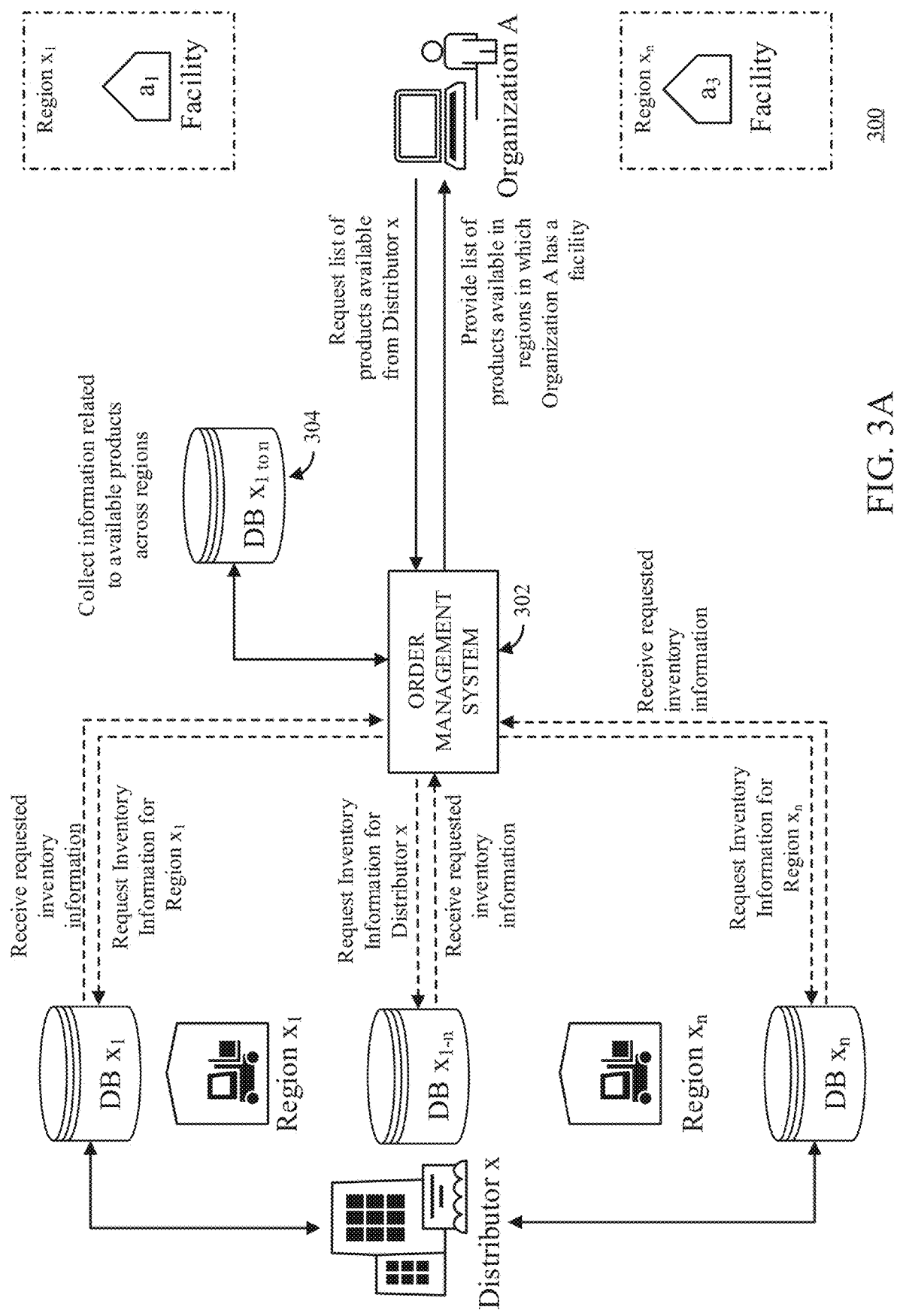
FIG. 3A shows an example of a portion of a distribution network connecting various suppliers to a single end user associated with multiple facilities in different geographic regions via a single distributor associated with a system for harmonizing procurement across distribution networks with heterogeneous product availability implemented in accordance with some embodiments of the disclosed subject matter.

FIG. 3A shows an example 300 of a portion of a distribution network connecting various suppliers to a single end user associated with multiple facilities in different geographic regions via a single distributor associated with a system for harmonizing procurement across distribution networks with heterogeneous product availability implemented in accordance with some embodiments of the disclosed subject matter. Notably, the constraint of "geographical region" is but one non-limiting example of a constraint related to a path in a distribution network or order and many others may be substituted or layered. As shown in FIG. 3A, in some embodiments, mechanisms described herein can be used to present a user with all products that are available across regions in which an organization has a facility. As shown in FIG. 3A, in some embodiments, an order management system 302 can collect information about the products that are stocked and/or are generally available in each region in which a distributer operates. In some embodiments, order management system 302 can query the database (or databases) for information about inventory currently available in one or more regions, and can collect the information into a database 304.

In some embodiments, a user (e.g., associated with organization A) can access the information in database 304 via an application and/or service that is configured to interact with database 304. For example, the user can access an application and/or service via a computing device.

In some embodiments, the user can request a list of products available from a distributor associated with database 304 by causing a computing device to send a request to order management system 302. Order management system 302 can determine, based on information about the organization, which items to present (e.g., all items available, only items available within regions in which a facility is located, and the like).

In some embodiments, order management system 302 can be configured to sort, search, filter, and the like, items available from the distributor to assist a user in identifying items that meet the organization's needs. Note that although FIG. 3A illustrates an example where information is gathered across various regions associated with a single distributor, the mechanisms described herein can also be used to provide an interface with multiple distributors, which may or may not have overlapping inventory. For example, an organization may have many facilities that are served by one distributor, but may have one or more facilities that are not served by the distributor. In such an example, the organization may need to find a different distributor to source goods to such facilities. In some embodiments, the mechanisms described herein can collect information from multiple distributors to facilitate more efficient order management across all of an organization's facilities. Additionally, even when a facility is served by both facilities, there may be differences in price or inventory that would make it advantageous to place orders with both distributors. In some embodiments, the mechanisms described herein can automatically place orders with different distributors for a single facility based on product availability, price, and/or any other suitable factors.

Figure 3B:
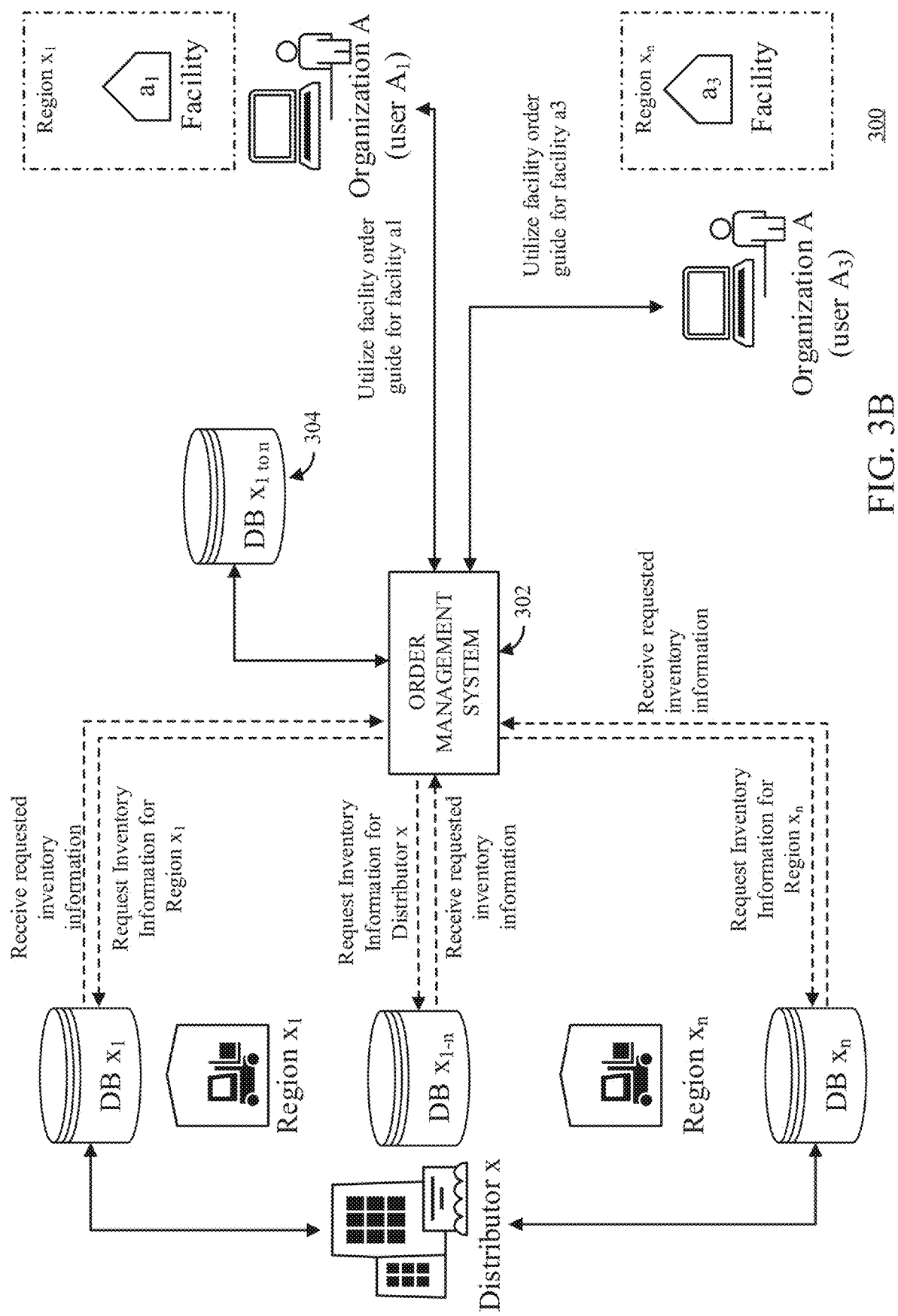
FIG. 3B shows an example of a portion of a distribution network connecting various suppliers to multiple facilities in different geographic regions via a single distributor associated with a system for harmonizing procurement across distribution networks with heterogeneous product availability implemented in accordance with some embodiments of the disclosed subject matter.

FIG. 3B shows an example of a portion of a distribution network connecting various suppliers to multiple facilities in different geographic regions via a single distributor associated with a system for harmonizing procurement across distribution networks with heterogeneous product availability implemented in accordance with some embodiments of the disclosed subject matter. As shown in FIG. 3B, users associated with individual facilities (e.g., user $A_1$) of the organization can interact with order management system 302 to utilize a facility order guide that is based on one or more general order guides assigned to the facility, and the portion of the distribution network(s) in which the facility is located (e.g., region $x_1$). For example, user $A_1$ can download a facility order guide from order management system 302. As another example, user $A_1$ can request the facility order guide via another application (e.g., a procurement application), and order management system 302 can provide the requested facility order guide to a computing device associated with the application.

Figure 4:
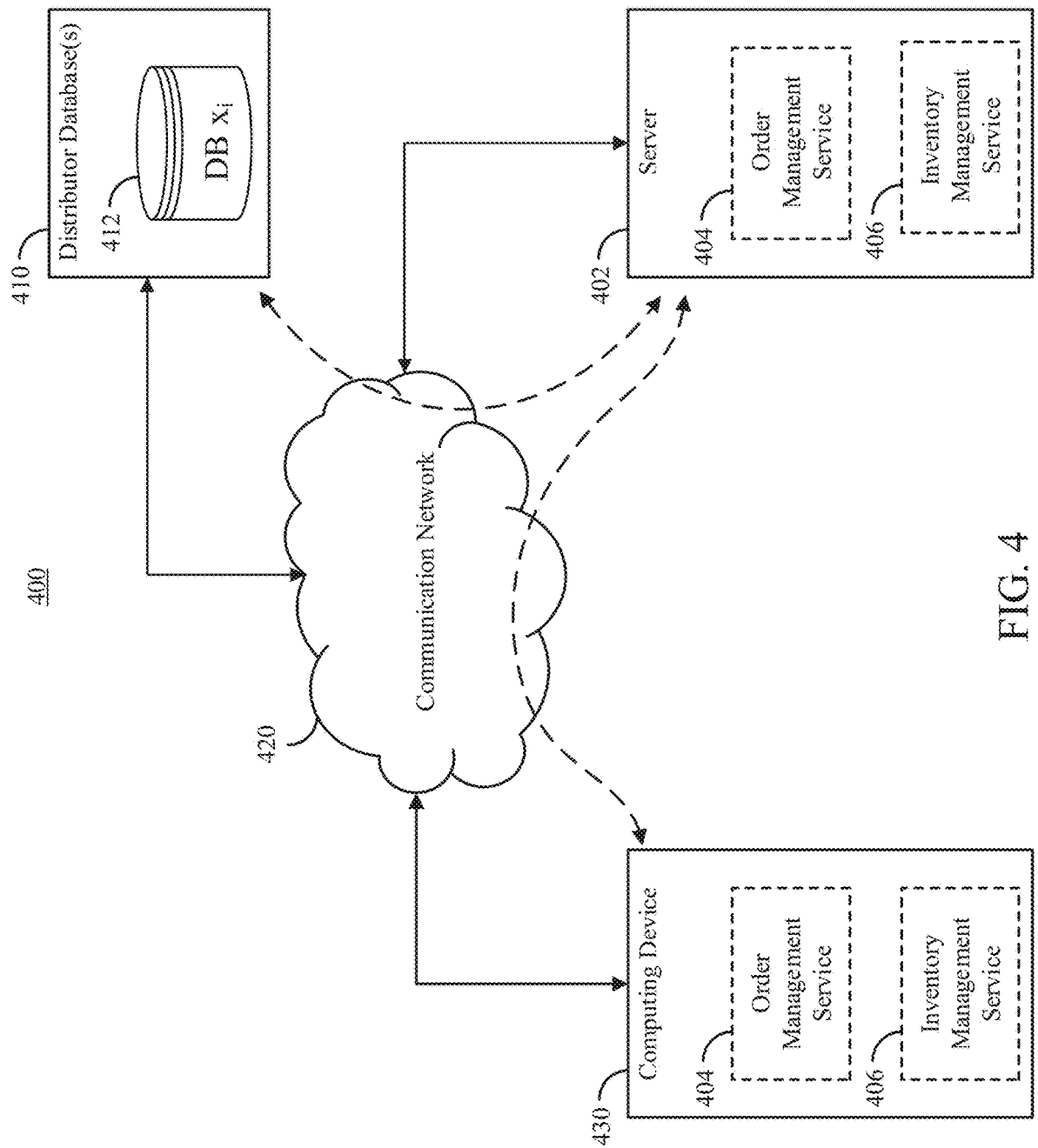
FIG. 4 shows an example of a system for harmonizing procurement across distribution networks with heterogeneous product availability in accordance with some embodiments of the disclosed subject matter.

FIG. 4 shows an example 400 of a system for harmonizing procurement across distribution networks with heterogeneous product availability in accordance with some embodiments of the disclosed subject matter. As shown in FIG. 4, a server (or other processing unit) 402 can execute one or more applications to provide access to an order management service 404 and/or an inventory management service 406. In some embodiments, order management service 404 can facilitate creation of one or more order guides (e.g., general order guides associated with the organization), association of an order guide with one or more facilities, creation of one or more facility-specific order guides based on any general order guides associated with the facility, creation of master lists, and/or order placement. Note that in some embodiments, order placement functionality can be provided via one or more other services and/or applications. For example, order placement can be performed using a procurement service that is configured to receive an order guide (e.g., a general order guide, a facility-specific order guide, or the like). Additionally, in some embodiments, order management service 404 can identify similar products that may be alternatives to each other, both within a particular subnetwork of the distribution network and across different portions of the distribution network (e.g., delineated by geographical regions), and can provide suggestions of acceptable alternative items. In some embodiments, inventory management service 406 can assist an organization in the management of inventory in one or more of its facilities. For example, inventory management service 406 can be used in connection with a mobile computing device and one or more devices that emit a signal that can be used to determine a location of the mobile device. When items are stored, a user (e.g., a person delivering items, an employee of the facility, and the like) can provide an input indicating that a particular item is being stored, and inventory management service 406 can determine and record a location at which the particular item is being stored, such that when the item is needed a user can query inventory management service 406 to determine where the item can be retrieved.

In some embodiments, server 402, order management service 404, and/or inventory management service 406 can receive requests for information, queries, selections of items, user input, and/or any other suitable data, over a communication network 420. In some embodiments, such information can be received from any suitable computing device, such as computing device 430. For example, computing device 430 can receive user input through an application being executed by computing device 430, such as through an input device (e.g., a keyboard, mouse, microphone, touchscreen, and the like). In such an example, computing device 430 can communicate information over a communication network 420 to server 402 (or another server that can provide the information to server 402). As shown in FIG. 4, order management service 404 and/or inventory management service 406 can be implemented using computing device 430 and/or server 402. For example, server 402 can be used to implement at least a portion of a back-end of order management service 404 and/or inventory management service 406 and computing device 430 can be used to implement at least a portion of a front-end of order management service 404 and/or inventory management service 406.

In some embodiments, server 402 can communicate with one or more computing devices, such as distributor database server 410, to collect information regarding products that are currently available, products that are normally available, a quantity of each product that is available, pricing information about the products, and/or any other suitable information. In some embodiments, distributor database server 410 can be used (e.g., by a distributor and/or by a regional facility), to manage information about a particular distribution center or distribution centers. For example, distributor database server 410 can be used to manage a database 412 that includes information about a particular distribution center associated with a particular distributor. As shown, database 412 is associated with Distributor X and Distribution Center i (of n total distribution centers). However, this is merely an example, and distributor database server 410 can manage any suitable database or combination of databases. For example, distributor database server 410 can be used to manage a database that includes information about multiple distribution centers associated with a single distributor. In a more particular example, a particular distributor may use a single database to track products across multiple distribution centers, while a different distributor may use a different database to track products for each distribution center. As another more particular example, a single distributor may use different techniques for tracking products across different regions and/or different parts of a corporate structure. In such an example, different divisions and/or subsidiaries of a distributor may use different techniques for tracking products information. A first subsidiary (e.g., which is responsible for distribution in a particular territory) may use a single database to track information across all distribution centers, while a second subsidiary (e.g., response for distribution in a different territory) may use separate databases to track information for each distribution center.

In some embodiments, server 402 can communicate with one or more distributor database servers 410 to collect information about products that can be ordered via the distributor associated with the database. In some embodiments, server 402 can collect information about a particular distributor (or distributors) into a single encrypted database (e.g., database 304 described above in connection with FIG. 3A). In some embodiments, computing device 430 can communicate with server 402 to retrieve information about a particular distributor. For example, computing device 430 can be used to present a user interface that can be used to initiate queries to server 402 related to the distributor, such as which products are available via a particular distribution center, which products are available across a set of distribution centers (e.g., all distribution centers associated with the distributor), price information, and any other suitable information.

In some embodiments, communication network 420 can be any suitable communication network or combination of communication networks. For example, communication network 420 can include a Wi-Fi network (which can include one or more wireless routers, one or more switches, and the like), a peer-to-peer network (e.g., a Bluetooth network), a cellular network (e.g., a 3G network, a 4G network, a 5G network, and the like, complying with any suitable standard(s), such as CDMA, GSM, LTE, LTE Advanced, WiMAX, 5G NR, and the like), a wired network, and the like. In some embodiments, communication network 420 can be a local area network, a wide area network, a public network (e.g., the Internet), a private or semi-private network (e.g., a corporate or university intranet), any other suitable type of network, or any suitable combination of networks. Communications links shown in FIG. 4 can each be any suitable communications link or combination of communications links, such as wired links, fiber optic links, Wi-Fi links, Bluetooth links, cellular links, and the like. In some embodiments, server 402 and/or computing device 430 can be any suitable computing device or combination of devices, such as a desktop computer, a laptop computer, a smartphone, a tablet computer, a wearable computer, a server computer, a virtual machine being executed by a physical computing device, and the like.

In some embodiments, communications transmitted over communication network 420 and/or communication links shown in FIG. 4 can be secured using any suitable technique or combination of techniques. For example, in some embodiments, communications transmitted to and/or from server 402, computing device 430, and/or database server 410 can be encrypted using any suitable technique or combination of techniques. For example, communication between two or more computing devices associated with communication network 420 (e.g., server 402, computing device 430, database server 410, Domain Name System (DNS) servers, one or more intermediate nodes that serve as links between two or more other devices, such as switches, bridges, routers, modems, wireless access points, and the like) computing devices can be carried out based on Hypertext Transfer Protocol Secure (HTTPS). As another example, communications can be carried out based on Transport Layer Security (TLS) protocols and/or Secure Sockets Layer (SSL) protocols. As yet another example, communications can be carried out based on Internet Protocol Security (IPsec) protocols. As still another example, a virtual private network (VPN) connection can be established between one or more computing devices associated with computing network 420. In some embodiments, one or more techniques can be used to limit access to communication network 420 and/or a portion of communication network 420. For example, computing devices attempting to connect to the network and/or transmit communications using the network can be required to provide credentials (e.g., a username, a password, a hardware-based security token, a software-based security token, a one-time code, any other suitable credentials, or any suitable combination of credentials).

In some embodiments, one or more security techniques can be applied to any suitable portion of a communication network that interacts with computing devices. For example, security techniques can be used to implement a secure Wi-Fi network (which can include one or more wireless routers, one or more switches, and the like), a secure peer-to-peer network (e.g., a Bluetooth network), a secure cellular network (e.g., a 3G network, a 4G network, a 5G network, and the like, complying with any suitable standard(s), such as CDMA, GSM, LTE, LTE Advanced, WiMAX, 5G NR, and the like), and the like.

Figure 5:
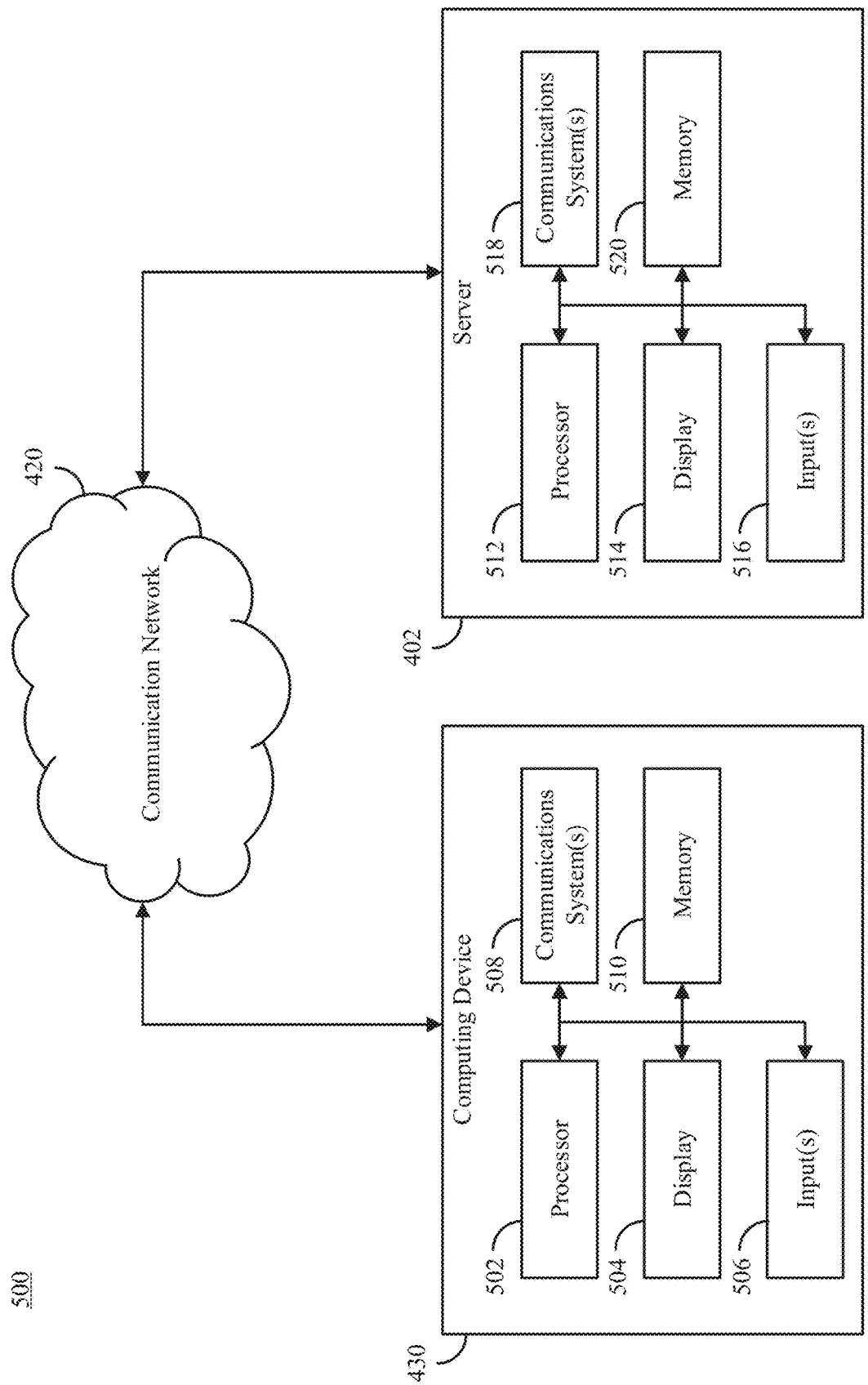
FIG. 5 shows an example of hardware that can be used to implement server and computing device in accordance with some embodiments of the disclosed subject matter.

FIG. 5 shows an example 500 of hardware that can be used to implement server 402 and computing device 430 in accordance with some embodiments of the disclosed subject matter. As shown in FIG. 5, in some embodiments, computing device 430 can include a processor 502, a display 504, one or more inputs 506, one or more communication systems 508, and/or memory 510. In some embodiments, processor 502 can be any suitable hardware processor or combination of processors, such as a central processing unit (CPU), a graphics processing unit (GPU), and the like. In some embodiments, display 504 can include any suitable display devices, such as a computer monitor, a touchscreen, a television, and the like. In some embodiments, inputs 506 can include any suitable input devices and/or sensors that can be used to receive user input, such as a keyboard, a mouse, a touchscreen, a microphone, a camera, and the like.

In some embodiments, communications systems 508 can include any suitable hardware, firmware, and/or software for communicating information over communication network 420 and/or any other suitable communication networks. For example, communications systems 508 can include one or more transceivers, one or more communication chips and/or chip sets, and the like. In a more particular example, communications systems 508 can include hardware, firmware and/or software that can be used to establish a Wi-Fi connection, a Bluetooth connection, a cellular connection, an Ethernet connection, and the like.

In some embodiments, memory 510 can include any suitable storage device or devices that can be used to store instructions, values, and the like, that can be used, for example, by processor 502 to present content using display 504, to communicate with server 402 via communications system(s) 508, and the like. Memory 510 can include any suitable volatile memory, non-volatile memory, storage, or any suitable combination thereof. For example, memory 510 can include RAM, ROM, EEPROM, one or more flash drives, one or more hard disks, one or more solid state drives, one or more optical drives, and the like. In some embodiments, memory 510 can have encoded thereon a computer program for controlling operation of computing device 430. In such embodiments, processor 502 can execute at least a portion of the computer program to present content (e.g., user interfaces, tables, graphics, and the like), receive content from server 402, transmit information to server 402, and the like.

In some embodiments, server 402 can be implemented using one or more servers 402 (e.g., functions described as being performed by service 402 can be performed by multiple servers acting in concert) that can include a processor 512, a display 514, one or more inputs 516, one or more communications systems 518, and/or memory 520. In some embodiments, processor 512 can be any suitable hardware processor or combination of processors, such as a CPU, a GPU, etc. In some embodiments, display 514 can include any suitable display devices, such as a computer monitor, a touchscreen, a television, and the like. In some embodiments, inputs 516 can include any suitable input devices and/or sensors that can be used to receive user input, such as a keyboard, a mouse, a touchscreen, a microphone, and the like. In some embodiments, server 402 can be a mobile device.

In some embodiments, communications systems 518 can include any suitable hardware, firmware, and/or software for communicating information over communication network 420 and/or any other suitable communication networks. For example, communications systems 518 can include one or more transceivers, one or more communication chips and/or chip sets, and the like. In a more particular example, communications systems 518 can include hardware, firmware and/or software that can be used to establish a Wi-Fi connection, a Bluetooth connection, a cellular connection, an Ethernet connection, and the like.

In some embodiments, memory 520 can include any suitable storage device or devices that can be used to store instructions, values, and the like, that can be used, for example, by processor 512 to present content using display 514, to communicate with one or more computing devices 430, and the like. Memory 520 can include any suitable volatile memory, non-volatile memory, storage, or any suitable combination thereof. For example, memory 520 can include RAM, ROM, EEPROM, one or more flash drives, one or more hard disks, one or more solid state drives, one or more optical drives, and the like. In some embodiments, memory 520 can have encoded thereon a server program for controlling operation of server 402. In such embodiments, processor 512 can execute at least a portion of the server program to transmit information and/or content (e.g., results of a database query, a portion of a user interface, textual information, graphics, and the like) to one or more computing 430, receive information and/or content from one or more computing devices 430, receive instructions from one or more devices (e.g., a personal computer, a laptop computer, a tablet computer, a smartphone, and the like), and the like.

Figure 6:
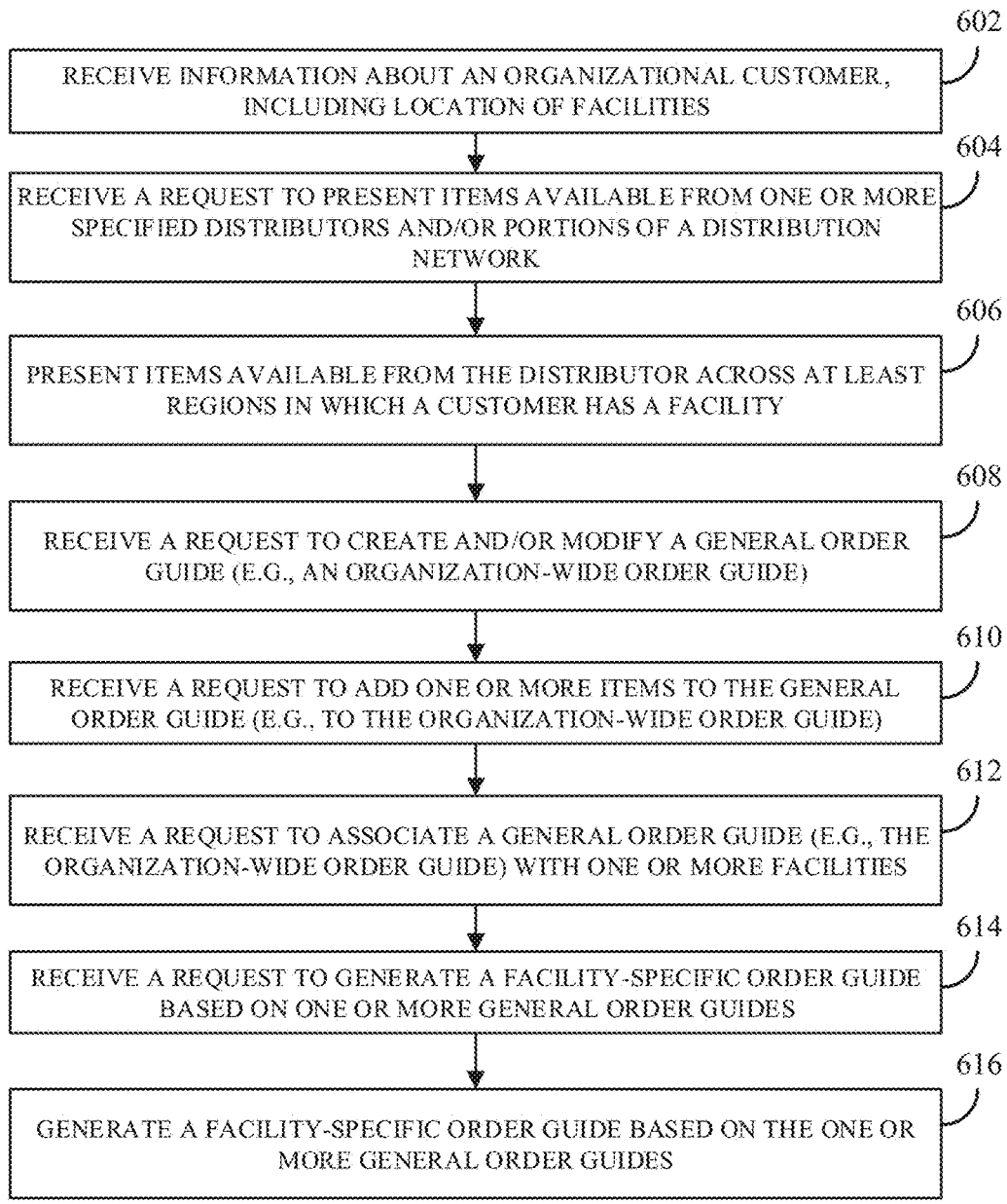
FIG. 6 shows an example of a process for creating and using an order guide to procure items for one or more facilities in accordance with some embodiments of the disclosed subject matter.

FIG. 6 shows an example 600 of a process for creating and using an order guide (e.g., a general order guide that can be associated with one or more facilities associated with an organization) to procure items for one or more facilities in accordance with some embodiments of the disclosed subject matter. As shown in FIG. 6, at 602, process 600 can receive information about an organization that is associated with one or more facilities. Note that information about an organization, such as information received at 602, can be considered organization metadata. In some embodiments, the information about the organization can include any pertinent information. For example, the information about the organization can include identifying information of a group purchasing organization(s) that the organization is associated with (if any). As another example, the information about the organization can include locations (e.g., at any suitable level of generality, such as street address, zip code, municipality, state, and the like) of various facilities to which deliveries may be made (e.g., by a distributor). As yet another example, the information about the organization can include identifying information associated with each of the various facilities (e.g., a semantically meaning name) associated with the organization that a user may wish to associate with an order guide. In some embodiments, process 600 can receive the information about the organization via a user interface (e.g., presented by computing device 430). Additionally or alternatively, in some embodiments, process 600 can receive the information about the organization as a file or stream of information. For example, process 600 can receive a file that includes details about the organization in a file with any suitable format, such as a comma-separated values (CSV)-based format, a tab-separated values (TSV)-based format, a fixed-length-based format, an Extensible Markup Language (XML)-based format, or the like. As another example, process 600 can receive the information in connection with one or more instructions (e.g., a WRITE instruction, an INSERT instruction, an UPDATE instruction, and the like).

In some embodiments, the information associated with the organization received by process 600 can include information about rebates, discounts, or other arrangements that the organization can utilize, the terms of such arrangements, identifying information of the other party in the arrangement (e.g., a supplier, a distributor, a third party, and the like), and/or any other suitable information.

In some embodiments, the information associated with the organization received by process 600 can include information about one or more distributors that the organization may use to procure items for its facilities. For example, if process 600 is executed as part of a service provided by a third party (e.g., not the organization, a particular distributor, nor a supplier) the service may be configured to facilitate ordering with multiple distributors, potentially associated with different categories of items. In such an example, at 602, process 600 can receive information about which distributor(s) in particular the organization may order from, which can include distributors across different categories of products (e.g., food, office supplies, medical supplies, janitorial supplies, etc.). As another example, if process 600 is executed as part of a service provided by a particular distributor, the information associated with the organization received by process 600 may omit information about which distributor the organization is interested in ordering items from.

In some embodiments, the information associated with the organization received by process 600 can include information about the organization's behavior over time. For example, the information can include information about items that the organization (e.g., via various facilities) has purchased over any suitable period of time. In some embodiments, such information can be provided explicitly by a user associated with the organization (e.g., in the form of a file that includes historical information) and/or can be provided programmatically (e.g., a user can cause such information to be automatically shared with process 600 as the organization purchases products).

At 604, process 600 can receive a request to present items available from a specified distributor or distributors, and/or items available in one or more specified portions of a distribution network that includes one or more distributors. In some embodiments, the request can be received in any suitable form. For example, an application executed by a computing device associated with the organization can receive input indicating that items available from a specified distributor are to be presented, which can cause the computing device to request information that can be used to present a user interface that includes items available from the specified distributor. Such an application can be an order management application executed by the operating system of the computing device, an application accessed remotely such as via a web browser (e.g., a web application), or any other suitable type of application. In such an example, the input can be a selection of a particular user interface element associated with the specified distributor, a selection of a user interface element for initiating creation and/or editing of an order guide associated with the specified distributor, or any other suitable input.

In some embodiments, process 600 can utilize data requests that conform to one or more Electronic Data Interchange (EDI) standards to request availability and inventory (e.g., EDI 846, Inventory Inquiry/Advice). Additionally or alternatively, in some embodiments, process 600 can utilize one or more custom web services (e.g., a RESTful web service that is configured to provide interoperability between systems associated with a particular supplier and/or distributor and systems associated with process 600, such as order management system 302). In some embodiments, process 600 can utilize a custom application program interface (API) that facilitates communication between systems associated with process 600 (e.g., as order management system 302) and systems associated with one or more suppliers and/or distributors, which can be utilized to query such systems, and/or to transfer data and information. In some embodiments, process 600 can cause item/location information to be stored in a unified database (e.g., representing a master catalog) for each supplier and/or distributor, which can be used to present such information to an organization/user via a user interface. In some embodiments, one or more security measures can be used to protect information in the unified database, such as by encrypting the information, requiring that a user provide credentials (e.g., a username, a password, a token, a one-time code, and/or any other suitable credentials) associated with an authorized user in order to access the information in the unified database, requiring that a computing device attempting to access the unified database is associated with a particular domain, and/or any other suitable security measures. In some embodiments, any suitable technique or combination of techniques can be used to protect the information in the database by encrypting data stored in the database. For example, techniques associated with Advanced Encryption Standard (AES) can be used to encrypt data stored in the unified database. As another example, techniques associated with Full Disk Encryption, File Encryption, can be used to encrypt data stored in the database by applying encryption to one or more disk volumes used to store the data. Additionally, in some embodiments, process 600 can cause pricing information to be stored in a separate data structure for each organization. For example, in some embodiments, pricing information can be stored in a table of a database that is associated with the organization (e.g., a relational database, or a non-relational database). In such an example, each organization can be associated with a separate table. Alternatively, multiple organizations can be associated with a single table that uses identifying information associated with the organization in a key (e.g., a primary key) associated with the price information. As another example, each price can be associated with a primary key that includes identifying information associated with the distributor (e.g., a distributor name, a distributor identification number, a distribution center name, and/or a distribution center identification number), identifying information associated with the product (e.g., a product name, and/or a product identification number such as a SKU or UPC), identifying information associated with the organization (e.g., a name associated with the organization, an identification number associated with the organization), and/or any other suitable information. As yet another example, each organization can be associated with a file that includes a list of prices associated with the organization.

At 606, process 600 can cause a computing device associated with the organization to present a user interface that includes information related to items available from the distributor. In some embodiments, process 600 can make available information related to the items available from the distributor in multiple regions or other subnetworks in which a facility associated with the organization is located.

In some embodiments, the items can be presented in any suitable format. For example, the items can be presented as a list in any suitable order based on one or more properties associated with the item (e.g., alphabetical by name, alphabetical by brand, by category, by price, and the like).

As another example, the items can be presented as a frontend of a searchable database with one or more input fields for providing search terms, a field that can be used to present results, and/or any other suitable user interface elements. For example, the items can be presented using a search user interface, such as the user interface shown in and described below in connection with FIG. 10F.

In some embodiments, any suitable information can be used to identify items that are available from the distributor, such as text (e.g., a name of the item, a description of the item, specifications of the item, and the like), one or more images (e.g., images of the item, images of branding associated with the item, and the like), and/or any other suitable information. In general, information associated with an item can be referred to as item metadata, or metadata associated with the item. Such metadata can include any suitable information that can be used to identify the item, describe the item, and/or retrieve information about the item. Additional examples of metadata can include a brand associated with the item, the size of an item, a number of items included in a package, a unit of measure associated with the item, a SKU, a UPC, a price associated with the item, one or more attributes of the item, and a category associated with the item. Note this is not an exhaustive list of every type of information that can be considered item metadata.

In some embodiments, the mechanisms described herein can be used to generate an order guide that includes services and/or includes only services. In such embodiments, in addition to, or in lieu of, presenting items available from a distributor, and adding such items to an order guide that can be used to facilitate procurement, the mechanisms described herein can present one or more services that are available from service providers, and such services can be added to an order guide. For example, bottled water delivery via various providers can be added as a "product group" (although it is generally a service) to an order guide, to facilitate procurement of such a service by individual facilities.

At 608, process 600 can receive a request to create and/or modify an order guide to be associated with the organization. Such an order guide is sometimes referred to herein as a general order guide, and can be referred to using other terms, such as a generic order guide, a corporate order guide, an organization order guide, an organization-wide order guide, a master order guide, a central order guide, a product catalog, a service catalog, a shopping list, a bid, a formulary, a preferred list, a recommended list, or the like. Note that some terms may have special meanings within particular industries, and the preceding list is intended to supplement such meanings, rather than providing a limiting definition of such terms. In some embodiments, such a request can be initiated in response to any suitable action. For example, such a request can be initiated in response to selection of a user interface element associated with creation of a new general order guide (e.g., an icon labeled "create new order guide," an element of a menu labeled "create new order guide"). As another example, such a request can be initiated in response to selection of a user interface element associated with editing an existing general order guide (e.g., an icon labeled "edit an order guide," an element of a menu labeled "edit an order guide," an icon associated with an existing general order guide, and the like). As still another example, such a request can be initiated in response to selection of a user interface element associated with an item (e.g., an icon labeled "save," "add," "add to order guide," "authorize," "+," and the like; an element of a menu that is similarly labeled, and the like). In such an example, in response to selection of such a user interface element associated with a particular item, if a general order guide is not currently selected, process 600 can cause the user to be prompted to select an existing general order guide and/or create a new order guide to which the item is to be added.

At 610, process 600 can receive a request to add one or more items to the general order guide selected and/or created at 608. In some embodiments, such a request can be in any suitable format. For example, such a request can be initiated by selection of a user interface element associated with the item (e.g., an icon labeled "save," "add," "add to order guide," "authorize," "+," and the like), and an application presenting the user interface element can cause identifying information of the item to be transmitted to a device executing process 600. As another example, such a request can be received via a command line interface (e.g., as a series of identifying information associated with one or more items to be added to the general order guide, such as a stock keeping unit (SKU) associated with the item, a Universal Purchase Code (UPC) associated with the item, a Uniform Resource Identifier (URI) associated with the item, a Uniform Resource Locator (URL) associated with the item, a Global Trade Identity Number (GTIN), and/or any other identifying information). As yet another example, such a request can be received via an application program interface (API).

At 612, process 600 can receive a request to associate a general order guide with one or more facilities. For example, a user can create multiple general order guides and assign one or more of the general order guides to each facility associated with the organization. In such an example, the user can create different general order guides that suit the needs of facilities with different needs and/or that are associated with different activities that a facility may perform, and can associate the general order guides with the particular facilities. As a more particular example, if the organization is associated with multiple different types of facilities (e.g., hospitals, outpatient clinics, hospice facilities, nursing homes, and the like), the user can assign each facility one or more order guides. As another more particular example, if a facility is associated with different services (e.g., a hotel that provides breakfast for guests, and that operates a restaurant), the user can assign that facility one or more order guides corresponding to the services provided by the facility. In some embodiments, facilities can be organized into groups and/or into a hierarchy. For example, a user can assign a facility to one or more groups of facilities. As another example, a facility can be added to a group programmatically (e.g., without any user intervention). In such an example, facilities can be added to a group based on one or more characteristics of the facility or facilities. Such characteristics can include location of the facility, the type of facility (e.g., hospitals can be added to a first group, nursing homes can be added to a second group), the name of the facility, whether facilities have been associated with the same general order guides, operating characteristics of a facility (e.g., hours, whether the facility is in a building that is owned by the organization or leased), and/or any other characteristics. As yet another example, groupings of facilities can be suggested based on one or more characteristics of the facility or facilities.

In some embodiments, a general order guide can be associated with a group and/or with an individual facility. For example, if a user associates a general order guide with a group, whether the general order guide is used when generating a facility order guide can be determined based on whether the facility is associated with the group. In such an example, if a particular facility is added to a group after a general order guide is associated with the group, the general order guide can be used when generating an order guide for the facility. Similarly, if a particular facility is included in a group when a general order guide is associated with the group, but the facility is later removed, the general order guide can be excluded from consideration when generating a facility order guide for the facility.

As another example, a single general order guide can be associated with a group, and with a facility included in the group. In such an example, the general order guide can be used when generating an order guide for the facility regardless of the current group membership status of the facility.

At 614, process 600 can receive a request to generate a facility-specific order guide that includes one or more items from one or more general order guides associated with the facility (e.g., at 612). In some embodiments, such a request can be in any suitable format. For example, such a request can be initiated after a user has associated one or more general order guides with a particular facility. As another example, such a request can be initiated when a user finishes associating one or more general order guides with a facility (e.g., by selecting a user interface element to save the associations, by navigating to another portion of the user interface, or the like). As yet another example, such a request can be initiated when a user accesses a user interface associated with a particular facility, such as to review an order guide associated with the facility, to create an order for the facility, or for any other suitable purpose.

At 616, process 600 can automatically create an order guide associated with the facility based on the one or more general order guides associated with the facility. Note that the order guide associated with the facility is sometimes referred to herein as a facility order guide, and can be referred to as a facility-specific order guide, an ordering location order guide, a local order guide, an auxiliary order guide, a secondary order guide, a peripheral order guide, a specific order guide, a local product catalog, a local service catalog, a facility bid, a facility formulary, a facility preferred list, a facility recommended list, or the like. Additionally, in some cases, the phrase order guide is used to refer to both an order guide associated with an organization (generally referred to herein as a general order guide) and order guides associated with various portions of the organization (generally referred to herein as a facility order guide) that are generated based on an order guide associated with the organization. This combination of terms was generally not used herein in the interest of clarity. In some embodiments, the order guide associated with the facility can include items from each of the general order guides associated with the facility. Additionally, in some embodiments, if multiple general order guides include the same item, process 600 can include only a single instance of the item in the facility order guide. Alternatively, in some embodiments, process 600 can include each instance of the item from the general order guides in the facility order guide. In some embodiments, duplicated items in a facility order guide can be removed during an ordering process (e.g., when the facility order guide is submitted to a procurement service or application). In some embodiments, the facility order guide can be formatted in any format that is suitable for presentation and/or submission to an application and/or service that can be used to place an order with one or more distributors based on the facility order guide. For example, the facility order guide can include information such as identifying information associated with the organization, identifying information associated the facility, identifying information of one or more general order guides used to generate the facility order guide, identifying information of one or more items, identifying information of one or more master items or product groups associated with the items, and any other suitable information. As described below, in some embodiments, particular items that are included in the facility order guide can be selected from a list of acceptable alternatives (e.g., sometimes referred to herein as a master list, or a product group) at the time the order guide is created based on any suitable factors such as stated preference, availability, price, size, brand, and the like.

In some embodiments, process 600 can utilize any suitable technique or combination of techniques to determine price and/or availability at the time when an order is being created. For example, process 600 can utilize techniques described above in connection with 606. In some embodiments, process 600 can query one or more systems associated with a particular distributor associated with the order to obtain updated price and availability information in real time (or near real time). In some embodiments, if such information is not available or otherwise cannot be obtained in real time, process 600 can use stored price information and can reconcile available inventory information after the order is accepted by the distributor. In some embodiments, information about backorders and discontinued items can be communicated to an organization and/or user at any suitable time. For example, such information can be communicated to the organization in a separate process. As another example, such information can be presented via a user interface or API used to place an order.

Figure 7A:
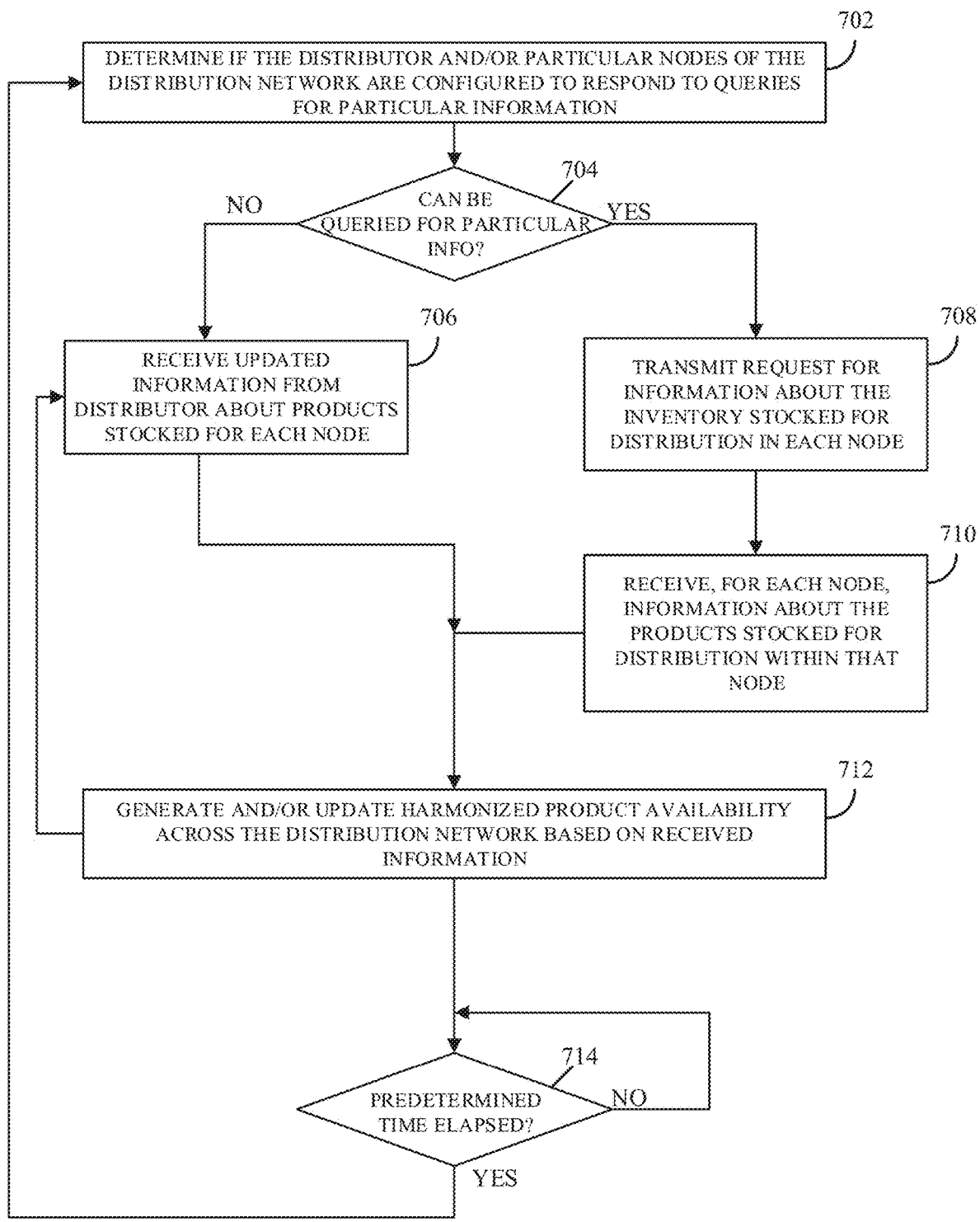
FIG. 7A shows an example of a process for generating and maintaining a list of items available from a distributor across various paths of a distribution network in accordance with some embodiments of the disclosed subject matter.

FIG. 7A shows an example 700 of a process for generating and maintaining a list of items available from a distributor across various paths of a distribution network in accordance with some embodiments of the disclosed subject matter. As shown in FIG. 7, at 702, process 700 can include determining whether a system associated with the distributor has been configured to respond to queries about particular product information. For example, a distributor can provide access to at least a portion of the information in one or more databases (or other suitable data structures) that the distributor (or another entity) maintains for keeping track of which products are currently available via each node in the distribution network through which the products are available (e.g., each distribution center, regional warehouse, etc.). In some embodiments, such access can be provided using various techniques. For example, the distributor can configure an API to respond to queries regarding information stored in one or more databases. As another example, the distributor can provide access via a web service.

If process 700 determines that at least a portion of the distributor's system is not configured to respond to queries for particular information ("NO" at 704), process 700 can proceed to 706. In some embodiments, as an alternative to determining if the distributor's systems are configured to respond to queries at 702 and 704, process 700 can be configured to start at 706 or 708 based on how the distributor's systems are configured and/or based on how the distributor and an entity associated with process 700 have agreed to share information. For example, if a push model is to be used in which the distributor shares information by placing a file at a particular location (e.g., as described below in connection with 706), process 700 can be configured to begin at 706.

At 706, process 700 can receive updated information from a distributor about products that are available (e.g., stocked) via various portions of the distribution network associated with the distributor. In some embodiments, process 700 can receive the updated information using any suitable technique or combination of techniques. For example, the distributor can periodically (e.g., once per day, twice per day, once per hour, or at any other suitable frequency) at regular and/or irregular intervals, provide the information to a location associated with an order management service (e.g., a File Transfer Protocol (FTP) server, a Secure File Transfer Protocol (SFTP) server, a storage location such as an S3 bucket or an encrypted S3 bucket provided via the Amazon S3 service made available by Amazon Web Services, or the like). In some embodiments, the information provided by the distributor can be a file that includes information about which items are currently available from the distributor, identifying information associated with the items, how many of each item are available, size information (e.g., the amount of each item by count, by weight, by measure, or the like), in which portions of the distributors network the items are available (e.g., distribution centers which can provide the item), a stocking status identifier (e.g., if the item is currently in the inventory of the distribution center, if the item can be procured by the distribution center for delivery to facilities served by the distribution center, or other stocking status identifiers). In some embodiments, the information can include pricing information associated with each item. Note that such price information can be a list price, which may not apply to particular organizations, which may have negotiated for a different price for certain items. In some embodiments, the distributor can provide a single file with information for all portions of the distribution network. Additionally or alternatively, the distributor can provide multiple files that each correspond to a portion of the distribution network. In some embodiments, the information transmitted by a distributor's system (e.g., at 706 and/or 710, described below) can be in any suitable format, such as a CSV-based format, a TSV-based format, a fixed-length-based format, an XML-based format, or the like.

In some embodiments, an entity associated with process 700 (e.g., a third party service provider, an organization, a distributor, a supplier) may establish expectations (e.g., via a written agreement) about which information is to be included in the information provided by the distributor, how often the information is to be provided, which portion(s) of the distribution network is to be included in the information, and/or any other suitable parameters associated with the sharing of information.

Otherwise, if process 700 determines that at least a portion of the distributor's system is configured to respond to queries for particular information ("YES" at 704), process 700 can proceed to 708. At 708, process 700 can transmit a request to one or more systems associated with the distributor for information about items that are currently stocked at each distribution center, and/or items that are ordinarily stocked (but may currently be out of stock). For example, each distribution center associated with a distributor can use a database to keep track of which items are in stock, and the database can be kept updated as new items are received and other items are shipped to fulfill orders. As another example, a distributor can maintain a database to keep track of which items are currently stocked at each of multiple distribution centers. In some embodiments, process 700 can submit a query or queries for information maintained in the database associated with each node in the distribution (e.g., distribution center).

In some embodiments, the distributor's system can be configured to respond to a request by providing all pertinent information associated with one or more portions of the distribution network, such as information described above in connection with a file shared by the distributor at 706. Additionally or alternatively, in some embodiments, the distributor's system can be configured to respond to queries by providing a subset of information, with the information delivered being based on the format of the query.

At 710, process 700 can receive, for each node (e.g., distribution center), information about items that are stocked for distribution from that node and/or items available for transfer from another node. For example, process 700 can receive a list of items that are currently stocked, a quantity of each item (if any), size information, a cost associated with each item, and/or any other suitable information. As another example, process 700 can receive a list of actions that have been performed to add or remove items from the database associated with a particular node. In such an example, the actions can be used to update a database maintained by an entity associated with process 700. Additionally, in some embodiments, process 700 can receive information about a price at which inventory is available, and whether the price varies across different nodes of the distribution network and/or across different organizations.

At 712, process 700 can generate and/or update harmonized product availability information across all nodes for which information is available. For example, process 700 can generate and/or update a database of items that are available from the distributor, and can associate each item with a node or nodes (e.g., distribution centers) in which the item is available, in what quantities, in what size(s), and/or any other suitable information. In some embodiments, process 700 can use the most recent information available to generate and/or update the harmonized product availability information. For example, if information is received for the same distribution node at both 706 and 708, process 700 can determine which information is most recent and preferentially utilize that information.

In some embodiments, in which information is provided by the distributor at regular and/or irregular intervals, process 700 can return to 706 to await updated information after generating and/or updating the harmonized product availability information. For example, in some embodiments, process 700 can omit 702, 704, 708, 710, and 714 when information is only obtained from a particular distributor via the distributor pushing information to a location from which process 700 can retrieve the information.

At 714, process 700 can determine whether a predetermined amount of time has elapsed since the harmonized product availability information was updated. If process 700 determines that the predetermined time has not elapsed ("NO" at 714), process 700 can continue to wait. Otherwise, if process 700 determines that the predetermined time has elapsed ("YES" at 714), process 700 can return to 702 to request updated information from each node in the distribution network. Note that, in some embodiments, a portion of process 700 can be executed asynchronously. For example, if a portion of the distributor's systems are not configured to respond to queries for particular information, process 700 can receive information from the distributor at 706 when the information is sent (e.g., pushed) from the distributor's system(s), which may not coincide with times at which information is requested at 708.

Note that process 700 is a particular example of a process for generating and maintaining a list of items available from a distributor across the distribution network (or a particular portion(s) of the network), but other processes can be used to perform a similar task. For example, a computing device associated with each node in the distribution network can be configured to send updated information periodically (at regular and/or irregular intervals) to a computing device that maintains a list of products available across all the distribution network. Alternatively, in some embodiments, rather than each distribution center being associated with a particular database, the inventory across the distribution network can be tracked using a single unified encrypted database. In some embodiments, process 700 can utilize any suitable technique or combination of techniques to determine obtain information about inventory that is stocked and the price of such inventory. For example, process 600 can utilize techniques described above in connection with 606.

Figure 7B:
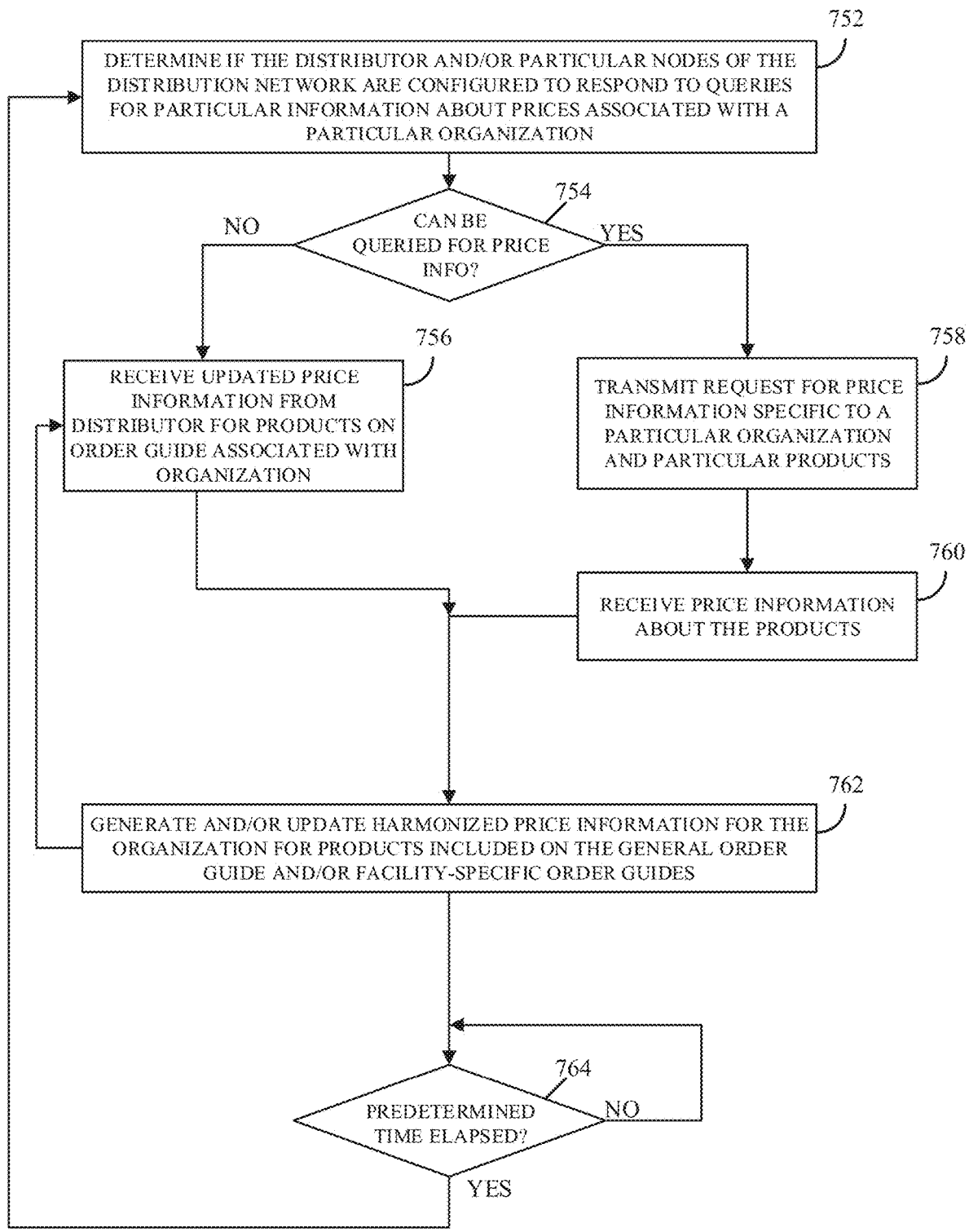
FIG. 7B shows an example of a process for generating and maintaining price information associated with a particular organization and one or more distributors and/or distribution paths in accordance with some embodiments of the disclosed subject matter.

FIG. 7B shows an example of a process for generating and maintaining price information associated with a particular organization and one or more distributors and/or distribution paths in accordance with some embodiments of the disclosed subject matter. At 752, process 750 can include determining whether a system associated with the distributor has been configured to respond to queries related to prices associated with particular products and/or particular organizations. For example, a distributor can provide access to at least a portion of the price information in one or more databases (or other suitable data structures) that the distributor (or another entity) maintains for keeping track of which products are currently available via each node in the distribution network through which the products are available (e.g., each distribution center, regional warehouse, etc.). In some embodiments, such access can be provided using various techniques. For example, the distributor can configure an API to respond to queries regarding price information stored in one or more databases. As another example, the distributor can provide access to price information via a web service.

If process 750 determines that at least a portion of the distributor's system is not configured to respond to queries for particular price information ("NO" at 754), process 700 can proceed to 756. In some embodiments, as an alternative to determining if the distributor's systems are configured to respond to queries at 752 and 754, process 750 can be configured to start at 756 or 758 based on how the distributor's systems are configured and/or based on how the distributor and an entity associated with process 750 have agreed to share price information. For example, if a push model is to be used in which the distributor shares price information by placing a file(s) at a particular location (e.g., as described below in connection with 756), process 750 can be configured to begin at 756.

At 756, process 700 can receive updated information from a distributor about prices associated with particular products and/or organizations (e.g., certain customers of the distributor). In some embodiments, process 750 can receive the updated price information using any suitable technique or combination of techniques. For example, the distributor can periodically (e.g., once per day, twice per day, once per hour, or at any other suitable frequency) at regular and/or irregular intervals, provide the price information to a location associated with an order management service (e.g., a server, a storage location, or the like). In some embodiments, the information provided by the distributor can be a file that includes price information related to items made available by the distributor. In some embodiments, the file can be associated with a particular customer, and the distributor can provide a file for each of various customers that have a relationship with an entity associated with process 700 (or another process, such as process 600). Additionally or alternatively, the distributor can provide a single file that identifies customers and prices associated with the customer for each product available from the distributor (and/or each product for which a price associated with the customer differs from a list price).

In some embodiments, an entity associated with process 750 (e.g., a third party service provider, an organization, a distributor, a supplier) may establish expectations (e.g., via a written agreement) about which information is to be included in the price information provided by the distributor, how often the price information is to be provided, which portion(s) of the distribution network is to be covered in the price information (which can vary by organization), and/or any other suitable parameters associated with the sharing of price information.

Otherwise, if process 750 determines that at least a portion of the distributor's system is configured to respond to queries for particular price information ("YES" at 754), process 750 can proceed to 758. At 758, process 750 can transmit a request to one or more systems associated with the distributor for price information associated with a particular customer, one or more particular nodes, and/or one or more products. For example, certain organizations can negotiate prices with distributors through various relationships (e.g., as described above in connection with FIG. 1), and the distributor can maintain information about prices to charge the organization for each item for which a price has been agreed. In such an example, process 750 can request price information for a particular organization. In some embodiments, the distributor's system can be configured to respond to a request by providing all pertinent price information associated with one or more customers of the distributor, and/or one or more portions of the distribution network, such as information described above in connection with a file shared by the distributor at 756. Additionally or alternatively, in some embodiments, the distributor's system can be configured to respond to queries by providing a subset of price information, with the information delivered being based on the format of the query.

At 760, process 750 can receive price information about items that are associated with the distributor for one or more organizations for which price information was requested at 758. For example, process 750 can receive a list of prices for items available to the organization, prices for items on a general order guide, items in a master list or product group, and/or for any other items.

At 762, process 750 can generate and/or update harmonized price information for an organization and a particular distributor(s). For example, process 750 can generate and/or update a database of prices that the organization can expect to pay for certain items available from the distributor. In some embodiments, process 750 can use the most pertinent price information available to generate and/or update the harmonized price information. For example, if price information is received for the same organization and products at both 756 and 758, process 750 can determine which price information is most recent and preferentially utilize that information. As another example, if price information is received that includes list prices and other prices information that includes prices specific to a particular organization, process 750 can use the more specific information regardless of which information is more up to date.

In some embodiments, in which price information is provided by the distributor at regular and/or irregular intervals, process 750 can return to 756 to await updated information after generating and/or updating the harmonized price information. For example, in some embodiments, process 750 can omit 752, 754, 758, 760, and 764 when price information is only obtained from a particular distributor via the distributor pushing price information to a location from which process 750 can retrieve the price information.

At 764, process 750 can determine whether a predetermined amount of time has elapsed since the harmonized price information was updated. If process 750 determines that the predetermined time has not elapsed ("NO" at 764), process 750 can continue to wait. Otherwise, if process 750 determines that the predetermined time has elapsed ("YES" at 764), process 750 can return to 752 to receive updated price information from the distributor. Note that, in some embodiments, a portion of process 750 can be executed asynchronously. For example, if a portion of the distributor's systems are not configured to respond to queries for particular price information, process 750 can receive price information from the distributor at 756 when the information is sent (e.g., pushed) from the distributor's system(s), which may not coincide with times at which information is requested at 758.

Figure 8:
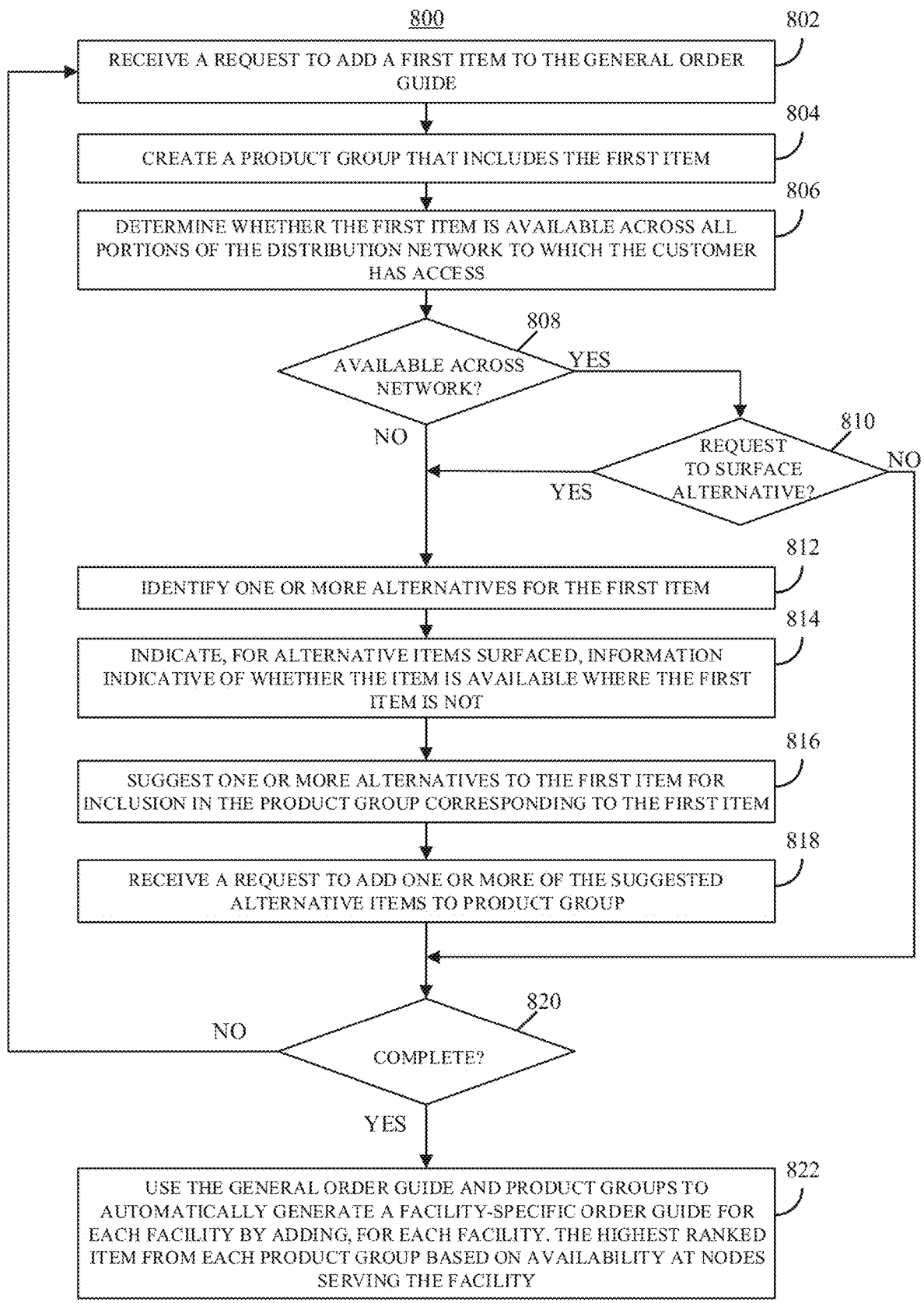
FIG. 8 shows an example of a process for grouping two or more items into a master list and/or product group, and automatically selecting one or more of the items for inclusion in a facility order guide based on availability and/or price information in accordance with some embodiments of the disclosed subject matter.

FIG. 8 shows an example 800 of a process for grouping two or more items into a master list and/or product group, and automatically selecting one or more of the items for inclusion in a facility order guide based on availability within a region in which the item is being ordered in accordance with some embodiments of the disclosed subject matter. As shown in FIG. 8, at 802, process 800 can receive a request to add a first item to a general order guide. As described above in connection with 610, such a request can be sent in any suitable format and in response to any suitable action.

At 804, process 800 can create a master list or product group that includes the first item. In some embodiments, when an item is first added to a general order guide, process 800 can automatically create a master list or product group associated with the item. In some embodiments, if a product group already exists for a product that can be a substitute for the product to be added based on the request at 802, process 800 can identify the existing product group and/or process 800 can automatically add the selected item to the existing product group.

At 806, process 800 can determine whether the first item is available in at least all portions of the distribution network to which the organization associated with the order guide has access (e.g., in each distribution center that serves a facility associated with the organization). Additionally or alternatively, in some embodiments, at 806, process 800 can determine whether the first item is available in at least all portions of the distribution network associated with a particular general order guide. For example, process 800 can submit a request to a system that maintains information about which items are available across the distributor's distribution network. In a more particular example, process 800 can submit a query to a unified encrypted database (e.g., database 304) of inventory across all nodes in the distributor's distribution network for information about the first item. In some embodiments, process 800 can receive information indicating from which nodes the first item is available (and/or from which nodes the first item is normally available), and can compare those nodes in which the item is available to nodes which the facilities associated with the organization have access (e.g., comparing a list of distribution centers which can deliver the item to a particular region to a list of regions in which the organization has facilities and/or a list of facilities that are each associated with a region). In some embodiments, a user interface that presents information about items included in a general order guide, items included in a master list or product group, items included in search results, or any other time a user interface is presenting information about an item, the user interface can present coverage information indicating how many of the facilities are within a portion of the distribution network in which the item (or items included in a master list or product group corresponding to the item) is available. For example, coverage information can be presented as shown in, and described below in connection with, FIGS. 10C, 10E, and 10F.

At 808, process 800 can determine whether the first item is available across the portions of the distribution network to which the organization has access. If process 800 determines that the first item is available across the portions of the distribution network to which the organization has access ("YES" at 808), process 800 can move to 808.

At 810, process 800 can determine whether a request has been received to surface alternatives to the first item. For example, such a request can be manually initiated via selection of a particular user interface element. As another example, such a request can be programmatically initiated in response to a determination that the organization may be interested in being presented with alternatives (e.g., which can be indicated by a setting, by past conduct, and the like). As yet another example, such a request can be initiated whenever information about a particular item and/or a master list or product group that includes the particular item is presented. In a more particular example, if a user navigates to a portion of a user interface that presents information about a particular item, process 800 can consider navigation to that portion of the user interface to be a request to surface alternatives. As still another example, such a request can be initiated periodically at regular and/or irregular intervals. In a more particular example, a request can be initiated for different organizations in turn such that alternatives are surfaced for each of the organizations at least once in a particular period of time. In such an example, alternatives can be surfaced for each of the organizations at least once per day, per week, per month, or any other period of time. Such alternatives can be surfaced to, for instance, determine when there is an opportunity for savings. In some embodiments, a request to surface alternatives can be received when a particular user interface element is presented in a user interface, such as a field for presenting alternatives to a presented item. Alternatively, in some embodiments, a user may browse for other items (e.g., by navigating to another portion of the user interface, by entering one or more terms into a search field of the user interface, or the like).

If process 800 determines that a request has been received to surface alternatives to the first item ("YES" at 810), or if process 800 determines that the first item is unavailable in at least one portion of the distribution network to which the organization has access or a given facility has access ("NO" at 808), process 800 can move to 812.

At 812, process 800 can identify one or more alternatives for the first item. In some embodiments, process 800 can use any suitable technique or combination of techniques to identify alternatives to the first item, such as techniques described below in connection with FIG. 9. For example, process 800 can identify one or more alternatives by querying an encrypted database or knowledgebase that includes associations between products that are alternatives. Additionally or alternatively, process 800 can identify alternatives to the first item by allowing a user to search or otherwise browse for one or more items.

At 814, process 800 can indicate, for alternative items surfaced (e.g., automatically by process 800, or via a user initiated search for the one or more additional items), information indicative of whether each item is available where the first item (and/or other items in a master list or product group corresponding to the first item) is not available. Such information can be presented using any suitable technique or combination of techniques. For example, the information can be presented numerically. In a more particular example, process 800 can present the information using a number indicating how many more regions the item would cover compared to how many regions are currently covered. As another example, the information can be presented graphically. In a more particular example, process 800 can present the information using a pie chart or bar graph showing current coverage in a first color, additional coverage provided by the item in a second color, and regions still lacking coverage in a third color. In another more particular example, process 800 can present the information using different colors to indicate how much additional coverage is provided by an item. A first color (e.g., red) can indicate that the item provides no additional coverage, a second color (e.g., yellow) can indicate that the item provides some additional coverage, and a third color (e.g., green) can indicate that the item provides coverage for all regions that previously lacked coverage.

At 816, process 800 can suggest one or more alternatives to the first item for potential inclusion in a master list or product group for a class of items that includes the first item and the suggested alternative(s). For example, if the first item is a particular size container of detergent from a first supplier (e.g., a first brand of detergent), but that item is not available in all portions of the distribution network to which the organization has access or a given facility has access, process 800 can suggest detergent from another supplier and/or in a different size that is available in a portion of the distribution network in which the first item is not as a potential substitute to potentially include in a master list for the class "detergent." In some embodiments, process 800 can use any suitable technique or combination of techniques to suggest the one or more alternatives. For example, process 800 can suggest the one or more alternatives by presenting the alternatives identified at 812 in a particular order. As another example, process 800 can suggest the one or more alternatives by highlighting (in any suitable manner) a lowest priced alternative, an alternative that provides the most additional coverage, an alternative that meets brand, nutrition, or other standards, and/or other similar criteria. In some embodiments, the suggested alternatives can be available via multiple different distributors.

At 818, process 800 can receive a request to add one or more of the suggested alternative items to the master list or product group. For example, a user can select one or more of the alternatives and/or select a position within the master list to place each of the one or more selected alternatives. In some embodiments, a product group can include items from multiple different distributors.

At 820, process 800 can determine whether a user has completed interaction with a particular master list or product group. In some embodiments, any suitable action can indicate that the user has completed interaction with a particular master list or product group. For example, process 800 can determine that a user has completed interaction with a particular master list or product group when the user navigates to a different portion of a user interface (e.g., to the general order guide associated with the master list or product group, to another master list or product group, to a list of general order guides, and/or another portion of the user interface that is not configured to edit which items are included in a particular master list or product group). As another example, process 800 can determine that a user has completed interaction with a particular master list or product group when the user stops interacting with the user interface (e.g., by signing out, closing an application, selecting a user interface element to save a current state of a master list or product group, or any other suitable action indicating that a user has stopped interacting with the user interface).

If process 800 determines that a user has not completed interaction with a particular master list or product group ("NO" at 820), process 800 can return to 802 (or any other portion of process 800 preceding 820, such as 804 to 818) to continue to edit a particular master list or product group. Otherwise, if process 800 determines that a user has completed interaction with a particular master list or product group ("YES" at 820), process 800 can move to 822. At 822, process 800 can use the master list or product group during creation or one or more facility order guides. For example, process 800 can use the order in which items are included in the master list or product group to select which of the items to include in the facility order guide being created. In such an example, process 800 can select the highest ranked item that is also available in the portion of the distribution network associated with the facility. As another example, process 800 can determine which item to select from the master list or product group based on price information. In such an example, process 800 can select the lowest priced item (e.g., by price per count, per pound, per ounce, or the like, rather than per unit) that is also available in the portion of the distribution network associated with the facility. Note that, in some embodiments, a facility order guide can include items available from different distributors. In such embodiments, when being used during an ordering process (e.g., via a procurement system), items available from different distributors can be presented in a unified user interface. Additionally or alternatively, in some embodiments, items available from different distributors can be presented using different user interfaces that can be presented serially or in parallel. For example, a user can be presented with a first user interface for ordering items in the order guide from one distributor, and when that is complete can be presented with another user interface for ordering items in the order guide from a second distributor. As another example, a user can be presented with a first user interface for ordering items in the order guide from one distributor, and can be presented with another user interface for ordering items in the order guide from a second distributor at the same time (e.g., as two different applications, as two different browser windows, as different tabs within a single browser window).

As yet another example, process 800 can determine which item to select from the master list or product group based on stocking information. In such an example, process 800 can sort the items in the master list or product group based on information indicating how readily available the item is, and can select an item that is most readily available that also meets another criteria or criterion such as highest priority or lowest price. Items can be available in a particular region because the items are currently physically located at the distribution center (which can be a category that is most readily available), the items can be sourced from a nearby distribution center relatively quickly (e.g., the item can be available on demand, but is not currently physically located at the distribution center), or the items can be sourced from a central distribution center (e.g., the items are available, but may not be shipped for several days, which can be a category that is least readily available).

At still another example, process 800 can determine which item to select from the master list or product group based on one or more other criteria or criterion, such as based on size (e.g., an organization may prefer a particular size over another), based on brand, based on contract status (e.g., if the organization has a contractual relationship with the distributor or a supplier in connection with the item), and/or any other suitable criterion or criteria.

In some embodiments, having identified a preferred item, process 800 can determine whether the preferred instance of the item is available in the subnetwork of the distribution network in which the facility is located. For example, process 800 can query a unified database associated with the distributor's available inventory and/or a database associated with the particular node(s) corresponding to the sub-network in which the distribution network is located to determine whether the preferred item is available to that particular facility. Additionally, process 800 can determine whether the preferred item could be transferred from another distribution center to the node serving that facility to be shipped to the facility at the time as specified by the order.

If, when an order is being submitted for a particular facility, process 800 determines that the preferred instance of the item is not available for shipment to that facility from a node of the distribution network corresponding to that facility, process 800 can determine which of the alternatives in the product group is available and/or whether a next most preferred instance of the item is available from that node. In some embodiments, process 800 can determine the preferred instance of the item based on a one or more rules specified by the organization, which can be specified on an organizational level, a facility level, or a general order guide level. For example, the organization can select a rule based on the explicit priority assigned to each instance of the items. As another example, the organization can select a rule based on the stocking status (e.g., whether the item is stocked locally, or if it is stocked elsewhere but can still be ordered from the distribution center). As yet another example, the organization can select a rule based on price (e.g., the lowest price per count can be selected). As still another example, the organization can select a rule based on contract status (e.g., whether the organization has entered into a contractual relationship obligating the organization to preferentially purchase particular items, or allowing the organization to purchase particular items at reduced prices if certain conditions are met). In some embodiments, the initial decision about which instance to place on the facility order guide can be based on whether the item is stocked, but may not account for the amount that is stocked. For example, if the facility normally orders 100 units of an item, but only 25 units of that item are stocked, process 800 may place the item on the order guide regardless. Additionally or alternatively, in some embodiments, process 800 may select a different item, or may add alternatives (e.g., less preferred items) to a list of acceptable alternatives if that item is out of stock.

In some embodiments, process 800 can use any suitable factor(s) to determine which item from the master list to substitute for a most preferred item. For example, process 800 can select the alternative that would produce the lowest cost. As another example, process 800 can select an alternative based on the existence of a contractual relationship. In such an example, if the organization has an obligation to purchase a particular brand (e.g., due to a GPO contract with the supplier), process 800 can select the alternative in order to satisfy this obligation if possible. As yet another example, process 800 can select an alternative based on brand preferences, which can be made explicitly by a user or implied from past behavior of a user. In such an example, any suitable technique can be used to imply brand preference, such as machine learning techniques. Machine learning techniques that can be used to infer brand preference can include Random Forest techniques, K-Means clustering techniques, Word2Vec techniques, convolutional neural network classification techniques, recurrent neural network techniques, any other suitable machine learning techniques, and any suitable combination thereof.

In some embodiments, if process 800 determines that none of the items on the master list are available for a particular facility, process 800 can take an alternate action. For example, process 800 can alert a user that the item could not be placed on the facility order guide. In such an example, process 800 can present one or more alternatives that are available for the particular facility, and the user can indicate which (if any) to include in the facility order guide, and/or whether the selected item is to be added to the master list or product group. As another example, process 800 can automatically identify an alternative to be added to the facility order guide. In such an example, process 800 can determine which alternative to add based on the products ranking in a list of identified alternatives to at least one item in the master list. Additionally, a ranking can be based on how many of the items in the master list or product group are identified as being alternatives to an item surfaced automatically by process 800.

Figure 9:
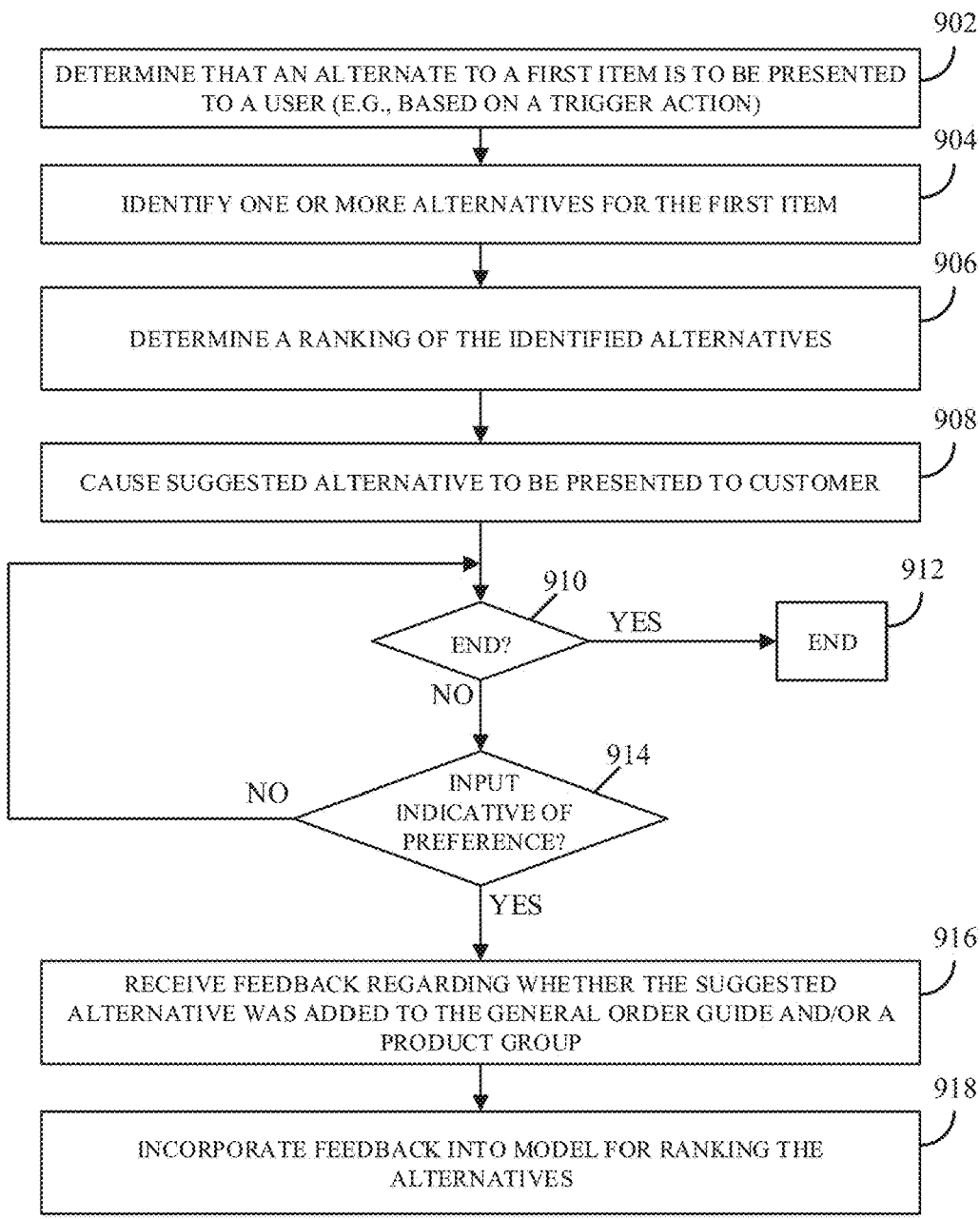
FIG. 9 shows an example of a process for selecting one or more alternative items for presentation to a user based on cost, regional availability, compatibility, and/or any other suitable factors in accordance with some embodiments of the disclosed subject matter.

FIG. 9 shows an example 900 of selecting one or more alternative items for presentation to a user based on cost, regional availability, compatibility, and/or any other suitable factors in accordance with some embodiments of the disclosed subject matter. As shown in FIG. 9, at 902, process 900 can determine that an alternative to a first item is to be presented to a user in response to some triggering action. In some embodiments, any suitable action can cause process 900 to determine that an alternative is to be presented. For example, selection of a user interface element to explicitly request that alternatives be surfaced (e.g., as described above in connection with 808). As another example, if an item of a particular class is to be included in an order, but there is not an approved instance of that class available from a particular node (e.g., distribution center) and/or in a particular region (e.g., if there is no master list, or if no items on the master list are in stock), process 900 can determine that an alternative is to be presented to a user. As yet another example, process 900 can determine that a saving opportunity exists for a particular item.

In some embodiments, process 900 can identify and present saving opportunities using any suitable technique or combination of techniques. For example, process 900 can identify items in a product group, at least a portion of a purchase history of the organization (e.g., products purchased by a facility, how much was purchased) for any suitable length of time (e.g., three months, six months, 12 months). For each product group, process 900 can calculate the cost per unit (e.g., per quantity, per mass/weight, per volume), which can account for rebates and/or discounts available to the organization, and can select the cheapest item from the product group based on the cost. Additionally, in some embodiments, process 900 can calculate the cost of one or more alternatives to at least one item in the product group, and can determine whether any of the alternatives are cheaper. For each product group, process 900 can calculate savings based on the cost of the cheapest item, and based on the order history information. Process 900 can calculate how much the organization can save per time (e.g., per week, per month, per year) if the organization were to preferentially order the cheaper item/cheaper alternative. Process 900 can present a list of saving opportunities that have been identified (e.g., as a list of product groups and corresponding savings in descending order of total savings).

At 904, process 900 can identify one or more alternatives to the first item. In some embodiments, identifying alternatives can include querying a database and/or knowledge base for alternatives to the first item. In such embodiments, a process of classifying items as being alternatives can be performed asynchronously (e.g., periodically at regular and/or or irregular intervals) such that the information is available when requested. Additionally or alternatively, in some embodiments, process 900 can identify one or more alternatives by determining one or more properties of the first item, and automatically searching for alternatives with similar characteristics.

In some embodiments, a second item can be identified as an alternative to the first product based on various properties. For example, process 900 can determine whether two items are alternatives based on a comparison of the description and/or product category of the first item and a description and/or product category of other items. As another example, process 900 can determine whether two items are alternatives based on a size and/or unit of measure of the first item and the other items. In a more particular example, where the first product is a gallon container of detergent from a first supplier, process 900 can identify containers of detergent of similar size from other suppliers as being potential alternatives, but can determine that packets of detergent from the first supplier may not be an acceptable alternative.

As yet another example, process 900 can determine whether two items are alternatives based on nutritional content of the first item and other items that are potentially similar. For example, if the first item is low sodium vegetable stock, process 900 can determine whether potential alternatives have a particular sodium content.

As still another example, process 900 can determine whether two items are alternatives based on one or more properties of the first item and other items. More particular examples can include, if the first item is indicated as nut free, if the first time is in indicated as being gluten free, if the first time is in indicated as being organic, if the first time is in indicated as being conventional, if the first time is in indicated as being GMO free, and the like. In another more particular example, process 900 can determine whether another product is suitable for achieving the same outcome as the first item, which can include acting as a disinfectant for particular types of pathogens (e.g., bacteria, viruses, and/or other organisms). In some embodiments, various sources of knowledge can be used to determine whether a product is suitable for achieving a particular outcome, such as information provided by a government agency (e.g., a chart provided by the Centers for Disease Control and Prevention that identifies whether particular cleaning agents are suitable for use as disinfectants for particular pathogens).

As a further example, process 900 can determine whether two items are alternatives based on past user actions, such as which past suggestions were accepted and/or declined. In a more particular example, process 900 can use a trained model (e.g., trained using one or more machine learning techniques) that is provided information about which suggestions a user has adopted and/or which suggestions a user has declined as input, and provides output indicative of one or more alternatives to a particular item or items. In another more particular example, various products can be clustered using cluster analysis techniques, such as K-means clustering, mean-shift clustering, density-based spatial clustering of applications with noise. In such an example, products can be clustered across categories which can be used to determine, given products that a user has affirmatively selected, which other products the user may be interested in. Alternatives can be identified and/or ranked based on the product itself being similar, and also based on whether the product is in a cluster with other products that the user has affirmatively selected. Alternatively, users can be clustered based on similarity of user actions (e.g., product selections made by the users), and alternatives can be identified based on the product itself being similar and also based on how many other users in the same cluster have selected the product. In some embodiments, process 900 can generate signals that can be used to train and/or use trained models by affirmatively suggesting a product as an alternative and recording whether the user accepted or rejected the alternative, and/or what priority the user assigned to the alternative.

As another more particular example, if in the past a user (or users) have consistently expressed a brand preference when an item is not available for a particular facility, process 900 can determine that the user prefers a particular brand. In such an example, a particular item (e.g., a particular size of an item) is unavailable (e.g., when creating a facility order guide or at the time of ordering) or not available in a desired quantity, process 900 can suggest multiple items as alternatives such as an item from another supplier and an item from the same supplier in a different size, with the item from the other supplier being suggested first because it is less costly. If the user consistently chooses the item from the same supplier in spite of it appearing less desirable, process 900 can use this as a signal of brand preference for items from the first supplier.

In yet another more particular example, if a user consistently selects a particular quality of item (e.g., items can be classified into various quality levels, such as generic or private label, discount, standard, and premium), process 900 can use this as a signal indicative of the user's preference for a particular quality of product. In such an example, process 900 can preferentially suggest items of the quality preferred by the user regardless of whether the item is more expensive than other potential alternatives. This can be used as a signal across different types of products, such as if a user selects a generic item (e.g., a generic ketchup, a generic floor vacuum cleaner, a generic cleaning solution, a generic package of garbage bags, generic adhesive bandages, generic over the counter medication, generic light bulbs), the user may be open to other types of generic items, whereas if the user selects a corresponding branded item it may indicate that the user would be more interested in other branded items (which may be independent of whether the other items are associated with the same brand) even if they are not the least expensive option.

As an additional example, process 900 can determine whether two items are alternatives based on product relationships identified from menu planning activities. In a more particular example, a user can provide input indicating whether a particular item is not acceptable as an alternative and/or whether a particular item is an acceptable alternative, and in some cases a reason why the user considers the item to be acceptable or not. In such an example, this can be used as a signal when suggesting alternatives. If a user has identified two chicken breasts as being acceptable alternatives because the nutritional content is equivalent for the user's purposes, and has identified another chicken breast as not being an acceptable alternative because it has an unacceptably high sodium content, process 900 can utilize the information in determine whether other potential alternatives (e.g., other chicken breasts) are likely to be acceptable alternatives.

As another additional example, process 900 can determine whether two items are alternatives based on price. In a more particular example, two items may be very similar but the first item may be much less costly than the otherwise similar alternative. This may occur, for example, when the first item is a private label item and the second item is a brand name item. Alternatively, this may occur when the first item is a brand name item that is discounted based on a contractual relationship with the supplier, and the second item is a brand name item that is not discounted. In some embodiments, different properties of items can be used to determine whether an item is an alternative and/or how similar the item is as an alternative. For example, similarity for food products can be determined for various categories and/or properties such as: similarity based on product descriptions; similarity based on product categories; similarity based on product attributes (e.g., vegan, kosher, organic, low sodium, low fat, nut free, dairy free, and/or any other attributes); similarity based on unit of measure; match based on GTIN (UPC identifier); similarity based on nutritional analysis; similarity based on ingredients (e.g., common ingredients, mismatched equivalent ingredients, omitted ingredients); curated alternatives based on menu planning activities performed by users associated with the organization and/or users associated with other organizations; curated alternatives identified by a developer or other user associated with an entity providing access to process 900; past user behavior by all users (e.g., what have other users indicated as alternatives, such as by including two items in a product group); past user behavior particular to a specific user/organization. As another example, similarity for maintenance, repair and operations (MRO) products can be determined for various categories and/or properties such as: similarity based on product descriptions; similarity based on product categories; similarity based on product attributes (e.g., voltage/amperage, capacity, heat output, and/or any other attributes); similarity based on unit of measure; match based on GTIN (UPC identifier); similarity based on electrical power requirements; similarity based on materials (e.g., stainless steel, plastic, biodegradable, "green" alternatives, and/or any other attributes); curated alternatives based on product selection requirements performed by users associated with the organization and/or users associated with other organizations; curated alternatives identified by a developer or other user associated with an entity providing access to process 900; past user behavior by all users (e.g., what have other users indicated as alternatives, such as by including two items in a product group); past user behavior particular to a specific user/organization. In some embodiments, similarity scores can be generated for any of these properties and/or categories, and/or other properties and/or categories, and these similarity scores can be combined to generate a similarity score for a pair of items. Such a similarity score can be used to identify alternatives and/or to rank alternatives. In some embodiments, different similarity scores can be weighted differently. For example, past user behavior associated with the organization can be weighted more heavily than similarity based on unit of measure. In some embodiments, weights can be different for different users, such as if a user indicates that nutritional content or product attributes are especially important (either explicitly or implicitly), a similarity score that reflects similarity based on that category can be weighted more heavily.

In some embodiments, process 900 can determine whether a group of products is an alternative to a particular product or group of products. For example, if a product is composed of individual components, a group of products corresponding to the components can be identified as being an alternative to the product. In a more particular example, for a product (or item) such as a kit used to assemble a finished product, process 900 can identify the individual components as an alternative to the product. In another more particular example, for a single product (e.g., a finished product, a single package that includes multiple products) that can be assembled from components, process 900 can identify the components as being an alternative to the finished product. In some embodiments, process 900 can suggest a group of components as alternative to a product that is being presented and/or a product that is currently included on a general order guide. Additionally or alternatively, in some embodiments, where a group of products is an alternative to a product, and each product in the group is included in a particular order guide, process 900 can suggest the single product as an alternative to the group of products, especially if the single product presents an opportunity for savings.

Many examples exist of products that are composed of components. A very simple example is a package including multiple instances of the same item (e.g., a pack of 6 containers of a cleaning solution) can be an alternative to an equivalent amount of the same item in isolation and/or different sizes. As another example, a kit that includes various items that can be used to assemble a product (e.g., a kit that includes ingredients for a dish) can be an alternative to each item in isolation. In such an example, if it would be less expensive to purchase items corresponding to the items that are included in the kit, process 900 can suggest those items for inclusion as a group on a general order guide. As yet another example, a package that includes a variety of related items (e.g., various plastic utensils) can be an alternative to each item in isolation.

In some embodiments, if a particular product is available from a particular distributor, process 900 can identify alternatives that are available from a different distributor or distributors in the same portion of the distribution network. For example, if a particular product is available via a particular distributor, process 900 can present products available from that distributor as alternatives. As another example, if a particular product is available via the particular distributor, process 900 can present products available from a different distributor as alternatives. As yet another example, if a particular product is available via the particular distributor, process 900 can present a group of products available from the distributor as an alternative. As still another example, if a particular product is available via the particular distributor, process 900 can present a group of products available from a different distributor as an alternative. As a further example, if a particular product is available via the particular distributor, process 900 can present a group of products as alternative where one or more of the products presented as part of the group is available from the distributor and one or more of the other products presents as part of the group is available from a different distributor. In some embodiments, process 900 can present any combination of alternatives, including products available from the same distributor, products available from another distributor, and/or a group of products available from the same and/or a different distributor.

At 906, process 900 can determine an order for the identified alternatives. For example, process 900 can rank the potential alternatives based on how similar the alternatives are to the first item. Such a ranking can take into account multiple factors such as comparisons of the description and/or product category, size and/or unit of measure, nutritional content, product specifications, properties of the items, past user actions, menu planning and/or selection activities, cost, and the like.

At 908, process 900 can cause one or more of the identified alternatives to be presented to the user based on the ranking at 906. For example, process 900 can cause a highest ranked alternative to be presented, and in some cases, one or more other less highly ranked alternatives. In some embodiments, a cost difference of the alternative(s) can be presented to assist a user in determining which alternative (if any) to select. In such embodiments, the cost difference can be presented using various techniques, such as a unit price difference, a difference in price per count or measure (e.g., per 100 count, per ounce, per kilogram, and the like). Additionally or alternatively, in some embodiments, a cost difference can be presented based on a difference in expected cost per time (e.g., per week, per month, per year) based on how much of the first item (or first class of item) the organization ordinarily purchases, and how much of the first item can (or must) replaced with an alternative.

At 910, process 900 can determine whether to end process 900 using any suitable technique or combination of techniques without incorporating user feedback into a model used to identifying and/or rank identified alternatives. For example, if alternatives are being presented and a user does not select any of the alternatives prior to navigating away from the alternatives, process 900 can end without considering the navigation to be feedback about the alternatives. As another example, if alternatives are being presented and a user closes the user interface, process 900 can end without considering it to be feedback about the alternatives presented.

If process 900 determines at 910 that process 900 is to end ("YES" at 910), process 900 can move to 912, and process 900 can end. Otherwise, if process 900 does not determine at 910 that process 900 is to end ("NO" at 910), process 900 can move to 914. At 914, process 900 can determine whether input has been received that is indicative of a user's preferences regarding one or more presented alternatives. For example, if a user selects one or more particular alternatives for inclusion in a master list or product group, process 900 can determine that input was received that is indicative of a user's preferences (e.g., indicating that the user prefers the selected alternative(s)). As another example, if a user selects a user interface element to manually search for alternatives, process 900 can determine that input was received that is indicative of a user's preferences (e.g., that the user is dissatisfied with all of the presented alternatives). As yet another example, if a user selects a user interface element to request that additional alternatives be automatically surfaced, process 900 can determine that input was received that is indicative of a user's preferences (e.g., that the user is dissatisfied with all of the presented alternatives).

If process 900 determines that input indicative of preference has not been received ("NO" at 914), process 900 can return to 910 (or another earlier portion of process 900, such as 902). Otherwise, if process 900 determines that input indicative of preference has been received ("YES" at 914), process 900 can move to 916. At 916, process 900 can receive feedback regarding whether the suggested alternative (or one of the suggested alternatives) was added to the master list or product group, where in the master list or product group the alternative was added, if none of the alternatives were added to the master list, or if a user added an item to the master list that was surfaced via a user directed search, or any other feedback.

At 918, process 900 can use feedback received at 916 to update a model that is configured to identify and/or rank potential alternatives in the future. For example, as more users add a particular item to a master list that includes a first item, process 900 can determine that the item is more likely to be a preferred alternative to the first item. As another example, as users decline to add any of the presented alternatives, process 900 can determine that an item that has not been presented is likely to be a more preferred alternative. As yet another example, as users add an item to a master list or product group via a user directed search that was not included in an automatically surfaced set of alternatives for that master list or product group, process 900 can determine that the item is likely to be an appropriate alternative.

FIG. 10A shows an example of a user interface presenting multiple general order guides associated with a user (e.g., a user associated with an organization) in accordance with some embodiments of the disclosed subject matter. As shown in FIG. 10A, a user interface can be presented to a user associated with an organization and/or a user that has been granted permission to access information related to the organization. As shown in FIG. 10A, the user interface includes various general order guides that can each have identifying information (e.g., a semantically meaningful name), and can be associated with a distributor, any suitable number of items, and any suitable number of facilities. Note that in FIG. 10A, the number of items in the order guide corresponds to the number of product groups, which can each be associated with one or more items that may or may not be available for delivery to each facility. Additionally, the user interface shown in FIG. 10A includes a search field that can be used to search for a particular general order guide (or order guides), for items included in the general order guides, a "mass upload" user interface element that can be used to import information to be used to generate and/or update a general order guide, and a user interface element to add a "New" general order guide. Note that these features shown in FIG. 10A are an example, and a particular user interface that provides access to mechanisms described herein can include less information (e.g., distributor can be excluded), more information, and/or different information.

FIG. 10B shows an example of a user interface presenting details related to multiple facilities that can be associated with a particular general order guide in accordance with some embodiments of the disclosed subject matter. In some embodiments, a user can navigate to the user interface of FIG. 10B using any suitable technique or combination of techniques, such as by selecting one or more user interface elements associated with a particular general order guide in a user interface such as that shown in FIG. 10A. For example, a user can select a user interface element associated with the number of facilities associated with the general order guide, a user interface element associated with identifying information of the general order guide, a user interface element associated with live search results presented in connection with the search field, and/or any other suitable user interface element.

As shown in FIG. 10B, the user interface includes a name of the general order guide for which details are being presented, user interface elements (e.g., implemented as check boxes in FIG. 10B) associated with each location (and a select all element associated with the row that includes column headers) to select and/or deselect one or more particular facilities, and columns that can be used to present: the name of the various facilities shown; identifying information of the facility (e.g., which may be used by a distributor, by the organization, by the provider of the user interface, or any other suitable entity, to identify the facility when a semantically meaningful name may not be necessary or appropriate); physical address information associated with the facility (e.g., street address, suite number, city, state, country, zip code, postal code, any other suitable address information, or any suitable combination thereof); distributor information associated with the facility (e.g., a semantically meaningful name associated with a distribution center(s) that serves the facility, other identifying information such as an identification code associated with a distribution center(s) that serves the facility, or the like). Note that these features shown in FIG. 10B are an example, and a particular user interface that provides details about facilities that can be associated with the general order guide can include less information, more information, and/or different information.

As shown in FIG. 10B, the user interface also includes a user interface element to save associations of the selected locations with the order guide (labeled "Save Enabled Locations" in FIG. 10B). A user selects and/or deselects whichever of the facilities shown in the user interface, and can cause those facilities to be associated with the order guide by selecting the save user interface element. Note that in the example shown in FIG. 10B, selections are not saved until the user affirmatively selects the save user interface element. However, this is merely an example, and additionally or alternatively, associations of facilities with the order guide can be saved in real time as the user selects and/or deselects facilities.

Figure 10C:
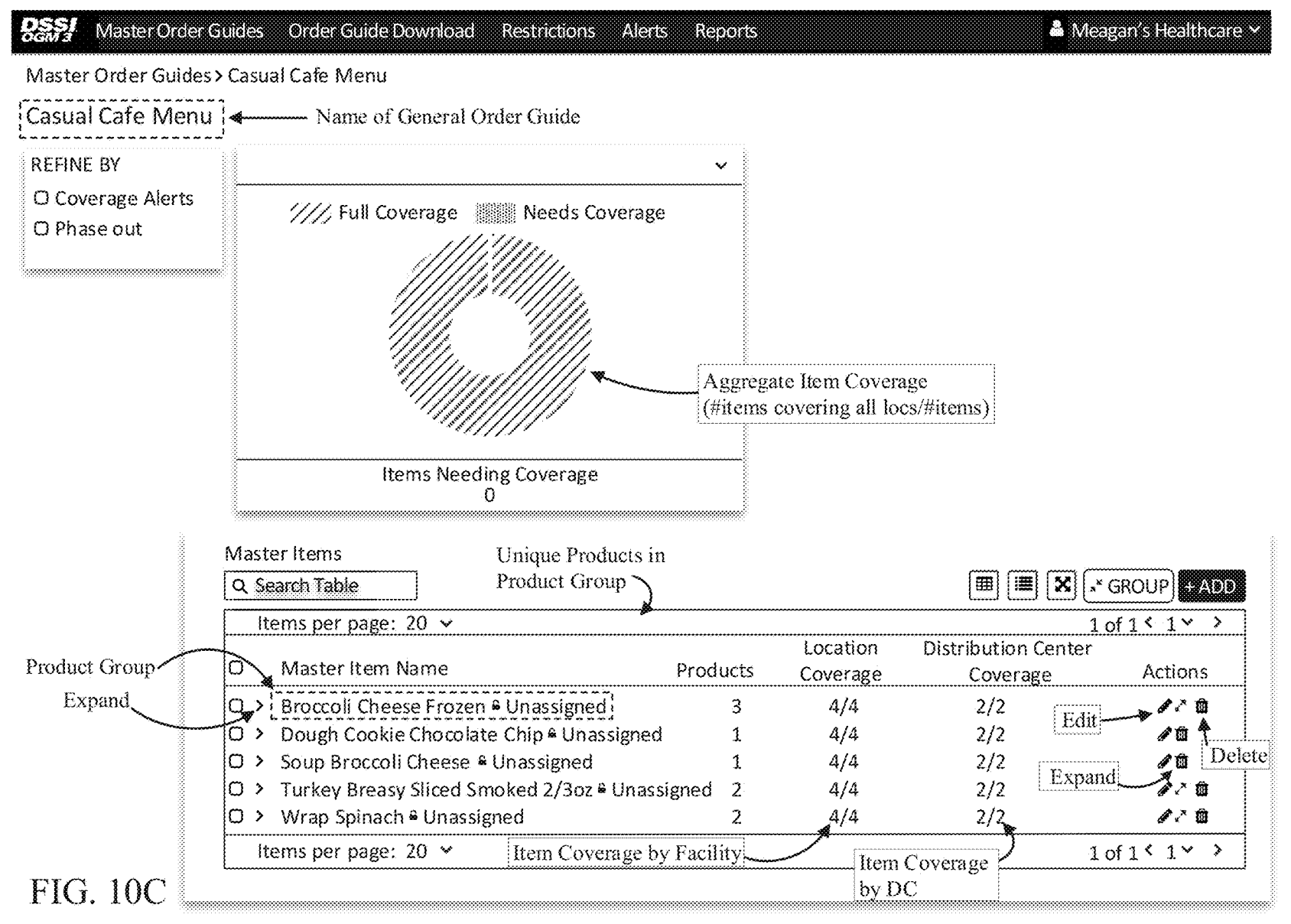

FIG. 10C shows an example of a user interface presenting coverage across facilities associated with a particular general order guide in accordance with some embodiments of the disclosed subject matter. In some embodiments, a user can navigate to the user interface of FIG. 10C using any suitable technique or combination of techniques, such as by selecting one or more user interface elements associated with a particular general order guide in a user interface such as that shown in FIG. 10A. For example, a user can select a user interface element associated with the number of product groups included in the general order guide, a user interface element associated with identifying information of the general order guide, a user interface element associated with live search results presented in connection with the search field, and/or any other suitable user interface element.

As shown in FIG. 10C, the user interface includes a name of the general order guide for which coverage details are being presented, user interface elements (e.g., implemented as check boxes in FIG. 10C) associated with each product group (and a select all element associated with the row that includes column headers) to select and/or deselect one or more particular product groups (e.g., to combine the selected product groups, to batch delete the selected product groups, to expand all of the selected product groups, or the like), and columns that can be used to present: the name of the product group; the number of unique items (e.g., based on SKU, UPC, product number, and/or any other suitable identifying information); the number of facilities associated with the general order guide for which the product group includes an item available in that facilities portion of the distribution network; the number of distribution centers serving the various facilities associated with the general order guide that can provide at least one of the items in the product group; and actions that can be performed for a particular product group (e.g., an edit user interface element, a user interface element to expand or show details related to items in a particular product group, delete a particular product group, or user interface elements corresponding to any other suitable action.

Additionally, as shown in FIG. 10C, the user interface includes a user interface element that graphically represents the number of product groups that include at least one item that is available in each facility that is associated with the general order guide (e.g., if at least one of the items in a product group is available in each facility that product group provides full coverage) as a portion of the total number of product groups. The user interface shown in FIG. 10C also includes user interface elements to refine results based on the presence of supplemental information (e.g., an alert being associated with a particular product group or item within the product group).

FIG. 10D shows an example of a user interface presenting an expanded view of a particular product group associated with a particular general order guide in accordance with some embodiments of the disclosed subject matter. A user can cause the user interface to present details about items in a particular product group, as shown in FIG. 10D, by selecting a particular user interface element or user interface elements. For example, by selecting one of the "expand" user interface elements shown in FIG. 10C.

FIG. 10E shows an example of a user interface presenting details related to a particular product group and suggested alternatives to items included in the product group in accordance with some embodiments of the disclosed subject matter. In some embodiments, a user can navigate to the user interface of FIG. 10E using any suitable technique or combination of techniques, such as by selecting one or more user interface elements associated with identifying information of a particular product group included in a general order guide, or by selecting an "edit" user interface element.

As shown in FIG. 10E, the user interface includes a name of the general order guide that includes the product group for which details are being presented, a name of the product group for which details are being presented, a field for editing the name of the product group, a user interface element that can be selected to "save" a current configuration, information about the number of facilities and/or distribution centers covered by the product group, information about the number of items in the product group, information associated with items included in the product group (e.g., which can similar to information described above in connection with the FIG. 10C), a user interface element for specifying a selection rule to be used when generating a facility order guide (e.g., implemented in FIG. 10E as a drop down), a portion for presenting alternative items that a user may wish to add to the product group, and other user interface elements (e.g., a "search" user interface element to initiate a user directed search to add one or more products to the product group, user interface elements to control how the information is presented, such as whether to include category information, or whether to include expanded descriptions of the items).

As shown in FIG. 10E, the portion of the user interface that includes suggested alternative items can present information associated with the items, and/or one or more user interface elements that can be selected to perform a particular action. For example, each row corresponding to an alternative item included in the suggested alternatives includes coverage information and information about whether the product would cover any gaps that are not currently covered by the product group. For example, as shown in FIG. 10E, the number of additional distribution centers covered by a particular item is shown in parentheses after information about how many distribution centers (and/or facilities) the item covers (i.e., the row includes a string of characters such as "(+X)" where X is the number of additional distribution centers that would be covered if that alternative item were added to the product group). Additionally or alternatively, the number of additional facilities covered by a particular item can be shown in parentheses after information about how many facilities (and/or distribution centers) the item covers. Additionally, each row corresponding to an alternative item included in the suggested alternatives includes a user interface element to cause the item to be added to the product group.

FIG. 10F shows an example of a user interface presenting details related to a particular product group and results of a user directed search in accordance with some embodiments of the disclosed subject matter. In some embodiments, a user can navigate to the user interface of FIG. 10F using any suitable technique or combination of techniques, such as by selecting a "search" user interface element to initiate a user directed search to add one or more products to the product group from the user interface shown in FIG. 10E.

As shown in FIG. 10F, the user interface includes a name of the general order guide that includes the product group to which items can be added, a name of the product group to which items can be added, a field for inputting search terms, a user interface element for causing a search to be performed, information about the number of facilities and/or distribution centers covered by the product group, information about the number of items in the product group, a search results portion in which results of a search can be presented, and various options that can be used to control how the search results are presented. As shown in FIG. 10F, a user interface element can be provided that allows a user to control whether items that would not improve coverage are presented (e.g., implemented as a check box associated with the text "Only Show Options with More [+] Coverage" in FIG. 10F. In some embodiments, the user interface shown in FIG. 10F can include a portion that presents one or more items that have already been added to the product group. For example, as shown in FIG. 10F, a "Spec Item" portion of the user interface shows a first item included in the product group. This can serve as a memory aid that can allow a user to, for example, more easily remember what the user is searching for, what size the user has previously selected. In some embodiments, a user interface element can be provided to allow a user to inhibit presentation of the "Spec Item" portion of the user interface.

Figure 10G:
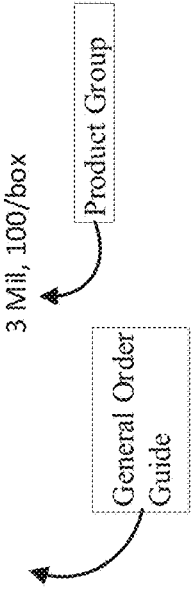
FIG. 10G shows an example of a user interface presenting a portion of a facility order guide for a particular facility generated from multiple general order guides associated with the facility in accordance with some embodiments of the disclosed subject matter.

FIG. 10G shows an example of a user interface presenting a portion of a facility order guide for a particular facility generated from multiple general order guides associated with the facility in accordance with some embodiments of the disclosed subject matter. In some embodiments, a user can navigate to the user interface of FIG. 10G using any suitable technique or combination of techniques, such as by selecting a particular facility from a list of one or more facilities associated with an organization, or by selecting the "Order Guide Download" user interface element, presented in the menu bar shown in FIG. 10F.

As shown in FIG. 10G, the user interface includes a name of the facility associated with the facility order guide, and columns that can be used to present: the name of a group order guide associated with the facility; the name of a product group included on the group order guide; identifying information of a product that was selected for inclusion on the facility order guide from items included in the product group (e.g., selected based on user-defined priority, stocking status, price, brand, and/or any other suitable criteria); a description of the selected item; a brand associated with the selected item; information indicative of the size of the item that was selected (e.g., the number of items included in a package, and a size of each item); and identifying information about a distribution center from which the selected item is available to the facility.

Figure 10H:
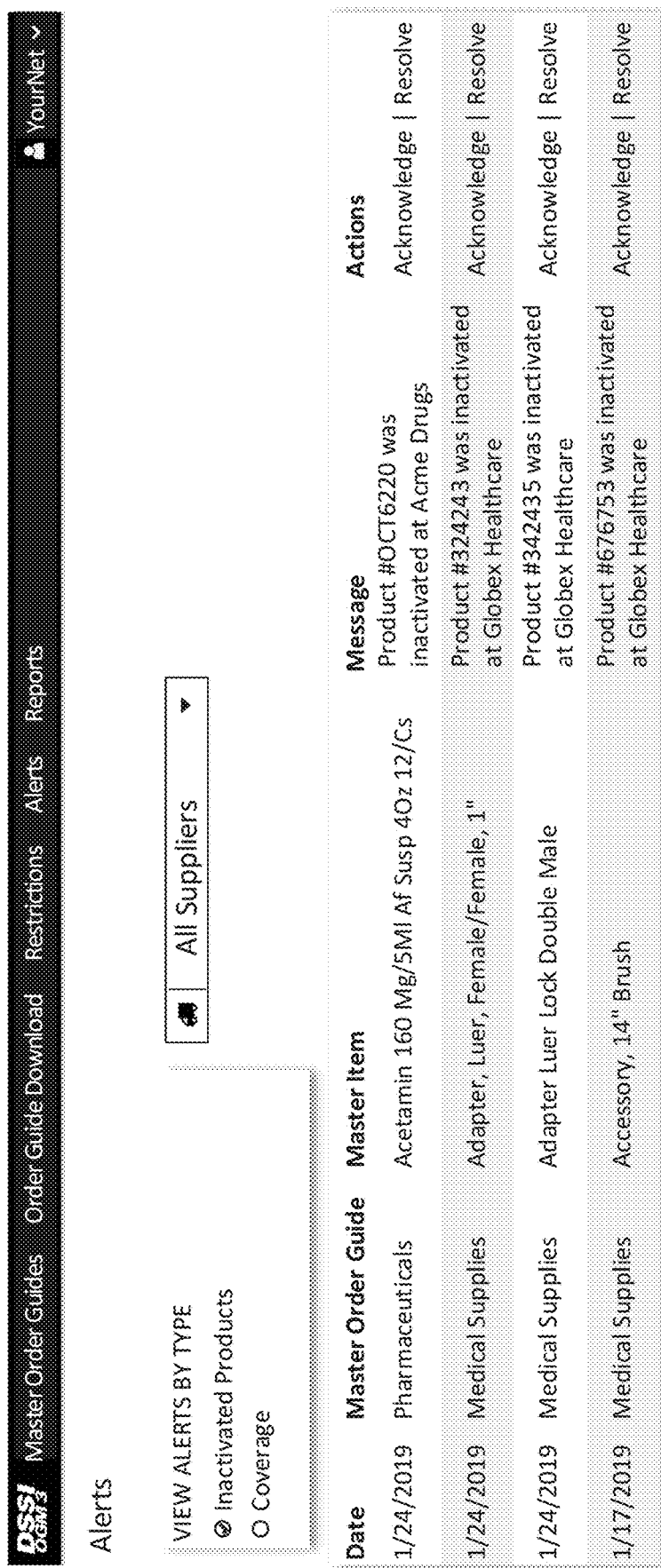
FIG. 10H shows an example of a user interface presenting alerts related to changes in status of particular items in accordance with some embodiments of the disclosed subject matter.

FIG. 10H shows an example of a user interface presenting alerts related to changes in status of particular items in accordance with some embodiments of the disclosed subject matter. As shown in FIG. 10H, the user interface can include a list of items that are included in a general order guide that have had a change in stocking status.

FIG. 10I shows an example of a user interface presenting alerts related to incomplete coverage for particular product groups across several general order guides in accordance with some embodiments of the disclosed subject matter. As shown in FIG. 10I, the user interface can include a list of product groups that are associated with a general order guide that are not covered across all of the facilities and/or distribution centers associated with the general order guide.

FIG. 10J shows an example of a report (presented as a spreadsheet in this example) that can be generated to show details of several general order guides and coverage for product groups within those general order guides across various distribution centers in accordance with some embodiments of the disclosed subject matter. As shown in FIG. 10J, the user interface can include a user interface element that causes data to be downloaded to a user's device and/or presented by a user's device (and/or to another service associated with the user) that can be used to generate a chart detailing which items are included in each product group and each general order guide, in which portions of the distribution network each product is available (e.g., by including a character, such as S, D, or R, in a cell associated with both the item and the distribution center representing a particular portion of the distribution network) and the stocking status of that item in each of the portions (e.g., by including a specific character corresponding to the stocking status), which item was selected for inclusion in a facility order guide (e.g., by including a character indicative of selection, such as the "*" character in FIG. 10J), and whether an item is proprietary (e.g., by including a character indicative of the item being proprietary, such as a lower case p in FIG. 10J, which can indicate that the item can only be ordered by one or more particular organizations selected by the distributor). One example of a proprietary item is a branded item that includes a particular organization's name and/or logo. Another example of a proprietary item is an exclusive item that is available to select organizations (e.g., organizations that have a particular contractual relationship with the supplier of the item).

FIG. 10K shows an example of a user interface presenting alternatives to a particular product in accordance with some embodiments of the disclosed subject matter. As shown in FIG. 10K, alternative items can be presented in a user interface that provides additional information about items that may not be generally available in other portions of the user interface. For example, as shown in FIG. 10K, the user interface can include fields that indicate whether a particular product is suitable for generating the same outcomes as an original item (e.g., in this case whether the alternative is suitable for use as a disinfectant for particular pathogens). As another example, the user interface can include rating information, information about how the product is to be used (e.g., in FIG. 10K the "delivery" method). In some embodiments, a user interface that presents a comparison of various properties of an item, such as the user interface shown in FIG. 10K, can be presented in response to any suitable action. For example, selection of a "compare" user interface element while searching for items can cause such a user interface to be presented for various products that the user has manually selected. As another example, such a user interface can be presented in response to any action that triggers presentation of alternatives (e.g., as described above in connection with 808 and 810 of FIG. 8).

Figure 11A:
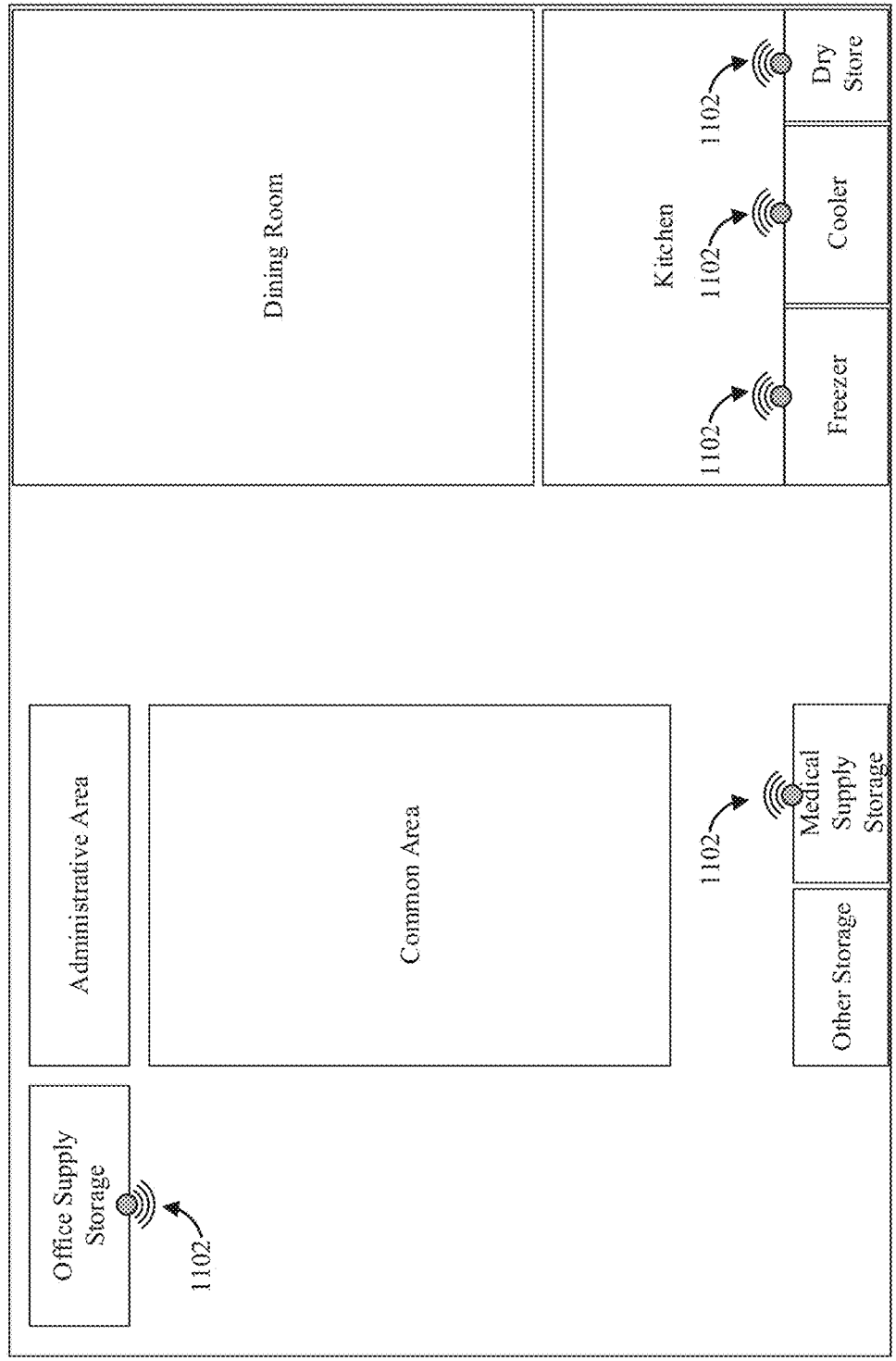
FIG. 11A shows an example of a portion of an inventory management system in accordance with some embodiments of the disclosed subject matter.

FIG. 11A shows an example 1100 of a portion of an inventory management system in accordance with some embodiments of the disclosed subject matter. As shown in FIG. 11A, a facility can include various storage areas, and each storage area can be associated with at least one transmitting device 1102. In some embodiments, each transmitting device 1102 can be configured to transmit identifying information associated with the transmitting device using any suitable technique or combination of techniques. For example, one or more transmitting devices 1102 can be configured to emit radio frequency (e.g., in the ultrahigh frequency band from 300 megahertz to 3 gigahertz) signals with a relatively short range (e.g., by transmitting at low power) that are encoded with identifying information. In a more particular example, one or more transmitting devices 1102 can be configured to operate as Bluetooth beacons that transmit a universally unique identifier (UUID). As another example, one or more transmitting devices 1102 can be configured to emit other types of signals, such as sound (e.g., ultrasound) or light (e.g., infrared light) that is encoded with identifying information.

In some embodiments, each transmitting device 1102 can be associated with a location (e.g., a storage location, a room, a particular portion of a hallway, a door, and the like) within the facility. In such embodiments, the location of each transmitting device 1102 can be associated with identifying information of the transmitting device. For example, an inventory management system and/or inventory management service (e.g., inventory management service 406) can be used to create and/or maintain a data structure that includes identifying information of each transmitting device and associated location information. In a more particular example, the location information can be maintained in a database.

In some embodiments, a computing device (e.g., a mobile computing device) can detect a signal transmitted by a particular transmitting device 1102, and can decode the signal to determine the identifying information of the particular transmitting device. Additionally, in some embodiments, the computing device can infer the distance from the strength of the detected signal.

In some embodiments, as described below in connection with FIG. 12, an inventory management system can associate particular items in a facility's inventory with particular locations associated with a beacon, such that when an item is desired a user can request the location. Additionally, when storing inventory an inventory management system can receive an indication that a particular item is being stored, and can associate the item with a particular storage location based on identifying information associated with a transmitting device 1102.

Figure 11B:
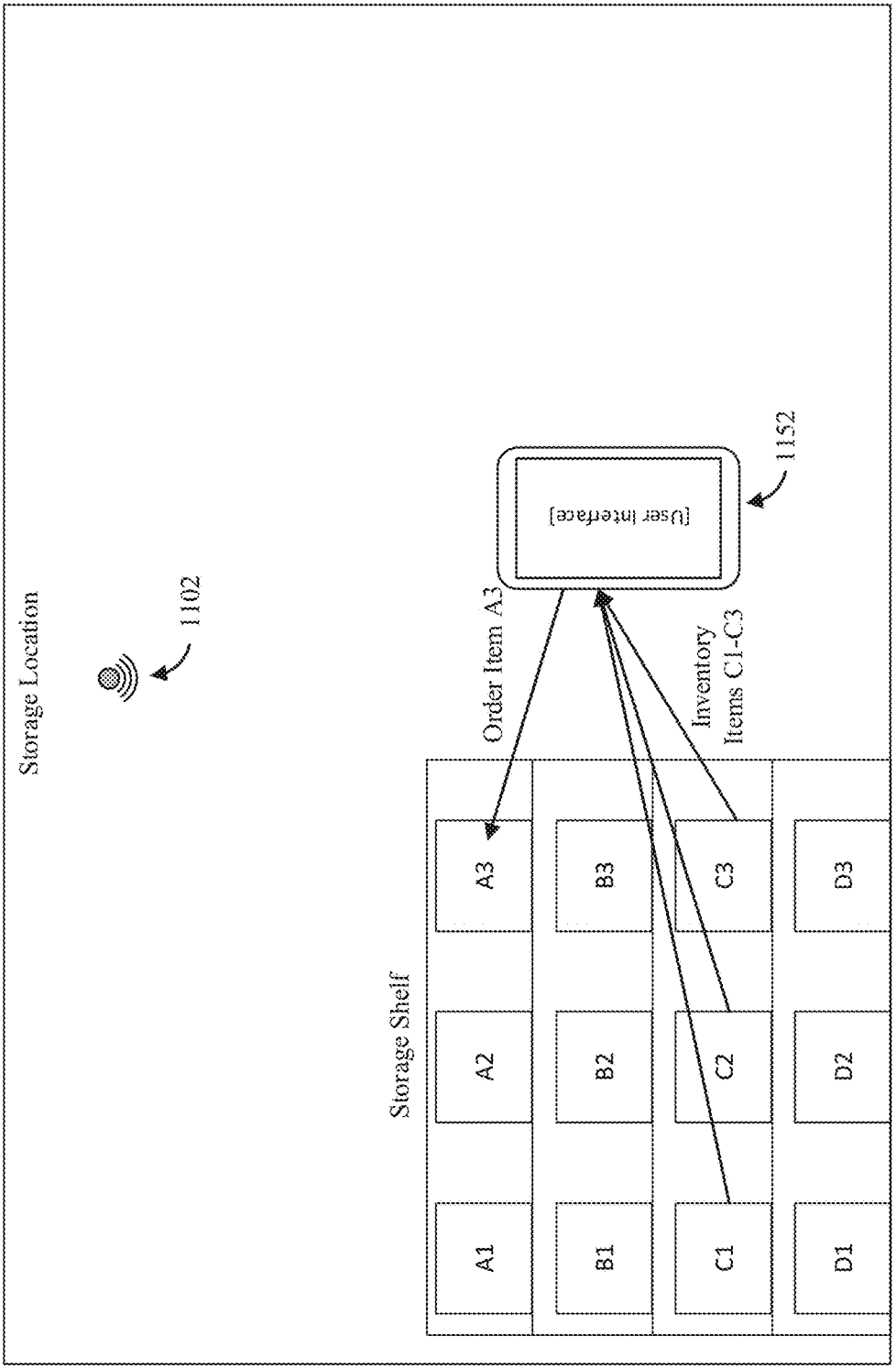
FIG. 11B shows an example of a different portion of the inventory management system in accordance with some embodiments of the disclosed subject matter.

FIG. 11B shows an example 1150 of a different portion of the inventory management system in accordance with some embodiments of the disclosed subject matter. As shown in FIG. 11B, items can be stored in a location associated with a particular transmitting device 1102. In some embodiments, a user device 1152 can be used during storage of one or more items to add the items to an inventory associated with the location of the transmitting device. In some embodiments, user device 1152 can be associated with an employee of an organization that maintains the facility in which the storage location is located. Additionally or alternatively, in some embodiments, user device 1152 can be associated with an employee of a distributor.

In some embodiments, any suitable technique or combination of technique can be used to indicate that a particular item is being stored in the current location. For example, a user can be presented with a list of items (e.g., in a shipment, currently in inventory, and the like), and can provide input indicating which items are being stored at the current location.

As another example, a user can be prompted to capture information associated with a particular item. In such an example, the information can be identifying information of the item that specifically identifies the particular item and/or that identifies what the item is. In such an example, the user can be prompted to capture an image of a bar code associated with the item, which can be used to extract a UPC associated with the item. Additionally or alternatively, other techniques can be used to convey information, such as a QR code, a passive RFID device, a passive near field communication (NFC) device, and the like, which can be used to convey information about the item, such as a SKU, a UPC, a description of the item, a unique string of characters associated with that particular item, and the like.

Additionally, in some embodiments, user device 1152 can present a user interface that facilitate adding items that are in the storage location to an order. For example, in some embodiments, a user can provide input indicating that the user would like to reorder an item, and the user can be prompted to capture an image (or bring user device 1152 into scanning range for techniques such as NFC and RFID) of the item and/or a code associated with the item. Upon capturing such information, user device 1152 can transmit identifying information extracted from the image or signal (and/or can transmit the image or signal itself) to an order management system to be added to an order.

Figure 11C:
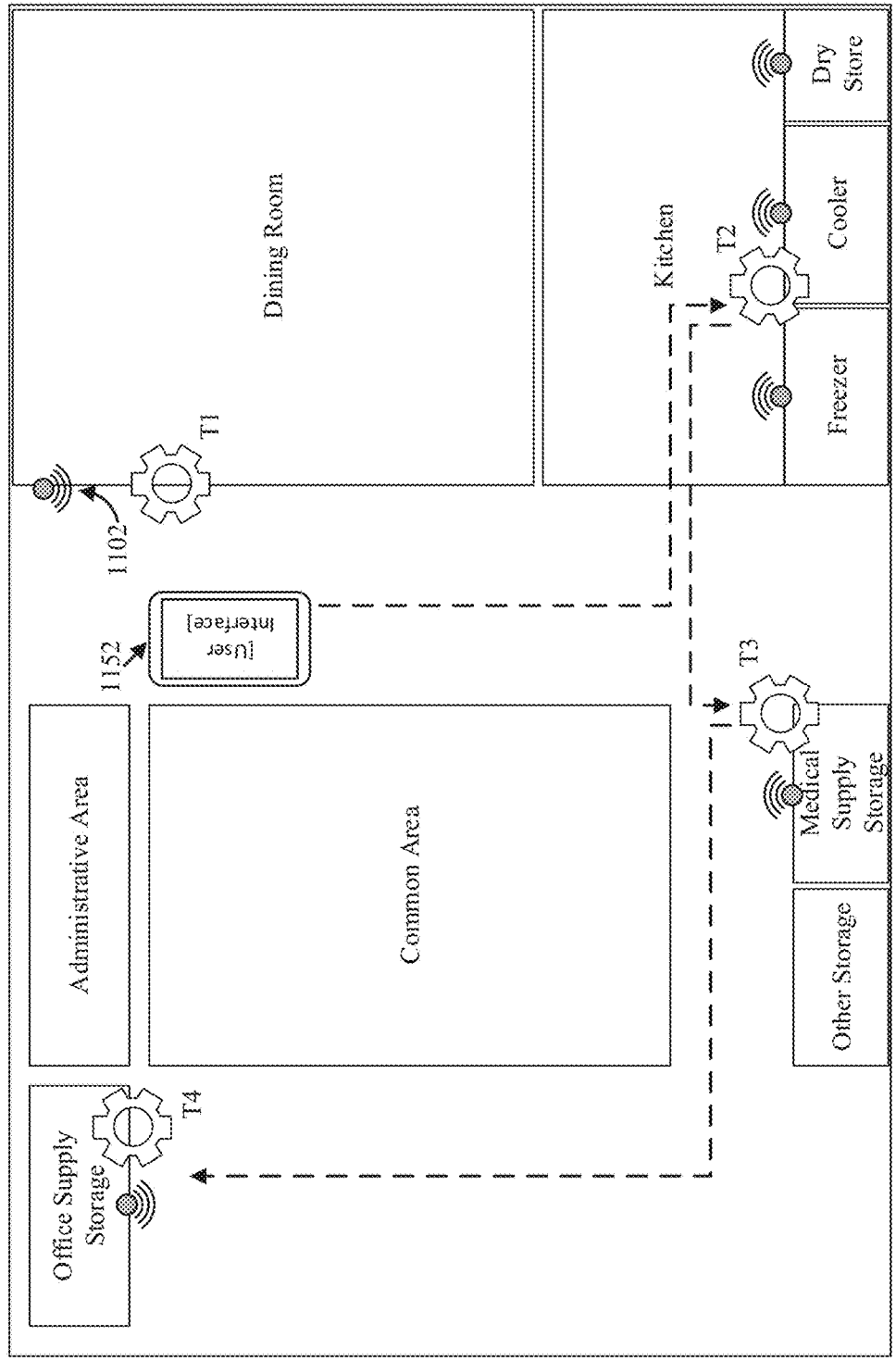
FIG. 11C shows an example of a portion of a task management system that can be used in connection with an inventory management service in accordance with some embodiments of the disclosed subject matter.

FIG. 11C shows an example 1170 of a portion of a task management system that can be used in connection with an inventory management service in accordance with some embodiments of the disclosed subject matter. In some embodiments, location information of transmitting devices 1102, the storage location of items recorded by an inventory management, and/or information about a facility's layout can be used to provide a user with a location-based workflow and/or to verify that a user has performed tasks in particular locations. For example, as shown in FIG. 11C, tasks (shown as gear icons in FIG. 11C) can be associated with various items and/or locations (e.g., tasks T1, T2, T3, and T4). Such tasks can be placed in a workflow, which can be an ordered workflow (if at least two of the tasks must be performed in a particular order) or a non-ordered workflow. In some embodiments, user device 1152 can be used to provide a user interface that can present a list (or map, graph, or any other type of user interface) or tasks to be performed, and can guide a user along paths through the facility to the location associated with the task. In some embodiments, a task management system can create an order for the workflow based on the location associated with each task to (and/or based on the current location). In such embodiments, the task management system can take into account an order in which the tasks must be performed. For example, if no order is required, the task management system can create a workflow based on location, such that the user can efficiently move between tasks. As another example, if an order is required, the task management system can prompt the user to perform the tasks in the specified order, while also attempting to create an order that does not unnecessarily add travel. Note that tasks can also have timing requirements which the task management system can take into account when creating a workflow.

As another example, the task management system can be used assist personnel in performing an inventory in a variety of storage locations within a facility. For example, the task management system can provide a user interface that presents how much of each item is expected to be in inventory at each location, and can receive information about which items are actually in inventory at each location. The task management system can then be used to rectify one or more discrepancies, to locate items that are in inventory but are not in the expected/correct location, to determine whether any surplus or deficit of inventory exists, and/or any other tasks associated with tracking inventory.

Figure 12:
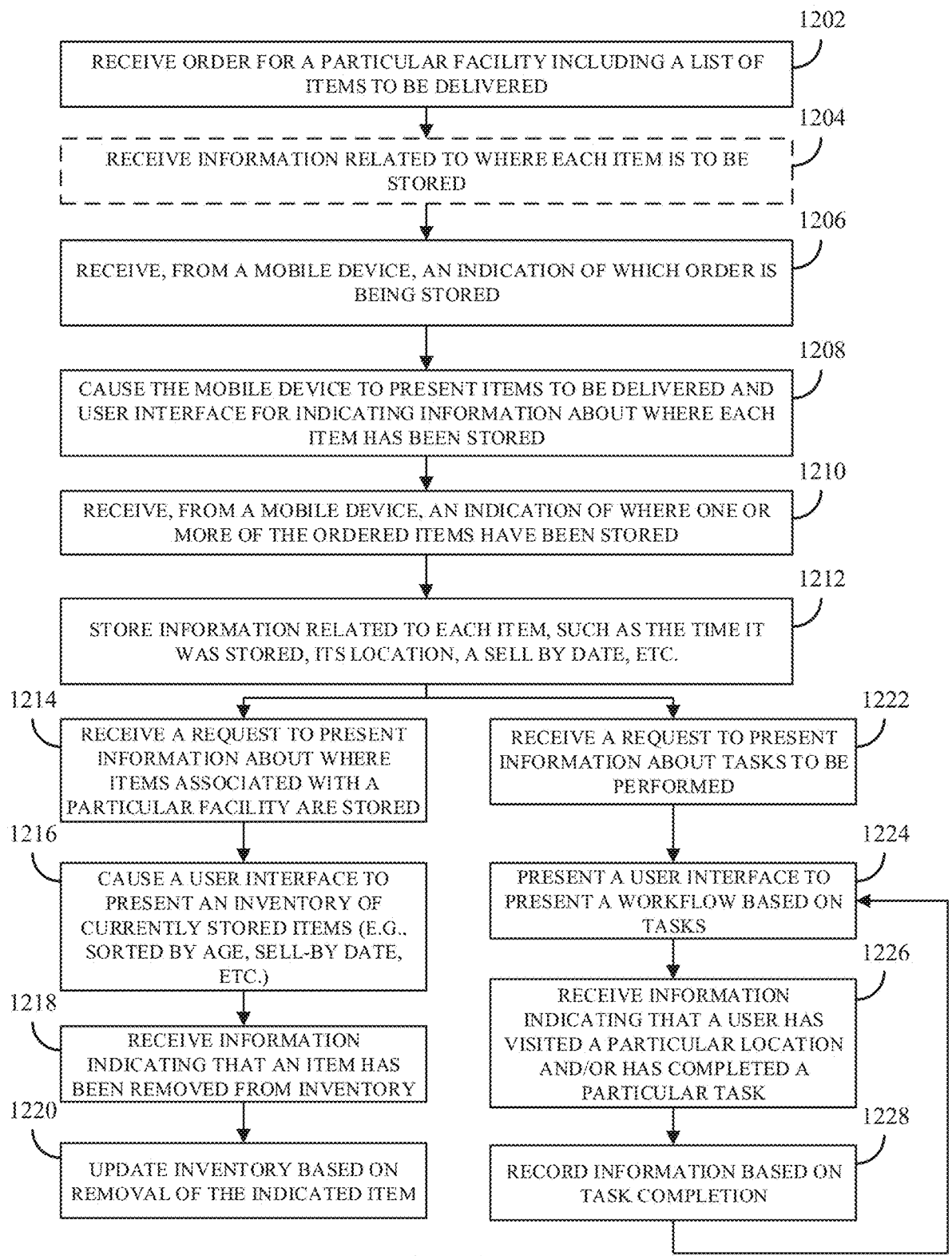
FIG. 12 shows an example of a process for managing inventory in accordance with some embodiments of the disclosed subject matter.

FIG. 12 shows an example 1200 of a process for managing inventory in accordance with some embodiments of the disclosed subject matter. As shown in FIG. 12, at 1202, process 1200 can receive an order for a particular facility including a list of items to be delivered. For example, at least a portion of process 1200 can be executed by an order management service. As another example, process 1200 can receive ordering information from an order management system.

At 1204, process 1200 can receive information related to where each item is to be stored in the facility. For example, during order creation each item can be associated with a storage location, such as dry storage, freezer, cooler, and the like. In some embodiments, when ordering or inventorying certain consumable items (e.g., those that require replenishment periodically at regular and/or irregular intervals) a purchaser can be required to specify a location where the item is to be stored until used (e.g., a supply closet, a walk-in freezer, dry storage, or the like). Associating the item with a physical location can facilitate accurate tracking of inventory for each storage location. Additionally, this can facility implementation of shelf-to-sheet inventory tracking by associating a "shelf" location with each item.

At 1206, process 1200 can receive, from a mobile device, an indication of an order that is being placed in storage at a facility. For example, process 1200 can receive identifying information associated with the order, such as an order number, an invoice number, and the like, associated with the order. In such an example, the identifying information can be conveyed as a string of characters (e.g., as entered by a user, as extracted from a visual code, as extracted from a signal, and the like).

At 1208, process 1200 can cause the mobile device to present items that are to be delivered and a user interface that can be used to indicate which items are being stored and/or at which location the item is being stored.

At 1210, process 1200 can receive, from the mobile device, an indication of where one or more of the ordered items are being stored. For example, such an indication can be a transmission indicating that a particular item is being stored, and information that can be used to determine the location, such as a UUID of a transmitting device associated with a particular location. In some embodiments, a user associated with the organization can operate the mobile device that transmits the indication of where one or more of the ordered items are being stored. For example, the user can be an employee of the organization that is responsible for managing inventory of one or more types of product (e.g., food, cleaning supplies, medical supplies, medication). In some embodiments, a user associated with the distributor can operate the mobile device that transmits the indication of where one or more of the ordered items are being stored. For example, the user can be an employee of the distributor that delivered the ordered items to the facility, and that is also responsible for stocking the items in one or more areas designated by the organization.

At 1212, process 1200 can store information related to each item that is being stored in an inventory management data structure. For example, process 1200 can store information such as the time an item was stored, a location at which it was stored, a sell-by date associated with the item, a date of manufacture, and the like.

At 1214, process 1200 can receive a request to present information about where items associated with a particular facility are stored. For example, an employee of the organization associated with the facility can access the inventory management service via a computing device (e.g., a mobile computing device or a desktop computing device). In some embodiments, such a request can be initiated by an application that is used to guide an employee through a workflow that is, in part, based on retrieving items that are stored at various locations throughout a facility. For example, a new employee (e.g., especially in high turnover environments) may find it difficult to find all of the items required to perform a particular task, and the employee can be provided with a mobile device that can execute an application to provide directions to the employee based on the location of various items as recorded by the inventory management service. As another example, if an employee's job required interacting with a large number of items that are stored throughout a building or set of buildings, it can be difficult for the employee to consistently locate all of the items. This can be exacerbated if the items are not consistently stored in the same locations. In such an example, the employee can be provided with access to the inventory management service (e.g., via a mobile device executing an application) to assist the employee in locating the items required to perform the employee's job.

At 1216, process 1200 can cause a user interface to be presented using the computing device. Such a user interface can include inventory information about currently stored items which can be presented in any suitable fashion. For example, the items can be sorted by age, sell-by date, name, and the like.

At 1218, process 1200 can receive information indicating that an item has been removed from inventory. For example, a user can be prompted to capture an image of an item when retrieving the item, and process 1200 can use the image (or information extracted from the image) to determine which item is being removed from inventory.

At 1220, process 1200 can update the inventory associated with the facility based on the removal of the indicated item. In some embodiments, process 1200 can determine that a supply of a particular type of item is below a threshold level based on the updated inventory, and can prompt a user to add such an item to an order and/or can automatically add such an item to an order.

At 1222, process 1200 can receive a request to present information about tasks to be performed. In some embodiments, the tasks to be performed can be associated with a particular user (e.g., by an administrative user), and the request can be received from a device and/or application associated with the particular user. Additionally or alternatively, the tasks can be associated with a particular group and/or a particular activity. For example, the tasks can be associated with the maintenance staff, or with maintaining a particular system(s). In some embodiments, a list of tasks can be presented, which can, in some cases, include subtasks.

At 1224, process 1200 can cause a user interface to be presented that presents at least a portion of a workflow based on the tasks to be performed. In some embodiments, the workflow can include a list of tasks to be performed, with an indication of whether any other tasks must be performed in a particular order and/or within a particular period of time. Additionally or alternatively, in some embodiments, the workflow can be presented graphically in connection with a depiction of locations within a facility at which the tasks are to be performed. For example, tasks can be presented as icons associated with particular locations, and a suggested path between locations can be presented in the user interface. Additionally, in some embodiments, one or more user interface elements can be provided that allow the user to indicate that a task has been completed, to provide information about the task and/or about the location or system associated with the task. For example, the user can provide notes about how the task was performed, or about anything unusual that occurred while performing the task. As another example, the user can capture an image of the location before and/or after the task was performed, which can be used to verify that the task was completed.

At 1226, process 1200 can receive information indicating that a user has visited a particular location and/or that the user has completed a particular task. For example, a mobile device can provide location information indicating whether the device has entered an area at which a task was to be performed. This can be used to verify, for example, that security personnel have visited a particular door and/or secure location. As another example, a user can provide input (e.g., by selecting a user interface element associated with a task) to indicate that a particular task has been completed. As yet another example, a user can provide input indicating that certain items have been retrieved, or that an item to be retrieved was missing.

At 1228, process 1200 can record information based on the task being completed and/or the particular location being visited. For example, if a particular task is to be performed periodically, process 1200 can record when the task is completed and use the recorded information to track when the task is to be performed again. As another example, if a workflow requires visiting certain locations, process 1200 can determine which locations have and have not been visited. After recording such information, process 1200 can return to 1224 to present an updated user interface reflecting completion of the task and/or presenting a new task to be completed.

It should be noted that, as used herein, the term mechanism can encompass hardware, software, firmware, or any suitable combination thereof.

It should be understood that the above described steps of the processes of FIGS. 6-9, and 12 can be executed or performed in any order or sequence not limited to the order and sequence shown and described in the figures. Also, some of the above steps of the processes of FIGS. 6-9, and 12 can be executed or performed substantially simultaneously where appropriate or in parallel to reduce latency and processing times.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for automatically generating order guides for a plurality of facilities associated with an organization, the method comprising:

receiving, using at least one processor, a set of login information associated with a user;

in response to receiving the set of login information, generating, using the at least one processor, a request for authentication data associated with the user, wherein the authentication data includes credentials stored in a database;

upon authentication, causing a user interface to be presented to the user;

receiving, via the user interface, a request to present items available via a distribution network including a distributor, wherein a first facility of the plurality of facilities is located within a first portion of the distribution network and is not located within a second portion of the distribution network;

causing the user interface to present a plurality of selectable user interface elements, each of the plurality of selectable user interface elements corresponding to an item available from the distributor;

determining that a first item that is included in a general order guide associated with the organization is not available in the first portion of the distribution network, wherein the general order guide is useable to create a plurality of facility order guides, each of the plurality of facility order guides corresponding to a respective facility of the plurality of facilities associated with the organization;

identifying at least one potential substitute for the first item, wherein the at least one potential substitute includes a second item;

determining that the second item is available in the first portion of the distribution network;

causing the user interface to present information indicative of availability of the second item in the first portion of the distribution network;

receiving, via the user interface, a request to add the second item to the general order guide, the request to add the second item generated in response to selection of a first selectable user interface element associated with the second item;

receiving, via the user interface at a first time, a request to associate the general order guide with the plurality of facilities;

receiving, at a second time subsequent to the first time, a request to generate the plurality of facility order guides based on the general order guide, wherein each facility order guide of the plurality of facility order guides is to include items from the general order guide that are available in a portion of the distribution network associated with the respective facility and excludes items from the general order guide that are not available in the portion of the distribution network associated with the respective facility;

receiving, from a system associated with the distributor, real time availability information for the first item in the first portion of the distribution network;

determining that the first item is unavailable in the first portion of the distribution network based on the received availability information;

automatically selecting the second item for inclusion in the first facility order guide in lieu of the first item and excluding the first item from the first facility order guide based on unavailability of the first item in the first portion of the distribution network at the second time;

causing the first facility order guide to be associated with the first facility for use when creating an order for one or more items to be delivered to the first facility via the distribution network;

receiving, via an application program interface (API), a request for the first facility order guide from a procurement system; and in response to the request, providing the first facility order guide to the procurement system, the procurement system configured to:
  use the first facility order guide to populate a procurement system user interface that facilitates generation of an order by a user associated with the first facility such that the order includes a plurality of items included in the first facility order guide, and
  place the order with the distributor.

2. The method of claim 1, further comprising:
receiving identifying information associated with the organization and organization metadata; and
associating the organization with at least one portion of the distribution network based on at least one of the identifying information and the organization metadata.

3. The method of claim 1, wherein the first portion of the distribution network corresponds to a first geographic area, and the second portion of the distribution network corresponds to a second geographic area that is different than the first geographic area.

4. The method of claim 3, wherein the distribution network comprises a plurality of distribution centers, each of the plurality of distribution centers is associated with a particular distributor of a plurality of distributors that includes the distributor, and the first geographic area is associated with no more than a single distribution center associated with any one distributor of the plurality of distributors.

5. The method of claim 3, wherein the distribution network comprises a plurality of distribution centers that is each associated with a particular distributor of a plurality of distributors that includes the distributor, and the first geographic area is associated with a subset of distribution centers of the plurality of distribution centers.

6. The method of claim 3, wherein the distribution network comprises a plurality of distribution centers that is each associated with a particular distributor of a plurality of distributors that includes the distributor, and at least one of the plurality of distribution centers is associated with both the first geographic area and the second geographic area.

7. The method of claim 3,
wherein the first facility is located within the first geographic area,
  the organization is associated with a second facility that is located within the second geographic area, and
wherein determining that the first item is not available from the distributor in the first portion of the distribution network comprises determining that the first item is not available via a distribution center corresponding to the first geographic area.

8. The method of claim 7, further comprising receiving a request to associate the general order guide with a group of facilities including the first facility and the second facility.

9. The method of claim 8, further comprising:
in response to receiving the request to generate the plurality of facility order guides, determine that the first facility is associated with the group of facilities;

in response to determining that the first facility is associated with the group of facilities, determining that the general order guide is associated with the group of facilities; and in response to determining that the general order guide is associated with the group of facilities, generating the plurality of facility order guides based on the general order guide.

10. The method of claim 1, further comprising:
determining that the general order guide is associated with the plurality of facilities including the first facility,
  wherein at least one facility of the plurality of facilities is associated with the second portion of the distribution network;
determining which of the plurality of facilities are covered for the first item,
  wherein a facility of the plurality of facilities is covered for the first item when the first item is available in a portion of the distribution network associated with that facility; and
causing a user interface element to be presented via the user interface,
  wherein the user interface element conveys information that is indicative of a proportion of the plurality of facilities covered for the first item.

11. The method of claim 10, further comprising:
causing identifying information of the second item to be presented via the user interface;
determining which of the plurality of facilities are covered for the second item; and
causing a second user interface element to be presented, via the user interface, that conveys information that is indicative of how many additional facilities of the plurality of facilities would be covered for at least one of the first item and the second item if the second item were designated as a substitute for the first item.

12. The method of claim 1, further comprising:
receiving a request to create a product group associated with the general order guide;
receiving a request to add the first item to the product group;
receiving a request to add the second item to the product group; and
in response to the request to generate the plurality of facility order guides, causing at least one item from the product group to be selected for inclusion in each of the plurality of facility order guides.

13. The method of claim 1, further comprising:
receiving a request to create a second general order guide;
receiving, via the user interface, a request to add a third item that is available in the distribution network to the second general order guide;
receiving a request to associate the second general order guide with the first facility; and
automatically selecting the third item for inclusion in the first facility order guide based on the association of the second general order guide with the first facility.

14. The method of claim 13, further comprising:
receiving price information associated with the organization,
  wherein the price information includes prices for a multiplicity of items available in the distribution network including a price for the third item and a price for a fourth item;
submitting, to a database of potential substitutes without user intervention, a query for one or more items that are substitutes for the third item;

receive, in response to the query, identifying information of the fourth item as being a substitute for the third item;
determining that the third item is available in the first portion of the distribution network;
receiving order history information indicative of an amount of the third item ordered by a set of facilities associated with the organization, including at least the plurality of facilities, over a particular period of time;
determining potential savings based on a cost of purchasing an equivalent amount of the fourth item;
causing the user interface to present the potential savings and a second selectable user interface element that is selectable to add the fourth item to the second general order guide; and
receiving, via the user interface, a request to add the fourth item to the second general order guide in response to selection of the second selectable user interface element.

15. The method of claim 14, further comprising:
receiving, for a plurality of items including the fourth item, rebate information from at least one of a third party cooperative organization, a manufacturer, and a distributor, where the rebate information indicates a price deviation to which the organization is entitled; and
determining the price for the fourth item using the rebate information.

16. The method of claim 1, wherein identifying at least one potential substitute for the first item that is available in the first portion of the distribution network includes utilizing a trained model to identify the second item as being a potential substitute based on metadata associated with the first item and metadata associated with the second item.

17. The method of claim 16, further comprising:
causing the user interface to present the second item as a potential substitute for the first item;
receiving feedback indicating that a request was received to add the second item to the general order guide subsequent to the second item being presented as a potential substitute for the first item; and
updating the trained model based on the feedback such that the trained model is more likely to suggest the second item as a potential substitute for the first item.

18. The method of claim 16, further comprising:
providing metadata associated with the first item to the trained model;
providing metadata associated with the second item to the trained model;
receiving output from the trained model indicating that the second item is a substitute for the first item;
updating, based on the output, a database of potential substitutes to indicate that the second item is a substitute for the first item; and
querying, without user intervention, a database of potential substitutes for one or more items that are substitutes for the third item.

19. The method of claim 16, further comprising:
providing the metadata associated with the first item to the trained model,
wherein the metadata associated with the first item comprises information descriptive of the first item;
providing the metadata associated with the second item to the trained model,
wherein the metadata associated with the second item comprises text descriptive of the second item;
receiving output from the trained model indicating that the second item is a substitute for the first item;
updating, based on the output, a database of potential substitutes to indicate that the second item is a substitute for the first item; and
querying, without user intervention, the database of potential substitutes for one or more items that are substitutes for the third item.

20. A system for automatically generating an order guide for a facility associated with an organization, the system comprising:
at least one hardware processor that is programmed to:
receive a set of login information associated with a user;
in response to receiving the set of login information, generate a request for authentication data associated with the user, wherein the authentication data includes credentials stored in a database;
upon authentication, cause a user interface to be presented to the user;
receive, via the user interface, a request to present items available via a distribution network including a distributor,
wherein a first facility of the plurality of facilities is associated with a first portion of the distribution network and not being associated with a second portion of the distribution network;
cause the user interface to present a plurality of selectable user interface elements, each of the plurality of selectable user interface elements corresponding to an item available from the distributor;
determine that a first item that is include in a general order guide associated with the organization is not available in the first portion of the distribution network;
identify at least one potential substitute for the first item,
wherein the at least one potential substitute includes a second item;
determine that the second item is available in the first portion of the distribution network;
cause the user interface to present information indicative of availability of the second item in the first portion of the distribution network;
receive, via the user interface, a request to add the second item to the general order guide, the request to add the second item generated in response to selection of a first selectable user interface element associated with the second item;
receive, via the user interface at a first time, a request to associate the general order guide with the plurality of facilities;
receive, at a second time subsequent to the first time, a request to generate the plurality of facility order guides based on the general order guide,
wherein each facility order guide of the plurality of facility order guides is to include items from the general order guide that are available in a portion of the distribution network associated with the respective facility and exclude items from the general order guide that are not available in the portion of the distribution network associated with the respective facility;
receiving, from a system associated with the distributor, real time availability information for the first item in the first portion of the distribution network;

determining that the first item is unavailable in the first portion of the distribution network based on the received availability information;

automatically select the second item for inclusion in the first facility order guide in lieu of the first item and excluding the first item from the first facility order guide based on unavailability of the first item in the first portion of the distribution network at the second time;

cause the first facility order guide to be associated with the first facility for use when creating an order for one or more items to be delivered to the first facility via the distribution network; and receiving, via an application program interface (API), a request for the first facility order guide from a procurement system; and in response to the request, provide the first facility order guide to a procurement system in response to a request for the first facility order guide from the procurement system, the procurement system configured to:

request the first facility order guide from the system for automatically generating an order guide for a facility associated with an organization;

use the first facility order guide to populate a procurement system user interface that facilitates generation of an order by a user associated with the first facility such that the order includes a plurality of items included in the first facility order guide, and place the order with the distributor.

21. The system of claim 20, further comprising:
a database comprising information about items available in the distribution network from the one or more distributors;
wherein the at least one hardware processor that is further programmed to:
submit a query to the database for information about the first item; and
determine that the first item is not available in the first portion of the distribution network based on a response to the query.

22. The system of claim 21, wherein
the distribution network comprises a plurality of distribution centers,
each of the plurality of distribution centers is associated with a particular distributor of a plurality of distributors that includes the distributor, and
the database comprises information indicative of which of the items available in the distribution network from the plurality of distributors is covered by each distribution center of the plurality of distribution centers.

23. The system of claim 22, wherein the at least one hardware processor that is further programmed to:
query, without user intervention, the distribution network for changes to the availability of items included in the database;
receive, in response to the query, an indication that the first item is no longer available from the one or more distributors;
prompt a user to select a new item proposed by a trained model as a substitute for the first item, wherein the new item is the second item;

in response to prompting the user, receive feedback indicating that the user selected the second item as a substitute for the first item;
update, based on the feedback, a database of potential substitutes to indicate that the second item is a substitute for the first item; and
query, without user intervention and subsequent to updating the database of potential substitutes, the database of potential substitutes for one or more items that are substitutes for the first item.

24. The system of claim 20, further comprising:
a database comprising price information associated with the organization related to items available in the distribution network from the one or more distributors;
wherein the at least one hardware processor that is further programmed to:
receive updated price information associated with the organization,
wherein the updated price information includes prices for a multiplicity of items available in the distribution network including a price for a third item and a price for a fourth item;
update the database based on the updated price information;
identify at least one potential substitute for the third item;
determine that the third item is available in the first portion of the distribution network;
receive order history information indicative of an amount of the third item ordered by a set of facilities, including at least the plurality of facilities, associated with the organization over a particular period of time;
determine potential savings based on a cost of purchasing an equivalent amount of the fourth item;
cause the user interface to present the potential savings and a second selectable user interface element that is selectable to add the fourth item to a second general order guide; and
receive, via the user interface, a request to add the fourth item to the second general order guide in response to selection of the second selectable user interface element.

25. The system of claim 24, wherein the price for the third item includes at least a first type of price deviation to which the organization is entitled of a plurality of types of price deviations,
wherein the price for the fourth item includes at least a second type of price deviation to which the organization is entitled of a plurality of types of price deviations, and
wherein the plurality of types of price deviations includes a negotiated discount between the organization and the manufacturer, a negotiated discount between the organization and the distributor, a negotiated discount between a third party cooperative organization to which the organization belongs and the manufacturer, a negotiated discount between the third party cooperative organization and the distributor, a rebate from the manufacturer, a rebate from the distributor, and a rebate from the third party cooperative organization.

\* \* \* \* \*